US011198242B2

(12) United States Patent
Conrad

(10) Patent No.: US 11,198,242 B2
(45) Date of Patent: Dec. 14, 2021

(54) EXTRUDER

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 276 days.

(21) Appl. No.: 15/752,174

(22) PCT Filed: Jul. 29, 2016

(86) PCT No.: PCT/CA2016/050897
§ 371 (c)(1),
(2) Date: Feb. 12, 2018

(87) PCT Pub. No.: WO2017/024385
PCT Pub. Date: Feb. 16, 2017

(65) Prior Publication Data
US 2018/0236705 A1 Aug. 23, 2018

(30) Foreign Application Priority Data
Aug. 12, 2015 (CA) .............................. CA 2900251

(51) Int. Cl.
*B29C 48/92* (2019.01)
*B29C 48/395* (2019.01)
(Continued)

(52) U.S. Cl.
CPC .............. *B29C 48/92* (2019.02); *B29C 45/18* (2013.01); *B29C 45/2669* (2013.01);
(Continued)

(58) Field of Classification Search
CPC ......... B29C 45/77; B29C 45/76; B29C 45/47; B29C 45/58; B29C 45/18; B29C 45/73;
(Continued)

(56) References Cited

U.S. PATENT DOCUMENTS 3,431,599 A * 3/1969 Fogelberg ............... B29C 48/83
366/89
3,664,795 A * 5/1972 Heinz .................. B29C 48/395
425/208
(Continued)

FOREIGN PATENT DOCUMENTS

CN 203357855 U 12/2013
EP 839631 A2 5/1998
(Continued)

OTHER PUBLICATIONS

International Search Report received in connection to international Patent Application No. PCT/CA2016/050897, dated Oct. 12, 2016.
(Continued)

*Primary Examiner* — Matthew J Daniels
*Assistant Examiner* — Shibin Liang
(74) *Attorney, Agent, or Firm* — Philip C. Mendes da Costa; Bereskin & Parr LLP/S.E.N.C.R.L., s.r.l

(57) ABSTRACT

An extruder has a barrel extending from a feed inlet end to an extruder outlet end. The barrel has an inner surface, an outer surface, and a wall thickness between the inner and outer surfaces. The extruder also has at least one heating member positioned provided on the barrel; a screw drive motor drivingly connected to a rotatably mounted screw positioned within the barrel, whereby the screw is rotatable at various revolutions per minute (RPM); and a controller is operably connected to the screw drive motor to adjust the RPM of the screw based upon a temperature of material passing through and/or being extruded from the barrel. Methods for operating an extruder filling a mold are also provided.

22 Claims, 51 Drawing Sheets

(51) Int. Cl.

| | |
|---|---|
| *B29C 48/68* | (2019.01) |
| *B29C 48/86* | (2019.01) |
| *B29C 48/25* | (2019.01) |
| *B29C 45/57* | (2006.01) |
| *B29C 45/50* | (2006.01) |
| *B29C 48/80* | (2019.01) |
| *B29C 45/54* | (2006.01) |
| *B29C 49/78* | (2006.01) |
| *B29C 45/26* | (2006.01) |
| *B29C 48/64* | (2019.01) |
| *B29C 45/18* | (2006.01) |
| *B29C 45/47* | (2006.01) |
| *B29C 45/58* | (2006.01) |
| *B29C 45/73* | (2006.01) |
| *B29C 48/53* | (2019.01) |
| *B29C 48/03* | (2019.01) |
| *B29C 48/505* | (2019.01) |
| *B29C 48/02* | (2019.01) |
| *B29C 48/60* | (2019.01) |
| *B29L 23/00* | (2006.01) |

(52) U.S. Cl.
CPC .......... *B29C 45/47* (2013.01); *B29C 45/5092* (2013.01); *B29C 45/54* (2013.01); *B29C 45/57* (2013.01); *B29C 45/58* (2013.01); *B29C 45/73* (2013.01); *B29C 48/2526* (2019.02); *B29C 48/397* (2019.02); *B29C 48/64* (2019.02); *B29C 48/681* (2019.02); *B29C 48/6803* (2019.02); *B29C 48/832* (2019.02); *B29C 48/865* (2019.02); *B29C 49/78* (2013.01); *B29C 48/02* (2019.02); *B29C 48/03* (2019.02); *B29C 48/509* (2019.02); *B29C 48/53* (2019.02); *B29C 48/60* (2019.02); *B29C 48/6801* (2019.02); *B29C 2948/924* (2019.02); *B29C 2948/9238* (2019.02); *B29C 2948/9259* (2019.02); *B29C 2948/92209* (2019.02); *B29C 2948/92447* (2019.02); *B29C 2948/92885* (2019.02); *B29C 2948/92952* (2019.02); *B29K 2995/0094* (2013.01); *B29L 2023/22* (2013.01)

(58) Field of Classification Search
CPC ......... B29C 45/57; B29C 45/00; B29C 48/00; B29C 48/14; B29C 48/25; B29C 48/92; B29B 13/00
See application file for complete search history.

(56) References Cited

U.S. PATENT DOCUMENTS

| | | |
|---|---|---|
| 3,728,058 A | 4/1973 | Wheeler |
| 3,733,059 A | 5/1973 | Pettit |
| 4,094,940 A | 6/1978 | Hold |
| 4,277,182 A * | 7/1981 | Kruder ................... B29C 48/65 366/89 |
| 4,290,986 A | 9/1981 | Koschmann |
| 43,566,140 | 10/1982 | Kruder |
| 4,501,498 A * | 2/1985 | McKelvey ............ B29C 48/362 366/69 |
| 4,721,589 A * | 1/1988 | Harris ................... B29C 48/832 264/40.1 |
| 5,358,327 A | 10/1994 | Derezinski et al. |
| 7,275,583 B2 * | 10/2007 | Eisen ..................... B22D 17/10 164/155.3 |
| 9,808,971 B2 * | 11/2017 | Fitzpatrick .............. B29C 45/74 |
| 2003/0030166 A1 | 2/2003 | Eiva |
| 2008/0217817 A1 | 9/2008 | McCullough |
| 2010/0295199 A1 | 11/2010 | Zhang et al. |
| 2011/0086150 A1 | 4/2011 | Plattner et al. |
| 2016/0200024 A1* | 7/2016 | Kim ..................... G05B 19/188 425/143 |
| 2016/0279854 A1* | 9/2016 | Fitzpatrick .......... B29C 35/0805 |

FOREIGN PATENT DOCUMENTS

| | | |
|---|---|---|
| JP | 59017916 U | 2/1984 |
| JP | 63031731 A | 2/1988 |
| JP | 63203313 A | 8/1988 |
| JP | 01317736 A | 12/1989 |
| JP | 2014184647 A | 10/2014 |

OTHER PUBLICATIONS

Written Opinion received in connection to international Patent Application No. PCT/CA2016/050897, dated Oct. 6, 2016.
TotalPatentOne: English machine translation of the Abstract, JP2014184647A; published on Oct. 2, 2014.
TotalPatentOne: English machine translation of the Abstract, JP S63203313; published on Aug. 23, 1988.
TotalPatentOne: English machine translation of the Abstract, JP S6331731; published on Feb. 10, 1988.
TotalPatentOne: English machine translation of the Abstract, JP59017916, published on Feb. 3, 1984.
TotalPatentOne: English machine translation of the Abstract, JP H01317736, published on Dec. 22, 1989.
The European Search Report, dated Feb. 21, 2019, mailed in connection to co-pending patent application No. 16834345.7.
English machine translation of the Abstract, CN203357855U, published on Dec. 25, 2013.
International Preliminary Report on Patentability, dated Feb. 13, 2018, in connection to co-pending international patent application No. PCT/CA2016/050897.

* cited by examiner

FIG. 11 - Prior Art

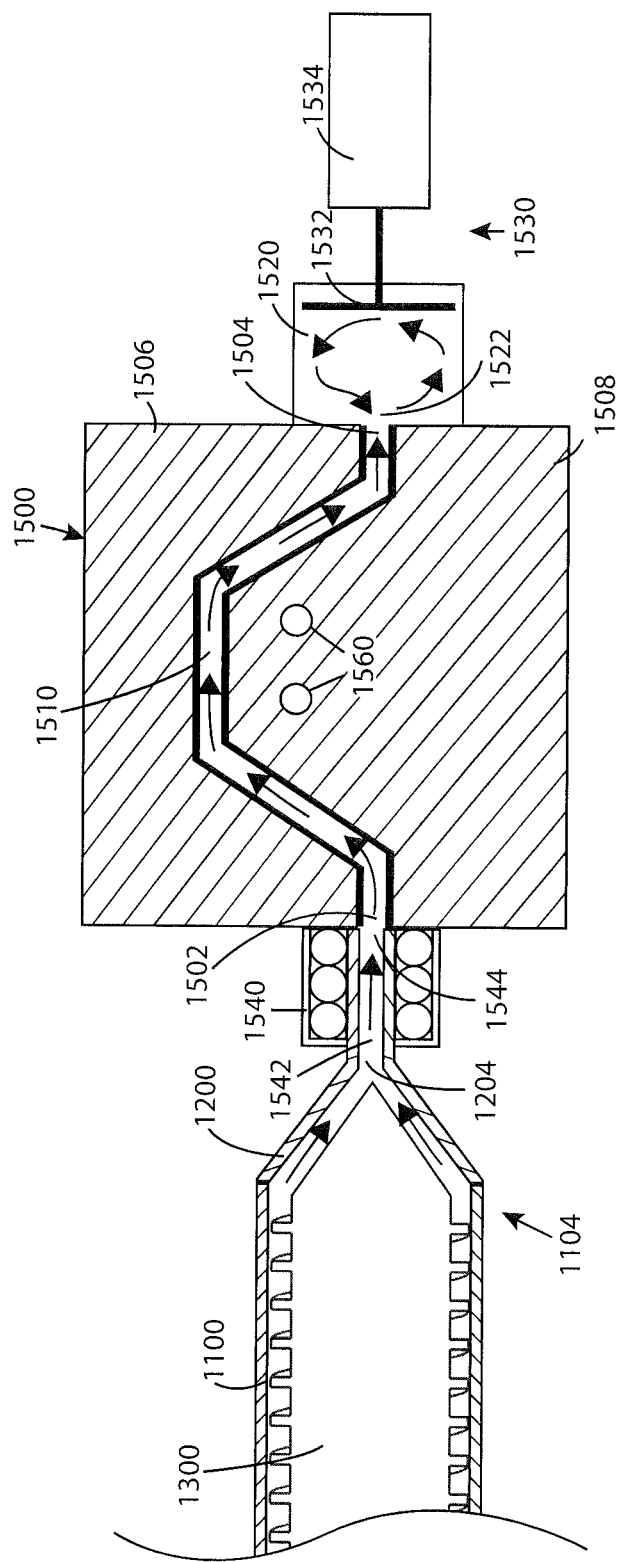

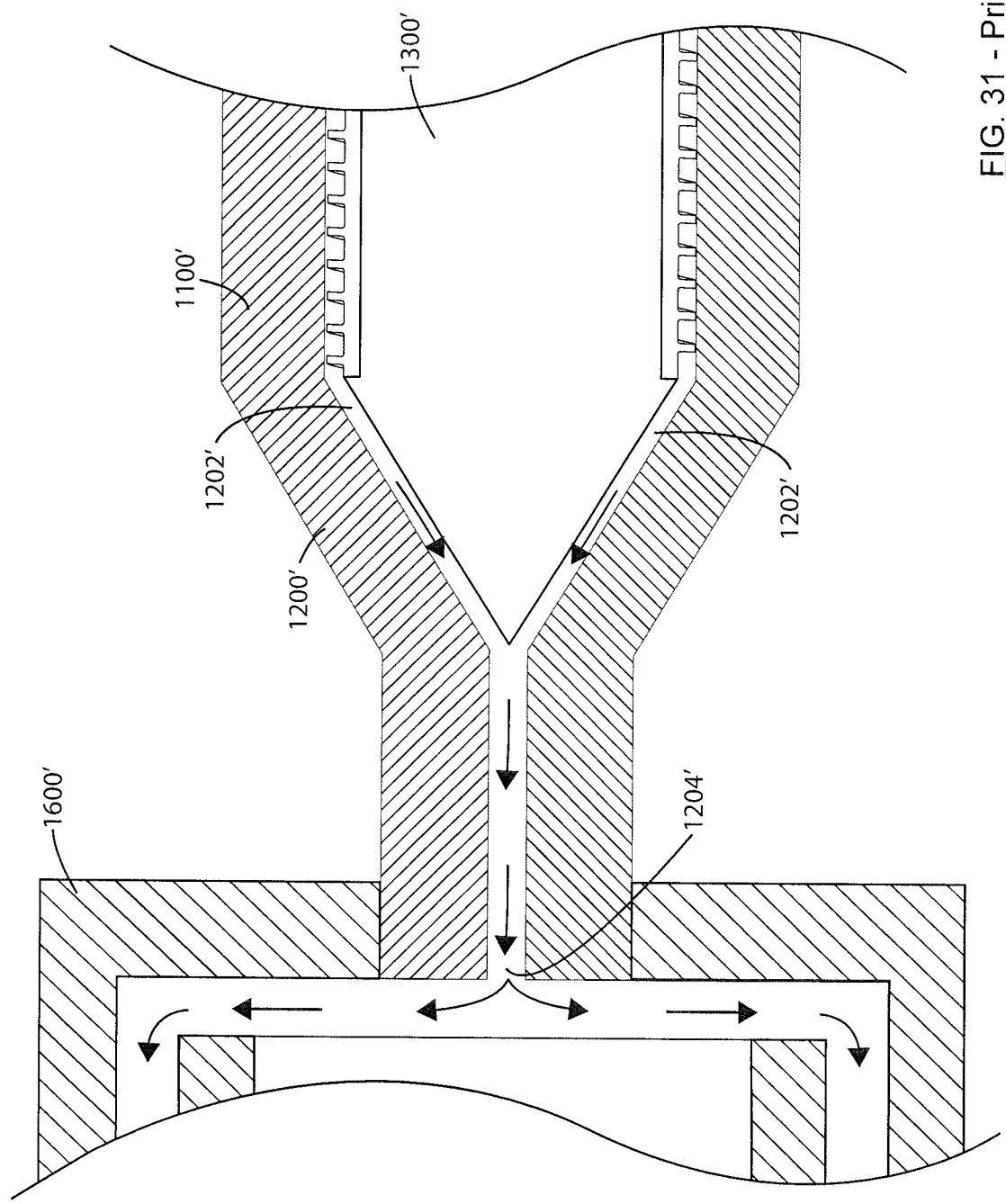
FIG. 31 - Prior Art

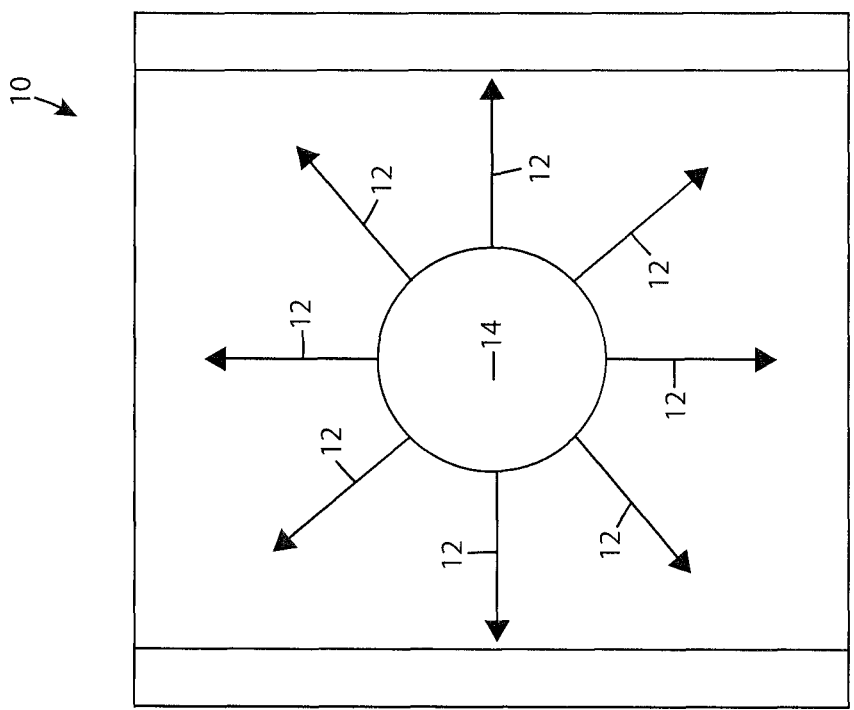

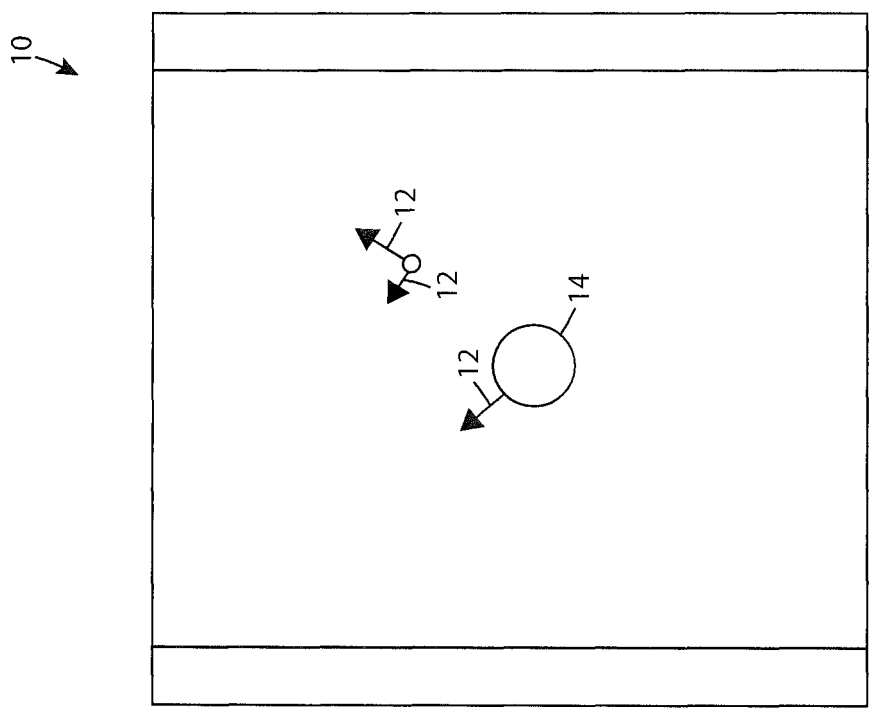

EXTRUDER

FIELD

This disclosure relates generally to extruders, and more specifically to extruders for extruding a plastic or thermoplastic material. This disclosure also relates to methods using one or more extruders to produce an extruded or molded plastic part.

INTRODUCTION

Extruders are typically used to heat and melt a solid input material (e.g. a plastic, or thermoplastic material) and extrude the material in a flowable, or melted state. The extruded, or output, material may be directed through a form or die while it cools and solidifies to form an elongate plastic component having a cross-sectional profile defined by the form or die. Alternatively, the output material may be directed into a mold where it is then cooled and solidifies to form a molded component having a shape defined by the mold.

One source of the heat provided to raise the temperature of the conveyed plastic material as it passes through the extrusion or injection barrel is mechanical shear heating. In shear heating, the plastic material is subjected to shearing or stretching between a rotating screw and a stationary barrel, often while under relatively high pressures (e.g. 2,000 pounds per square inch (psi), up to 30,000 psi or higher), causing heat to develop in the material. Typically, shear heating is a significant source of heat. For example, it may be considered preferable to provide about 50% or more of the heat required to melt the conveyed plastic material through shear heating.

While shear heating is effective at raising the temperature of the plastic material, there may be one or more disadvantages. For example, excessive shearing of the plastic material may lead to a physical and/or chemical degradation of the polymer molecules within the plastic material.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, an extruder is configured to reduce or minimize the amount of heat imparted to the conveyed plastic material by shear heating. For example, an extruder having a relatively high heat transfer rate through the barrel wall may be provided. The heat transfer rate through the barrel wall may be increased by providing an extrusion barrel made of a material with a high thermal conductivity, and/or by providing a relatively thin-walled extrusion barrel. An increased heat transfer rate through the barrel wall may allow more heat to be transferred through the barrel wall for a given unit of time. Accordingly, more heat per unit time can be transferred to the plastic material being conveyed through the extrusion barrel using one or more barrel heaters, which decreases the amount of shear heating required to melt the plastic material.

Alternatively, or additionally, the geometry of the extrusion barrel and the extrusion screw may be configured to reduce the pressure of the plastic material being conveyed through the extrusion barrel, thereby reducing the amount of shear heating. For example, the extrusion barrel and/or extrusion screw may be configured to provide a constant, or decreasing, volumetric compression ratio along the length of the extrusion barrel. Accordingly, plastic material being conveyed through the extrusion barrel may be subjected to pressures sufficient to prevent backflow through the barrel (e.g., if a mold is being fed by the extruder, then the pressure in the barrel may be selected to enable the extruder to fill the mold without backflow through the extruder) and/or to mix material being conveyed through the extrusion barrel if two or more different materials are present.

An advantage of this design is that a thinner walled barrel may be utilized, which enhances the radial thermal conductivity of the barrel. This enables a greater proportion of the heat to be provided from heaters provided on the barrel and less reliance provided from providing heat interior of the barrel (e.g., shear mixing).

The flow rate through the extruder may be substantially lower than traditional high pressure extruders. Therefore a single extruder according to this disclosure may have a lower through put of material per unit time then traditional high pressure extruders. However, by reducing the pressure internal of the barrel, the barrel may be lighter and have a substantially reduced cost. Accordingly, instead of using a single traditional extruder to make a desired number of parts, a plurality of extruders may be obtained, which have the same capacity as a single standard extruder, at the same or lower capital cost.

In accordance with this broad aspect, there is provided an extruder comprising:
   a) a barrel extending from a feed inlet end to an extruder outlet end, the barrel having an inner surface, an outer surface and a wall thickness between the inner and outer surfaces;
   b) at least one heating member provided on (e.g. positioned exterior to and/or interior of) the barrel; and
   c) a screw drive motor drivingly connected to a rotatably mounted screw positioned within the barrel, the screw having a length and a flight thereon, whereby the screw is rotatable at various revolutions per minute (RPM); wherein the screw and barrel are sized such that less than 40%, 30%, 25%, 20%, 15%, 10% or 5% of the heat that is introduced into the material in the barrel is supplied by shearing the material and the remainder is supplied by the at least one heating element.

In some embodiments, a flight clearance between the inner surface of the barrel and an outer extent of the flight is selected such that less than 40%, 30%, 25%, 20%, 15%, 10%, or 5% of the heat that is introduced into the material in the barrel is supplied by shearing the material and the remainder is supplied by the at least one heating element.

In accordance with this broad aspect, there is also provided an extruder comprising:
   a) a barrel extending from a feed inlet end to an extruder outlet end, the barrel having an inner surface, an outer surface and a wall thickness between the inner and outer surfaces;
   b) at least one heating member positioned exterior to the barrel;
   c) a screw drive motor drivingly connected to a rotatably mounted screw positioned within the barrel, the screw having a length and a flight thereon, wherein a flight clearance between the inner surface of the barrel and an outer extent of the flight is from 0.001 to 0.08 inches, optionally, 0.005 to 0.06 inches, 0.005 to 0.04 inches or 0.02 to 0.04 inches; and at least one of the following:

i) the barrel has a wall thickness of from 0.01 to 0.375 inches, optionally 0.04 to 0.25 inches;
ii) the volumetric compression ratio, defined as a channel depth of a feed section of the extruder and the channel depth in a metering section of the extruder, is ≤1;
iii) the barrel comprises at least one of aluminum and copper;
iv) a flight depth from an outer lateral extent of the flight to an inner lateral extent of a flight along the length of the screw is generally constant;
v) a flight depth from an outer lateral extent of the flight to an inner lateral extent of a flight along the length of the screw is from 0.2-0.5 inches;
vi) a land portion of the screw between two adjacent threads of a flight is from 0.125 to 0.5 inches, optionally 0.125 to 0.375 inches or optionally 0.125 to 0.25 inches;
vii) a land portion of the outward lateral extent of the flight of the screw is between two adjacent threads of a flight is from 0.25 to 0.5 inches;
viii) the barrel has a section in which solid feed material is liquefied, that is operated at a pressure of 1-1000, psi, optionally, 1-500 psi, 10-400 psi, or 40-200 psi;
ix) at least 80% of energy provided to the extruder is used to produce heat, optionally, at least 85%, at least 90% or at least 95%; and,
x) the screw and barrel are sized such that at least 60% of heat that is introduced into material in the barrel is supplied by the at least one heating member and less than 40% of the heat that is introduced into the material in the barrel is supplied by shearing the material.

In accordance with this broad aspect, there is also provided an extruder comprising:
a) a barrel extending from a feed inlet end to an extruder outlet end, the barrel having an inner surface, an outer surface and a wall thickness between the inner and outer surfaces;
b) at least one heating member positioned exterior to the barrel;
c) a screw drive motor drivingly connected to a rotatably mounted screw positioned within the barrel, the screw having a length and a flight thereon, whereby the screw is rotatable at various revolutions per minute (RPM); and
d) a controller operably connected to the screw drive motor to adjust the RPM of the screw based upon a temperature of material passing through and/or being extruded from the barrel.

In accordance with this broad aspect, there is also provided a method of operating an extruder comprising adjusting the RPM of a screw positioned in a barrel of the extruder based upon a temperature of material passing through and/or being extruded from the barrel.

In some embodiments, the controller is operably connected to the screw drive motor to increase the RPM of the screw subsequent to the temperature of the material passing through and/or being extruded from the barrel increasing above a predetermined value. In some embodiments, the controller is operably connected to the screw drive motor to decrease the RPM of the screw subsequent to the temperature of the material passing through and/or being extruded from the barrel decreasing below a predetermined value. Accordingly, the screw may be rotated at a lower RPM when the material in the extruder is cool, so as to reduce the pressure in the barrel and allow more time for the heater(s) provided on the barrel to heat the material in the barrel. Once the temperature reaches a desired or preset value, the screw RPM may be increased without increasing the pressure exerted on the barrel.

In some embodiments, the barrel has a wall thickness of from 0.01 to 0.375 inches, optionally from 0.04 to 0.25 inches.

In some embodiments, a flight clearance between the inner surface of the barrel and an outer extent of the flight is from 0.001 to 0.08 inches, optionally, 0.005 to 0.06 inches, 0.005 to 0.04 inches or 0.02 to 0.04 inches.

In some embodiments, the flight clearance remains constant or increases from the feed inlet end to the extruder outlet end.

In some embodiments, the volumetric compression ratio, defined as a channel depth of a feed section of the extruder and the channel depth in a metering section of the extruder, is ≤1.

In some embodiments, the barrel comprises at least one of aluminum, copper, steel and stainless steel, and preferably aluminum and/or copper.

In some embodiments, a flight depth from an outer lateral extent of the flight to an inner lateral extent of a flight along the length of the screw is generally constant.

In some embodiments, a flight depth from an outer lateral extent of the flight to an inner lateral extent of a flight along the length of the screw is from 0.2-0.5 inches.

In some embodiments, a land portion of the screw between two adjacent threads of a flight is from 0.125 to 0.5 inches, optionally 0.125 to 0.375 inches or optionally 0.125 to 0.25 inches.

In some embodiments, a land portion of the outward lateral extent of the flight of the screw between two adjacent threads of a flight is from 0.25 to 0.5 inches.

In some embodiments, the barrel has a section in which solid feed material is liquefied, that is operated at a pressure of 1-1000, psi, optionally, 1-500 psi, 10-400 psi, or 40-200 psi.

In some embodiments, at least 80% of energy provided to the extruder is used to produce heat, optionally, at least 85%, at least 90%, or at least 95%.

In some embodiments, the screw and barrel are sized such that at least 60%, 70%, 80% or 90% of heat that is introduced into material in the barrel is supplied by the at least one heating member and less than 40%, 30%, 20% or 10% of the heat that is introduced into the material in the barrel is supplied by shearing the material.

In some embodiments, the screw comprises a first screw section and a second screw section and a thermal insulation member is provided between the first and second screw sections.

In some embodiments, the first screw section is made of a material having lower thermal conductivity than the second screw section.

In some embodiments, the first screw section is provided in a feed section of the extruder and the second screw section is provided downstream of the feed section of the extruder.

In some embodiments, the screw comprises a first screw section and a second screw section and the first screw section is made of a material having lower thermal conductivity than the second screw section.

In accordance with another aspect of this disclosure, an extruder may be used to fill a mold in a molding process. The plastic material output from the extruder may be introduced into the mold at a relatively low pressure, such as the operating pressure of an extruder according to this disclosure, and once the mold is full or partially full, e.g., 75%, 80%, 85%, 90%, 95% or more full, a pressurization member may be used to increase the pressure of the material in the mold.

In typical extrusion or injection molding operations, large plastic components are produced using machines capable of relatively high injection pressures (e.g., 5,000 to 20,000 psi), which are often large, expensive, and may be characterized as being relatively energy inefficient.

Instead of increasing the operating pressure of the extruder, apparatus and methods disclosed herein employ a pressurization member other than extruder to apply pressure to the material within the mold cavity to ensure proper filling of the mold. Such an arrangement allows for large and/or complex mold cavities to be filled using a relatively low-pressure output from an extruder, and subsequently subjected to higher pressures that may be required or desirable to properly fill the mold and/or to compress the flowable material within the mold cavity to improve one or more physical properties of the molded component.

As the plastic material exiting the extruder is in a flowable state due to its elevated temperature, if the flowable material is allowed to cool, it will begin to solidify, which may not be desirable until the mold has been completely filled and pressurized by the pressurization member. Accordingly, the mold preferably includes one or more heating elements to maintain the plastic material within the mold cavity at an elevated temperature during the mold filling process.

Another possible advantage of this approach relates to the production of molded components with relatively complicated geometries, and/or the production of relatively large molded components. In this respect, since the molding process outlined above does not rely on the output or operating pressure of the extrusion barrel to provide the maximum pressure on the flowable material within the mold cavity (instead relying on one or more pressurization members), such a molding process can be 'scaled up' to provide higher molding pressures (e.g. for use with molds with relatively complex internal cavities and/or with molds for relatively large molded components) without having to 'scale up' the operating pressure of the extruder.

In accordance with this broad aspect, there is provided an extruder and molding assembly comprising an extruder positioned upstream from a mold, the mold having a mold cavity and a separate pressurization member fluidly connected to the mold cavity (e.g., a piston, source of pressurized fluid, etc. to drive some of the extrudate into the mold) wherein the extruder is operable at a first pressure to fill at least a majority of the mold cavity and the pressurization member is operable to fill a remainder of the mold cavity.

In some embodiments, the assembly further comprises an isolation mechanism (e.g., a valve, solidifying part of the extruded material between the mold and the extruder) operable to isolate an interior of the extruder containing a screw from the mold cavity.

In some embodiments, the extruder is operable at a pressure of 1-500 psi when filing the mold and the pressurization member is operable at a pressure above 500 psi to fill the remainder of the mold cavity.

In some embodiments, the extruder is operable at a pressure of 10-200 psi when filing the mold and the pressurization member is operable at a pressure above 1000 psi to fill the remainder of the mold cavity.

In some embodiments, the assembly further comprises a storage chamber positioned between the pressurization member and the mold cavity whereby operation of the pressurization member drives material from the storage chamber into the mold cavity.

In some embodiments, the storage chamber is fluidically connected to an outlet end of the extruder whereby the extruder fills the storage chamber concurrently with filling the mold cavity.

In some embodiments, the storage chamber is positioned on an opposite side of the mold cavity to the extruder.

In some embodiments, the isolation member comprises a valve.

In some embodiments, the isolation member comprises a cooling chamber between the mold cavity and the extruder whereby liquefied extrudate is solidified in the cooling chamber prior to operation of the pressurization member.

In some embodiments, the assembly further comprises a mold heater.

Also in accordance with this broad aspect, there is also provided a method of operating an extruder and molding assembly having a mold cavity comprising using the extruder to fill at least a majority of the mold cavity at a first pressure and using a pressurization member which is fluidically connected to the mold cavity at an alternate location than the extruder to fill a remainder of the mold cavity.

In some embodiments, the method further comprises isolating an interior of the extruder containing a screw from the mold cavity prior to using the pressurization member.

In some embodiments, the method further comprises operating the extruder at a pressure of 1-500 psi when filing the mold and operating the pressurization member at a pressure above 500 psi to fill the remainder of the mold cavity.

In some embodiments, the method further comprises operating the extruder at a pressure of 10-200 psi when filing the mold and operating the pressurization member at a pressure above 1,000 psi to fill the remainder of the mold cavity.

In some embodiments, operation of the extruder also fills a storage chamber positioned between the pressurization member and the mold cavity and operation of the pressurization member drives material from the storage chamber into the mold cavity.

In some embodiments, operation of the extruder fills the storage chamber concurrently with filling the mold cavity.

In some embodiments, liquefied extrudate is solidified in a cooling chamber positioned between the extruder and the mold cavity prior to operation of the pressurization member.

In some embodiments, the mold is heated during at least a portion of the filling of at least a majority of the mold cavity at the first pressure.

In some embodiments, the mold is at an elevated temperature during the filling of at least a majority of the mold cavity at the first pressure whereby plastic extruded into the mold is in a flowable state when the pressurization member is actuated.

In accordance with another aspect of this disclosure, an extruder may be used to mold a component without converging or diverging the flowable material after it has exited the extrusion barrel. In accordance with this aspect, the plastic material output from an extruder barrel is directed into an annular mold cavity having an annular thickness substantially equal to the channel depth at the output end of the extrusion barrel.

In accordance with this broad aspect, there is provided an extruder and molding assembly comprising:
 a) a mold having a mold cavity and a passage extending from a mold inlet to the mold cavity, the passage defining a mold annular gap; and,
 b) an extruder positioned upstream from the mold, the extruder having a barrel outlet and a screw, the screw spaced from an inner surface of the barrel to define a barrel annular gap between a lateral outer extent of a flight provided on the screw and the inner surface of the barrel;

wherein the barrel annular gap is substantially the same size as the mold annular gap.

In some embodiments, the passage has an absence of a spider.

In some embodiments, the mold is a mold for a pipe.

In some embodiments, the mold is a mold for a pipe having a diameter greater than 0.5 inches.

In accordance with this broad aspect, there is also provided a method of operating an extruder and molding assembly having a mold cavity comprising flowing an extrudate generally linearly from a barrel outlet of the extruder into the mold cavity.

In some embodiments, the method further comprises using the mold cavity to produce a section of pipe.

In some embodiments, the method further comprises using the mold cavity to produce a section of pipe having a diameter greater than 0.5 inches.

In typical injection molding operations, the flowable material is injected into the mold cavity at relatively high pressures (e.g., 5,000 to 20,000 psi) and flow rates (e.g., 2 to 20 ounces per second). A possible downside of such a process is the potential for the introduction of strain orientation lines within the plastic component. Strain orientation lines may cause (or by symptomatic of) a molded component to having a lower strength than an otherwise similar component with less (or no) strain orientation. In some applications, it may be considered necessary to subject a molded component to one or more post molding strain relieving operations, to ensure the molded plastic component is not structurally compromised by the strain orientation introduced during the molding process.

In another broad aspect, a molded plastic component produced by the processes disclosed herein may have reduced strain orientation as compared to components produced by typical injection molding processes.

Since the molding processes disclosed herein fill the mold cavity at a relatively low pressure and material flow rate, the potential for strain orientation lines to be formed within the molded component may be reduced or eliminated. Accordingly, such a process may produce a molded component with fewer (or no) strain orientation lines without any post molding treatment or a milder post molding treatment. Advantageously, such a component may not require any post molding strain relieving operations.

In accordance with this broad aspect, there is provided a plastic molded part wherein plastic in a portion of the part has an absence of strain orientation lines wherein the part is not subjected to a post molding stress relieving operation.

In some embodiments, at least 50%, 60%, 70%, 75%, 80%, 90% or more of the part has an absence of strain orientation lines.

In accordance with this broad aspect, there is also provided a method of molding a plastic part comprising introducing a first portion of the plastic into a mold cavity at a first pressure and rate such that the first portion of the plastic has an absence of strain orientation lines wherein the part is not subjected to a post molding stress relieving operation.

In some embodiments, at least 50%, 60%, 70%, 75%, 80%, 90% or more of the plastic is introduced into the mold cavity at a first pressure and rate such that the first portion of the plastic has an absence of strain orientation lines.

In some embodiments, at least 50%, 60%, 70%, 75%, 80%, 90% or more of the plastic is introduced into the mold cavity at a pressure less than 400 psi.

In some embodiments, a remainder of the plastic is introduced into the mold cavity at a pressure greater than 500 psi.

In some embodiments, a remainder of the plastic is introduced into the mold cavity at a pressure greater than 1,000 psi.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIGS. 28A-28D are schematic cross-section views of an extruder and a pressurization member coupled to a mold, in accordance with one embodiment;

FIG. 31 is a cross-section view of a prior art injection unit nozzle coupled to a mold having a cylindrical mold cavity;

FIG. 34 is a schematic illustration of a molded plastic part, showing strain orientation lines resulting from a typical prior art injection molding process;

FIG. 35 is a schematic illustration of a molded plastic part produced by the extrusion processes described herein;

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used to extrude and/or mold various materials, such as a plastic material and optionally a thermoplastic material. The thermoplastic material may be one or more of acrylonitrile butadiene styrene (ABS), polyvinyl chloride (PVC), chlorinated polyvinyl chloride (CPVC), polyethylene (PE), low molecular weight PE, high density PE, ultra high molecular weight PE, polyethylene terephthalate (PET), polystyrene (PS), polycarbonate (PC), acrylic, polypropylene (PP), polybutylene terephthalate (PBT), polyvinyl acetate, ethylene-vinyl acetate (EVA), or the like. Preferably, the thermoplastic material is one or more of PVC and CPVC.

General Description of Preferred Embodiments Utilizing Combinations of Various Aspects FIGS. 1A to 3 exemplify an extruder, referred to generally as 1000. Extruder 1000 may be used to heat and melt an input material (e.g. a plastic, or thermoplastic material which may be solid) and extrude the material in a flowable, or melted state. The extruded, or output, material may be used to fill a mold in a molding process, as will be discussed further subsequently. It will be appreciated that extruder 1000 may receive any material input known in the extruder art.

Figure 1A:
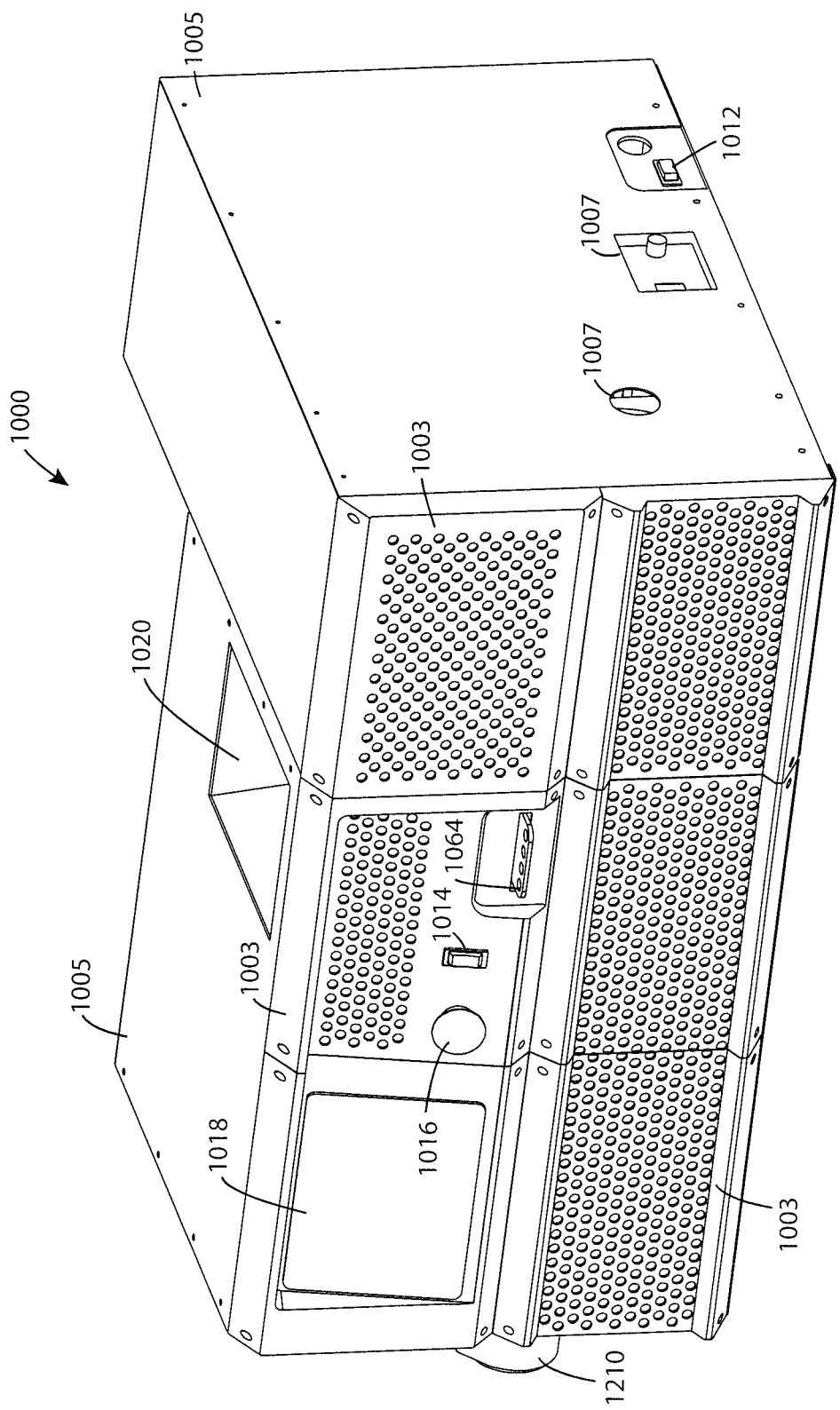
FIG. 1A is a perspective view of an extruder in accordance with one embodiment.
Figure 1B:
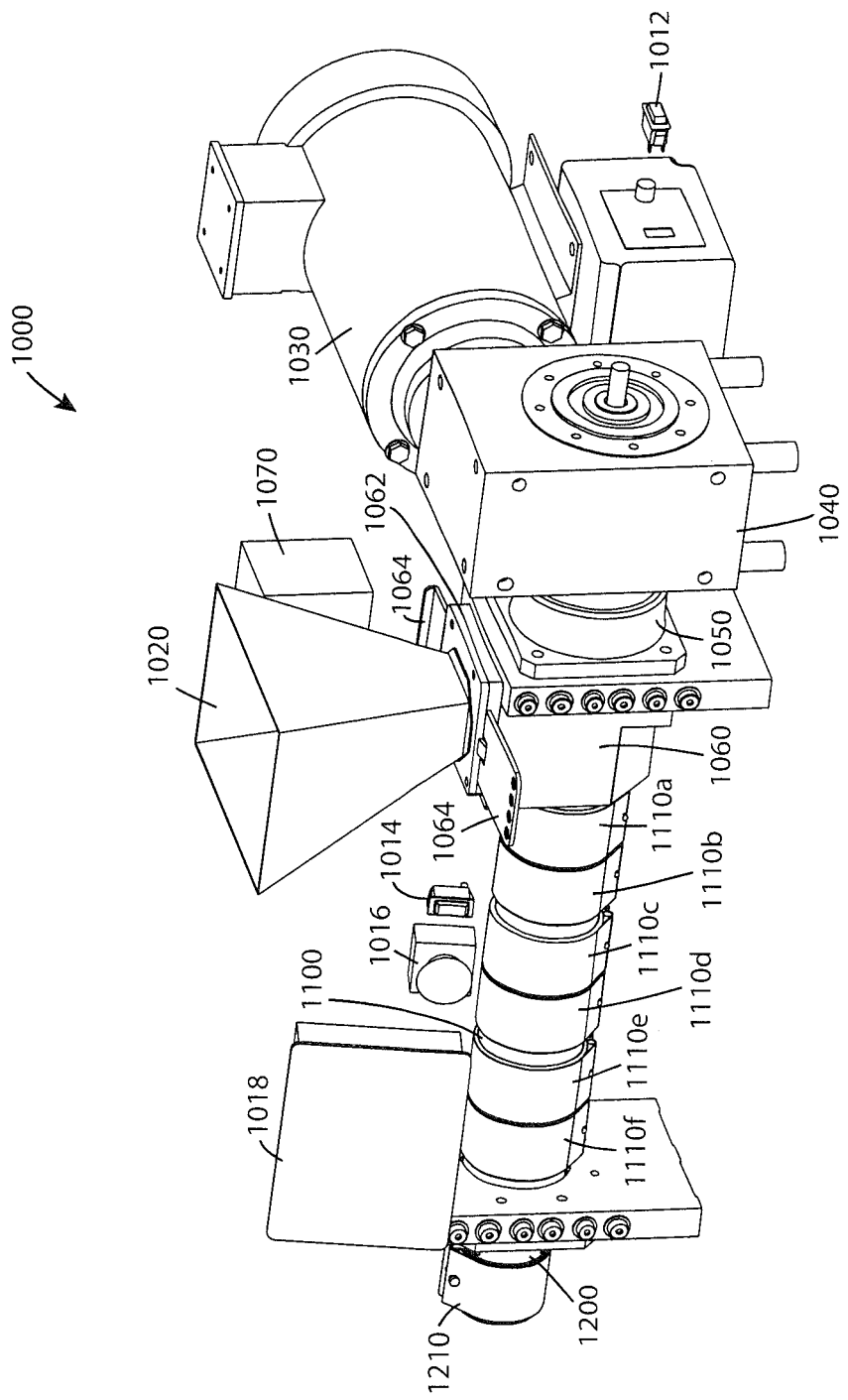
FIG. 1B is a perspective view of the extruder of FIG. 1, with the outer housing removed.
Figure 2:
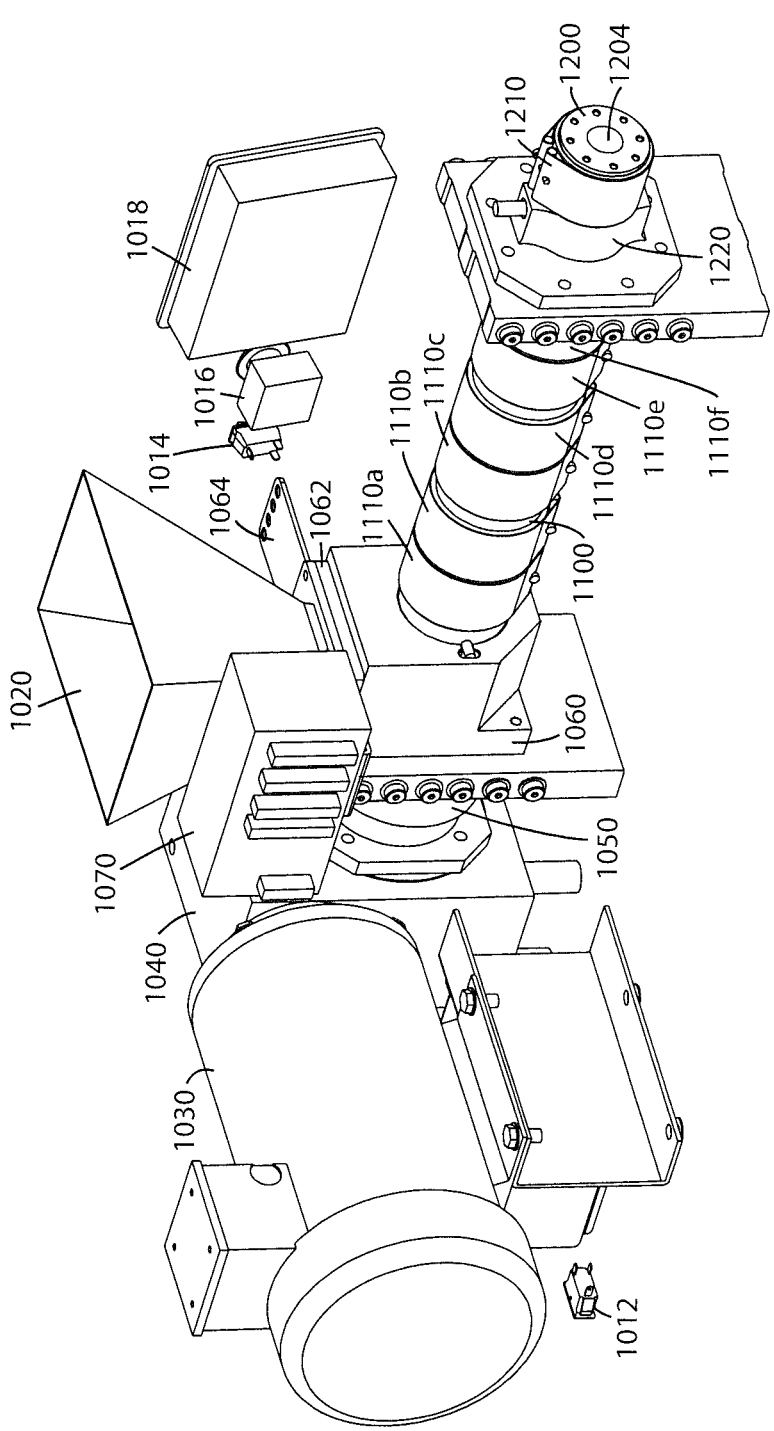
FIG. 2 is a rear perspective view of the extruder of FIG. 1, with the outer housing removed.
Figure 3:
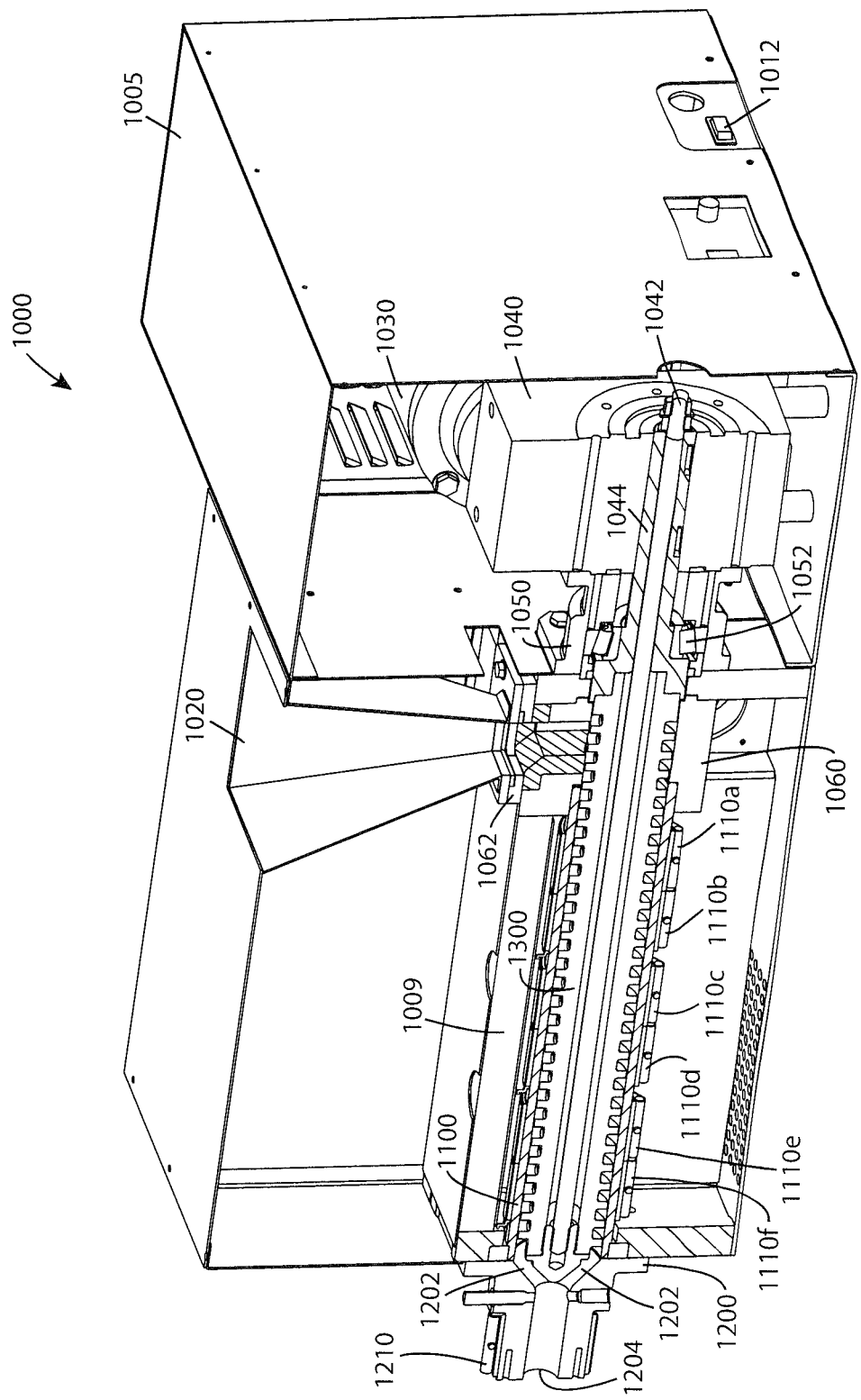
FIG. 3 is a perspective cross-section view of the extruder of FIG. 1.

As shown in FIG. 1A, extruder 1000 may be enclosed in a housing, which in the illustrated embodiment includes a plurality of solid panels 1005 and perforated panels 1003. Solid panels 1005 may have one or more cutouts or apertures 1007 to provide access to components inside the housing. It will be appreciated that the housing may be made from any suitable material (e.g. metal, plastic, and the like), and that in alternate embodiments the housing may be formed of more or fewer panels. In some embodiments, an outer housing may not be provide.

Extruder 1000 may include one or more user input devices that allow a user to initiate and/or control the operation of the extruder. For example, user input devices may include one or more of power switches 1012, 1014, emergency stop 1016; and a display 1018, which may be a touch screen display. Extruder 1000 may also include one or more user output devices that allows a user to monitor the operation of the extruder. For example, user output devices may display 1018, and/or one or more audio and/or visual output devices, such as lights, buzzers, speakers, and the like (not shown).

Turning to FIGS. 1B to 3, extruder 1000 also includes an input member for introducing the material into the extruder. The input member may be an input hopper 1020 for receiving the input material (e.g. a solid pelletized plastic). As perhaps best seen in FIG. 3, material received in hopper 1020 is directed through a feedthroat 1062 in a feed block 1060 where it is introduced into the channels of an extrusion screw 1300. Rotation of the screw 1300 advances or conveys the pelletized input material from a first, or input end 1302 of the extrusion screw towards a second, or output end 1034 of the extrusion screw 1300, thereby conveying the material through an extrusion barrel 1100 from a first, or input end 1102 of the barrel to a second, or output end 1104 of the barrel.

As the material is conveyed through the extrusion barrel 1100 by the screw 1300, heat from one or more (e.g., a plurality of) heating elements 1110a-f positioned about the outer surface 1108 of the extrusion barrel 1100 is transferred through the extrusion barrel wall to the conveyed material via the inner barrel surface 1106, raising the temperature of the material and thereby causing the material to transition to a flowable, or melted state. It will be appreciated that more or fewer heating elements 1110 may be provided in alternative embodiments.

The input material continues to be conveyed by the extrusion screw 1300 towards the output end 1104 of the extrusion barrel 1100, where it is ejected as a flowable liquid material. In the example illustrated in FIG. 3, the material is ejected from the extruder via an ejection nozzle 1200. More specifically, the flowable material exits the output end 1104 of the extruder barrel 1100 and enters the input end 1202 of the nozzle 1200, flows through the nozzle, and is ejected from the output end 1204 of the nozzle.

As exemplified, a heating element 1210 may also be positioned about the outer surface of output nozzle 1200. Heat from heating element 1210 is transferred through the nozzle body to the conveyed material via the inner nozzle surfaces, and may be used to control the temperature of the material flowing within the output nozzle 1200. It will be appreciated that more or fewer (i.e. zero) nozzle heating elements 1210 may be provided in alternative embodiments.

The extrusion screw 1300 is rotated by screw drive motor 1030. Screw drive motor 1030 is preferably an electric motor, such as an alternating current (AC) motor (asynchronous or synchronous), a direct current (DC) motor, and the like. The screw drive motor 1030 is drivingly coupled to the extrusion screw directly or via a drive transmission member, e.g., an optional gearbox 1040, which is preferably a reduction gearbox. The use of a reduction gearbox allows the use of a higher-speed, lower power motor, which may be more efficient and/or less expensive to purchase and/or operate than a lower speed, higher power motor.

In FIGS. 1A to 3, the extrusion screw 1300 is coupled to the gearbox 1040 via a screw mounting member 1044. Screw 1300 may be coupled to screw mounting member 1044 using any suitable method known in the art, such as a threaded coupling, a keyed joint, and the like. Screw mounting member 1044 is itself coupled to gearbox 1040 using any suitable method, which may be the same or different than the coupling between screw 1300 and screw mounting member 1044.

Figure 36:
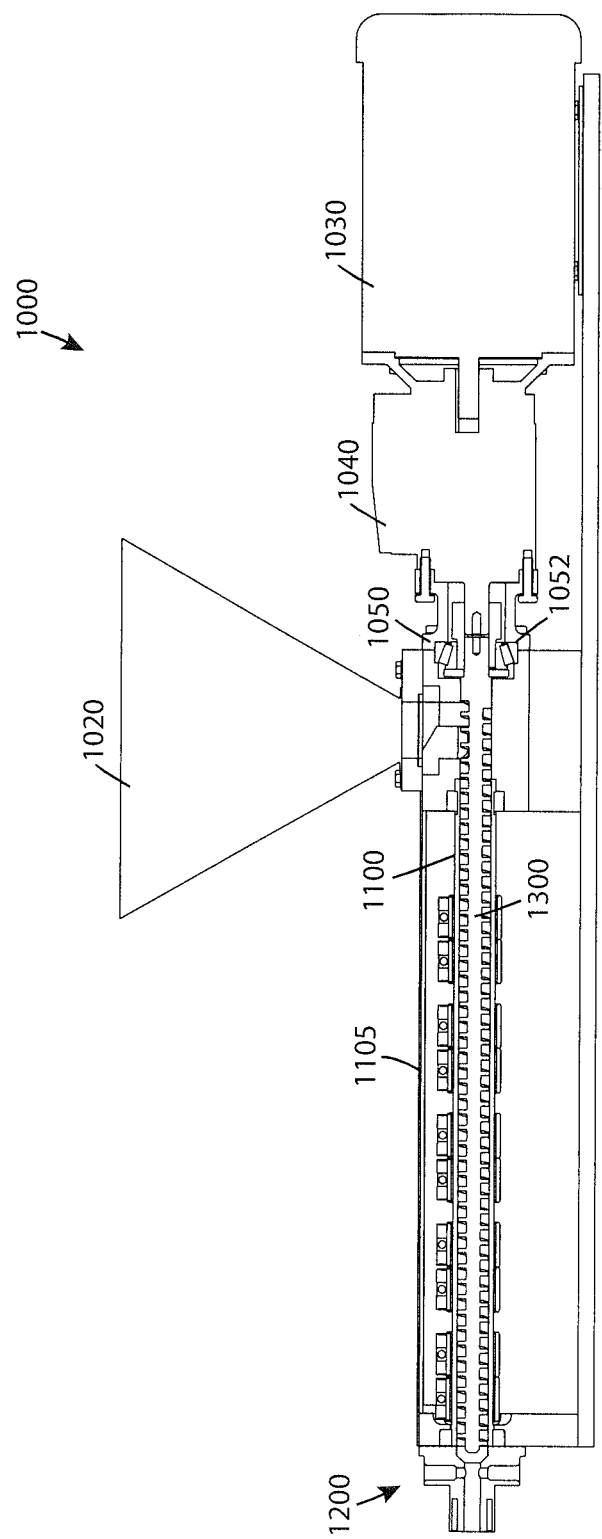
FIG. 36 is a cross-section view of an extruder in accordance with another embodiment.
Figure 37:
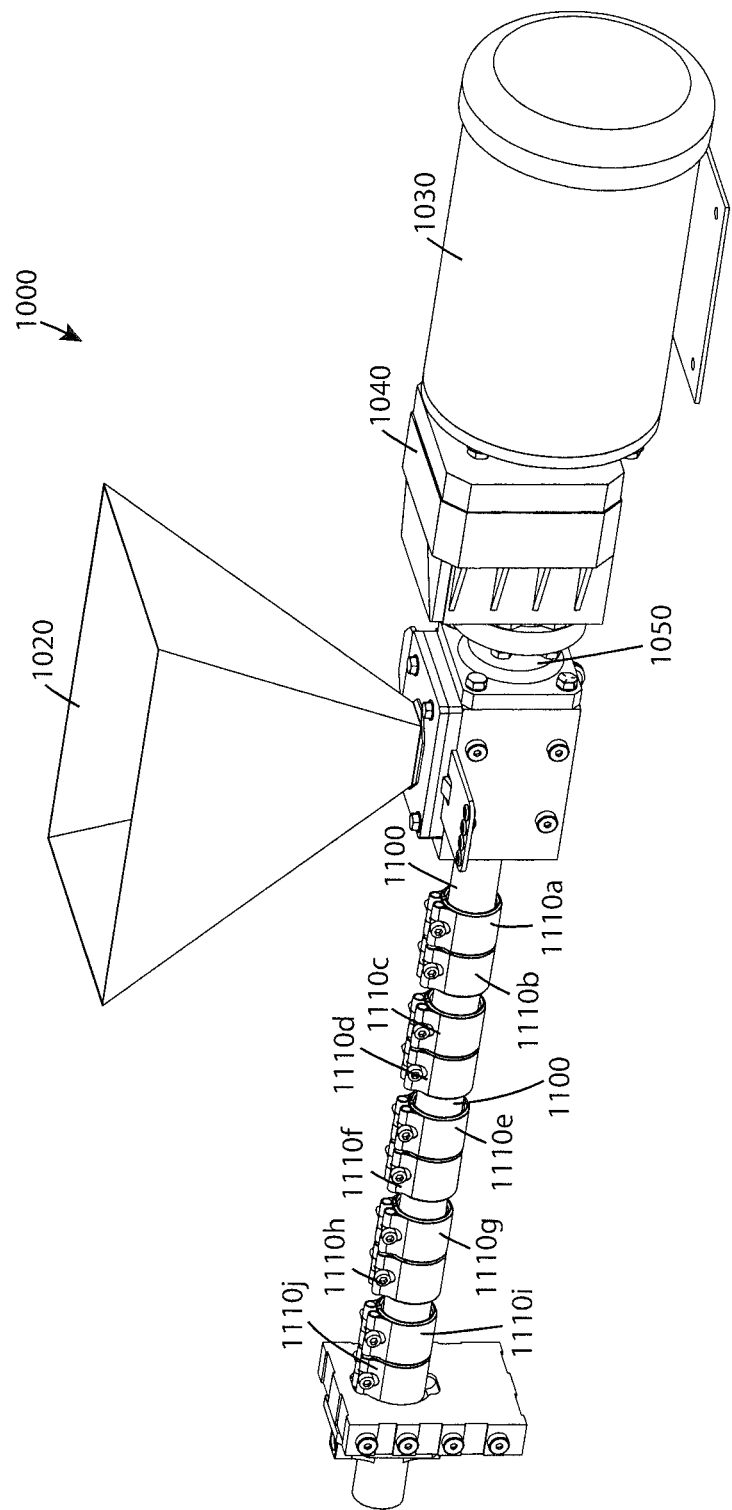
FIG. 37 is a perspective view of the extruder of FIG. 36.
Figure 38:
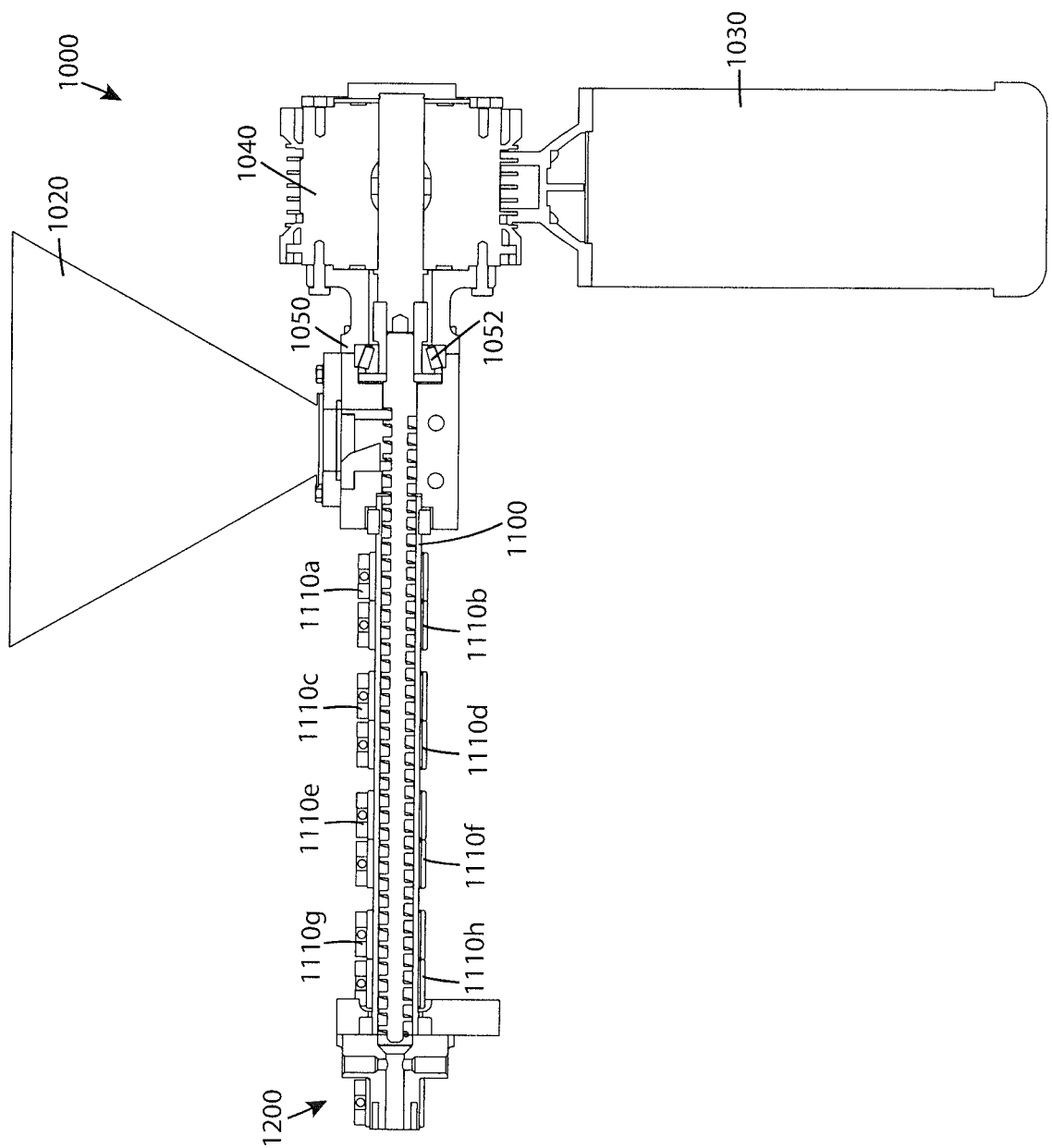
FIG. 38 is a cross-section view of an extruder in accordance with another embodiment.
Figure 39:
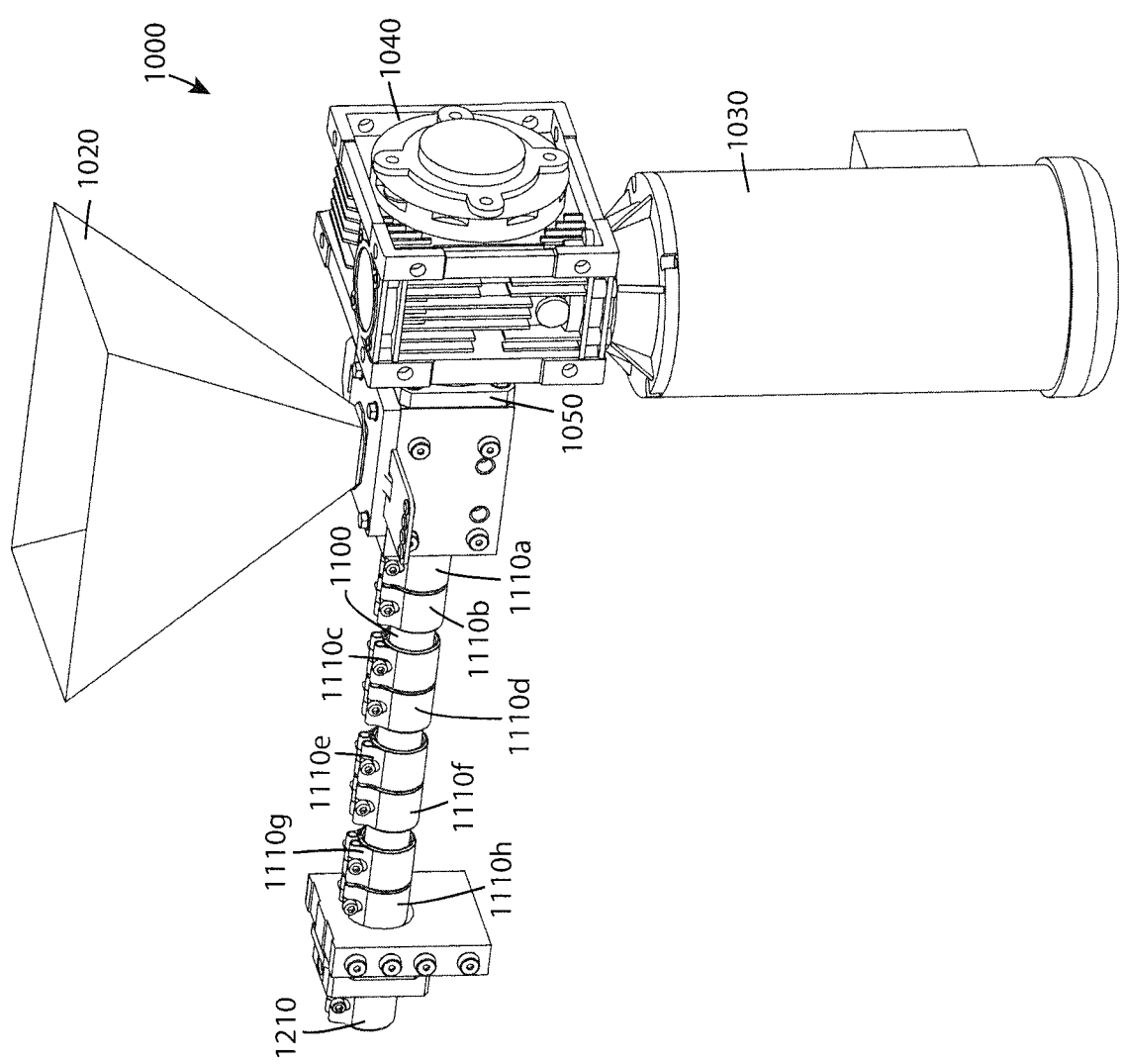
FIG. 39 is a perspective view of the extruder of FIG. 38.

As illustrated in FIGS. 1A to 3, the input and output to gearbox 1040 are at right angles, allowing motor 1030 to be positioned at an angle to extrusion screw 1300. Alternatively, as shown in FIGS. 36 and 37, the input and output to gearbox 1040 may be on opposite sides of the gearbox, allowing motor 1030 to be positioned generally in-line with extrusion screw 1300. Alternatively, as shown in FIGS. 38 and 39, the input and output to gearbox 1040 may be at right angles, but motor 1030 may be positioned below extrusion screw 1300. It will be appreciated that gearbox 1040 and/or one or more mechanical or viscous couplings may be provided to allow any suitable relative position of motor 1030 and extrusion screw 1300.

Extrusion screw 1300 may be rotationally supported within extrusion barrel 1100 by the gearbox 1040 (or motor 1030, if a gearbox is not provided) and/or by one or more bearings, which may include at least one end thrust bearing 1050. End thrust bearing 1050 is configured to allow rotation of screw 1300, and to resist the expected axial forces exerted on screw 1300 in a direction towards the input end 1302 of the extrusion screw (e.g. due to backpressure of the material being conveyed by screw 1300, and/or a partial or complete obstruction of output nozzle 1200).

As exemplified, extrusion screw 1300 may be hollow. Alternatively, or in addition, the output end 1304 of extrusion screw 1300 may be provided with a nose cone 1310. Nose cone 1310 may assist with directing the output material from the output end 1104 of the extruder barrel 1100 to the input 1202 of nozzle 1200. Nose cone 1310 is preferably mounted to extrusion screw 1300 in a manner that allows it to be axially advanced and retracted relative to screw 1300, e.g. using an optional knockout rod 1042 that extends through the hollow extrusion screw and the screw mounting member 1044. The ability to axially advance nose cone 1310 using knockout rod 1042 may be useful when clearing a blockage of output material (e.g. when removing a clogged nozzle 1200).

Extrusion Barrel

FIGS. 4 to 10 exemplify different embodiments of an extrusion barrel 1100, each of which may be used with the extruder 1000 disclosed herein. Extrusion barrel 1100 comprises an elongate metal conduit extending between a first or inlet end 1102 and a second or outlet end 1104. The wall of extrusion barrel 1100 has an inner surface 1106 and an outer surface 1108. In use, an extrusion screw 1300 is positioned interior of the extrusion barrel, and as noted above, the material to be extruded may be conveyed within the extrusion barrel from the inlet end 1102 to the outlet end 1104 by rotating of the screw.

Figure 4:
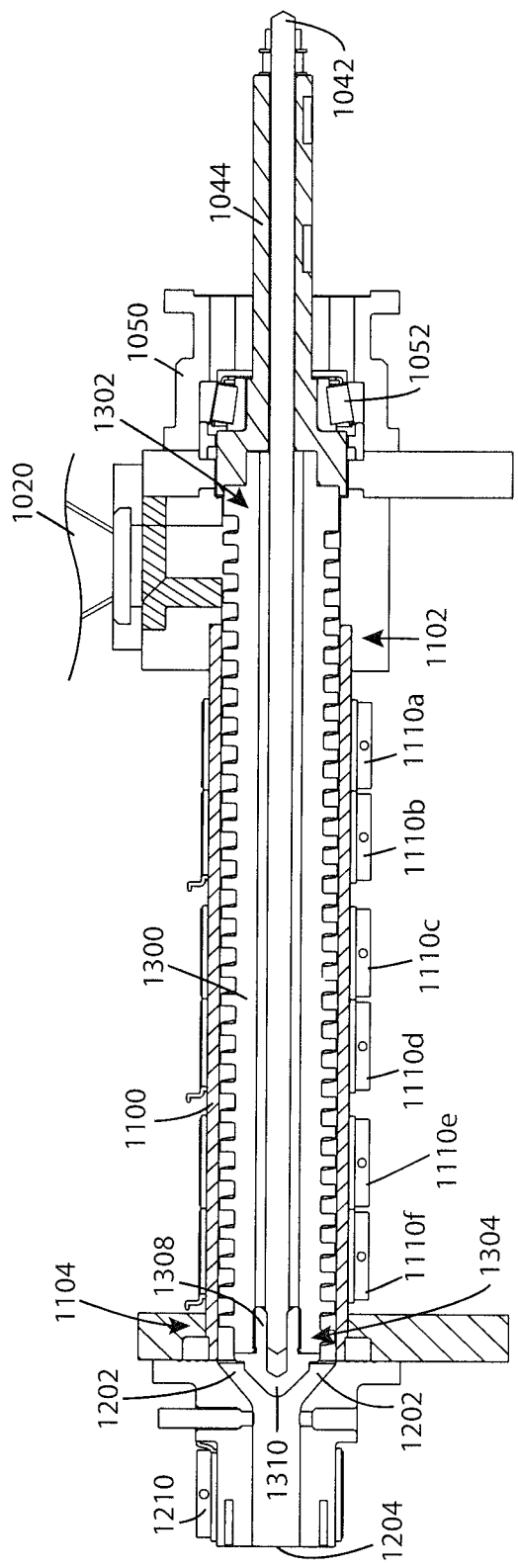
FIG. 4 is a cross-section view of the extruder barrel of FIG. 1.

As shown in FIG. 4, extrusion barrel 1100 may have a substantially constant wall thickness and a substantially constant inner diameter along its length. In other words, the radial distance between the axial centerline of the barrel 1100 and the inner surface 1106 of the barrel may be substantially constant, and the radial distance between the inner surface 1106 and the outer surface 1108 of the barrel wall may also be substantially constant.

Extrusion barrel 1100 preferably has a relatively thin wall thickness, particularly in comparison to barrels used in typical extrusion or injection molding machines. For example, extrusion barrel 1100 may have a wall thickness of from between 0.01 to 0.375 inches, or from between 0.04 to 0.25 inches.

Providing a relatively thin-walled extrusion barrel may have one or more advantages. First, the rate of heat transfer through the extrusion barrel wall is proportional to the wall thickness of the barrel. Without wishing to be bound to any particular theory, the rate of heat transfer through the barrel wall may be characterized as:

$$H = kA\left(\frac{T_O - T_I}{L_W}\right) \quad (1)$$

where H is the amount of heat per second flowing through a portion of the wall with surface area A and a wall thickness $L_W$, assuming a relatively small difference between the temperature $T_O$ of the outer surface of the barrel wall and the temperature $T_I$ of the inner surface of the barrel wall, such that a constant thermal conductivity k can be assumed for the wall material. Accordingly, all other parameters remaining constant, a decrease in the barrel wall thickness $L_W$ results in a higher heat transfer rate through the barrel wall.

Figure 20:
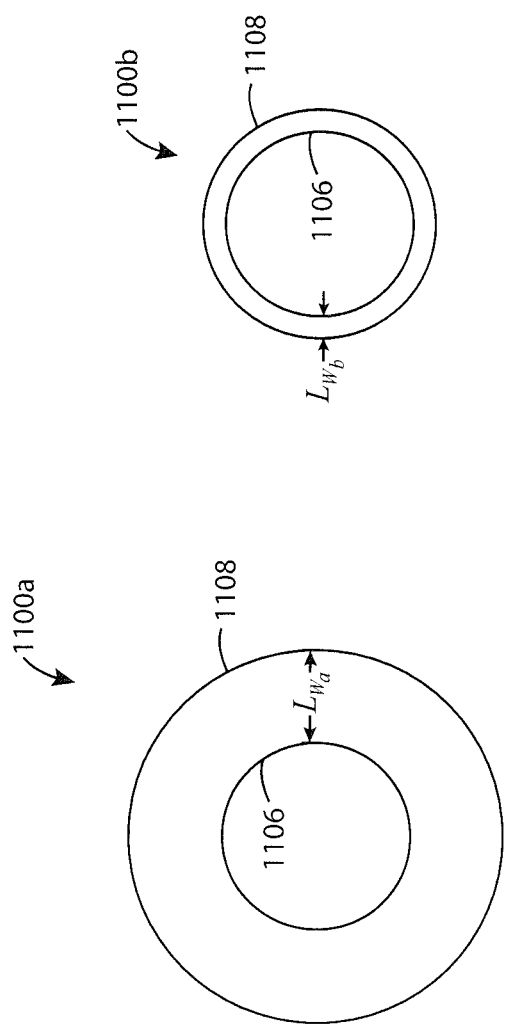
FIG. 20 is an end section view, to scale, of two different extruder barrels.

For example, FIG. 20 is an end-section view, to scale, of a first extrusion barrel 1100a having an inner diameter of 1", an outer diameter of 2", and a wall thickness of 0.5", and a second extrusion barrel 1100b having an inner diameter of 1", an outer diameter of 1.240", and a wall thickness of 0.120". Assuming barrels 1100a and 1100b are made from the same material, extrusion barrel 1100b will have a relatively higher heat transfer rate through its barrel wall than extrusion barrel 1100a.

An extrusion barrel 1100 having relatively high heat transfer rate through the barrel wall may have one or more advantages. For example, an increased thermal transfer rate allows more heat to be transferred through the barrel wall for a given unit of time. Accordingly, more heat per unit time can be transferred to the plastic material being conveyed through the extrusion barrel. Thus, it follows that the plastic material needs to spend less time in the extrusion barrel to have the necessary amount of heat transferred to it to melt the plastic material and/or less shear heating is required. As a consequence, if the material is liquefied or the feed material is of a size that seats within the threads of a screw, the extrusion screw 1300 may be rotated at a higher speed (i.e. a higher RPM) to convey the material through the extrusion barrel in a shorter amount of time without incurring excessive pressures that inhibit the use of thinner walled barrels as disclosed herein.

If the extrusion screw 1300 operates at a higher RPM, this may in turn allow a lower ratio gearbox to be used (as the operating RPM of the screw 1300 may be closer to the efficient operating RPM of the output shaft of the screw drive motor 1030). As a lower ratio gearbox typically has a higher overall mechanical efficiency than a higher ratio gearbox, all else being equal, increasing the operating speed of the extrusion screw 1300 may be expected to increase the overall efficiency of extruder 1000. For example, typical extrusion or injection molding machines may couple the drive motor to the screw using a gearbox with a ratio of about 40:1 or 60:1. Gearboxes with these reduction ratios typically have a mechanical efficiency of about 62% to 68%. In contrast, gearbox 1040 may have a ratio of about 10:1 or 20:1. Gearboxes with these lower reduction ratios typically have a higher mechanical efficiency, e.g. from about 79% to 86%.

Also, increasing the operating speed of the extrusion screw 1300 may also allow a higher speed, lower power motor 1030 to be used, which may have a lower operating and/or capital cost as compared to a higher power and/or lower speed motor.

Based on the increased heat transfer rate through the wall of barrel 1100 (and the corresponding increase in the amount of heat that can be supplied to the conveyed material from the barrel heaters), and the increased operating speed of the extrusion screw (and the corresponding increase in gearbox and/or drive motor efficiency), in some configurations at least 60% of the total energy provided to extruder 1000 may be used to produce heat that is used to increase the temperature of the conveyed plastic material. In alternative configurations, at least 70%, 75%, 80%, 85%, 90%, or at least 95% of the total energy provided to extruder 1000 may be used to produce heat. For example, 70%, 75%, 80%, 85%, 90%, or at least 95% of the total energy provided to extruder 1000 may be used to power one or more heating elements and the remainder may be used to power the screw motor.

Extrusion barrel 1100 is preferably made from a material that has a relatively high thermal conductivity, such as copper or aluminum. Using such a material may further increase the heat transfer rate through the barrel wall, which may provide or enhance one or more of the advantages noted above.

One possible disadvantage of providing an injection barrel having a relatively thin wall and/or made from a relatively high thermal conductivity material is that the strength (e.g. pressure rating) of the extrusion barrel may be lower than if the barrel were provided with a relatively thick wall and/or made from a material having a higher strength, but a relatively lower thermal conductivity. Thus, the maximum operating pressure within the extrusion barrel 1100 may relatively low, particularly in comparison to barrels used in typical extrusion or injection molding machines.

The strength of extrusion barrel 1100 may be increased using one or more approaches, which may be used alone or in combination. For example, the extrusion barrel may be made from a stronger, but less thermally conductive material, such as steel, stainless steel, or the like. In some embodiments, the extrusion barrel may be made from a very high strength material (e.g. a high-strength nickel alloy such as Monel™, available from Special Metals Corporation of New Hartford, N.Y., U.S.A.). If the material used to make barrel 1100 has a sufficiently high strength, the reduction in the necessary wall thickness to provide a desired pressure rating may mitigate or offset the decreased thermal conductivity of the material.

Figure 5:
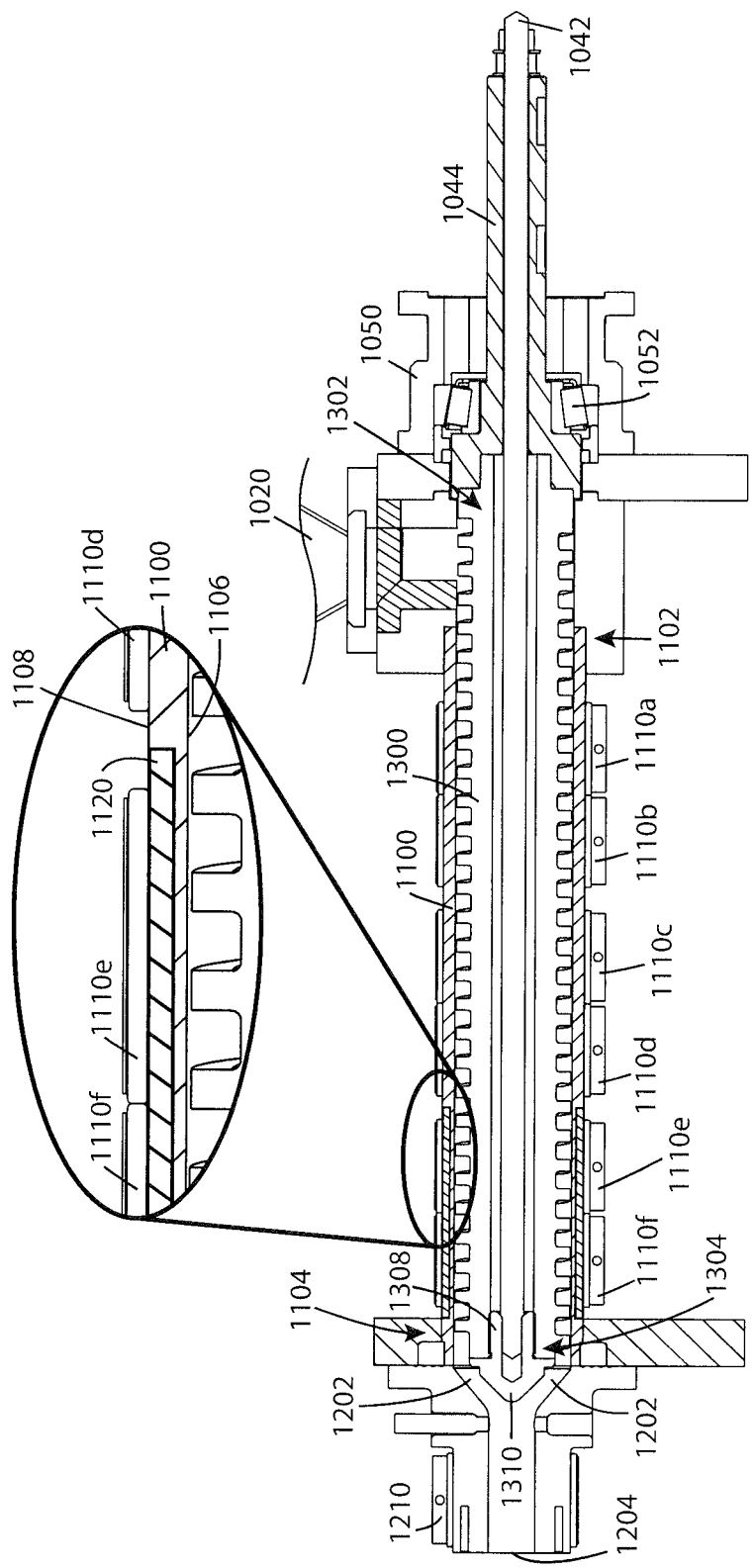
FIG. 5 is a cross-section view of an extruder barrel in accordance with another embodiment, with portions of the barrel walls being reinforced.
Figure 8:
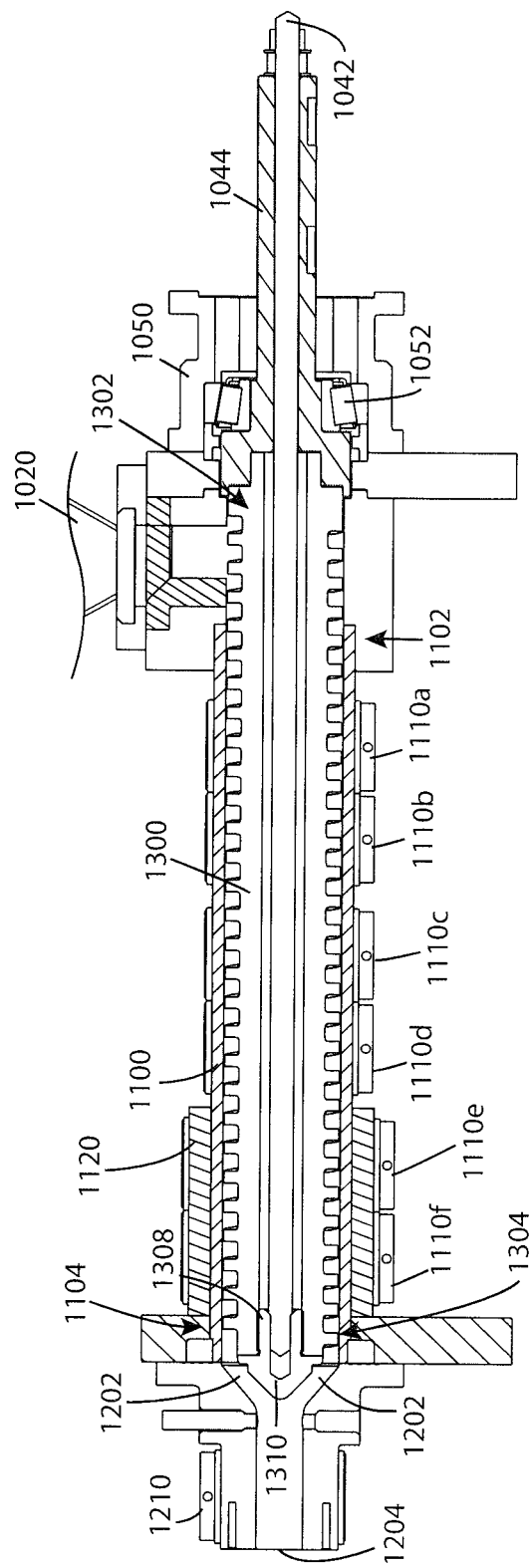
FIG. 8 is a cross-section view of an extruder barrel in accordance with another embodiment, with a reinforcing band at the outlet end of the barrel.

Alternatively, or additionally, as shown in FIG. 5, extrusion barrel 1100 may be provided with one or more reinforcing bands of material 1120 positioned against all or a portion of the outer circumference of the barrel. In the illustrated example, reinforcing band 1120 is provided proximate the output end 1104 of the extrusion barrel, where the internal pressure is expected to be relatively high (generally speaking, during operation of the extruder 1000 the internal pressure within the extrusion barrel 1100 increases as the plastic material is conveyed from the feed throat or input end 1102 to the output end 1104). In the illustrated embodiment, a portion of the outer surface 1108 of the extrusion barrel is recessed where the reinforcing band 1120 is provided, so that the outer diameter of the reinforcing band is substantially the same as the diameter of the outer surface 1108 in the un-reinforced portion. Alternatively, as shown in FIG. 8, the extrusion barrel 1100 may have a substantially constant wall thickness, and the inner diameter of the reinforcing band 1120 may be substantially equal to the diameter of the outer surface 1108.

Alternatively, or additionally, the wall thickness of the extrusion barrel may vary along the length of the barrel. Accordingly, the thicker portions of the barrel wall may provide increased strength, at the expense of a decreased heat transfer rate through the thicker barrel wall.

Figure 6:
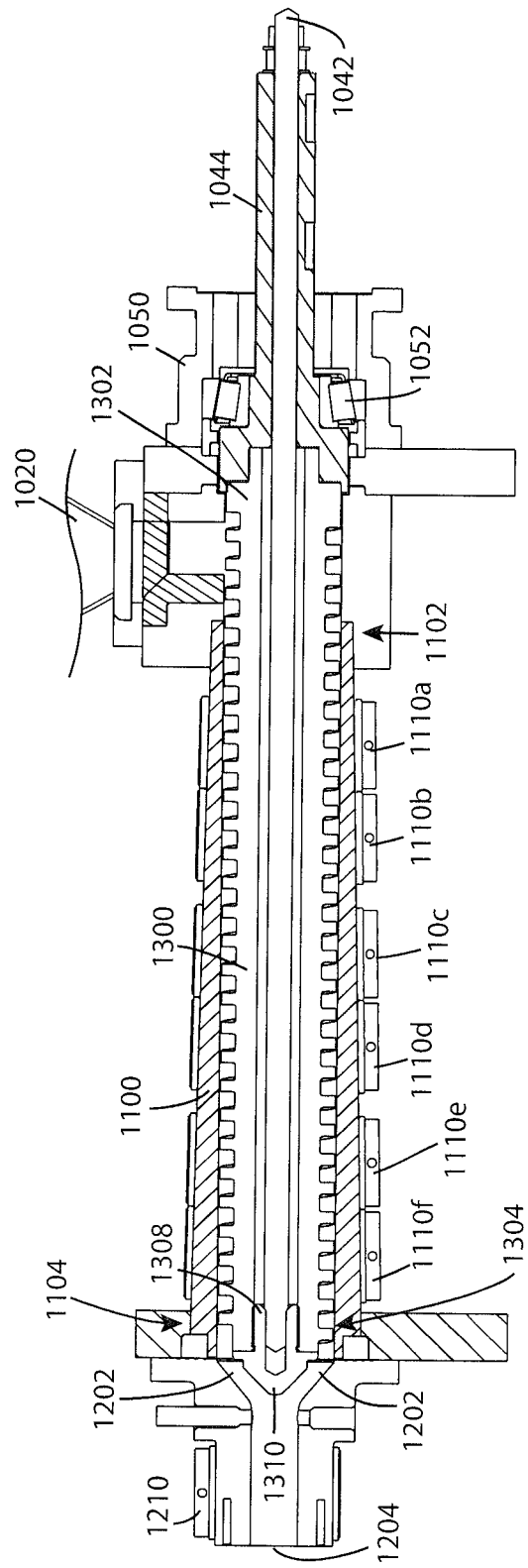
FIG. 6 is a cross-section view of an extruder barrel in accordance with another embodiment, with the wall thickness increasing from the inlet end to the outlet end of the barrel.

For example, as shown in FIG. 6, extrusion barrel 1100 may have a substantially constant inner diameter, and a uniformly increasing wall thickness from the input end 1102 to the output end 1104. In other words, the radial distance between the axial centerline of the barrel 1100 and the inner surface 1106 of the barrel may be substantially constant, and the radial distance between the inner surface 1106 and the outer surface 1108 of the barrel wall may increase along the length of the barrel.

Figure 7:
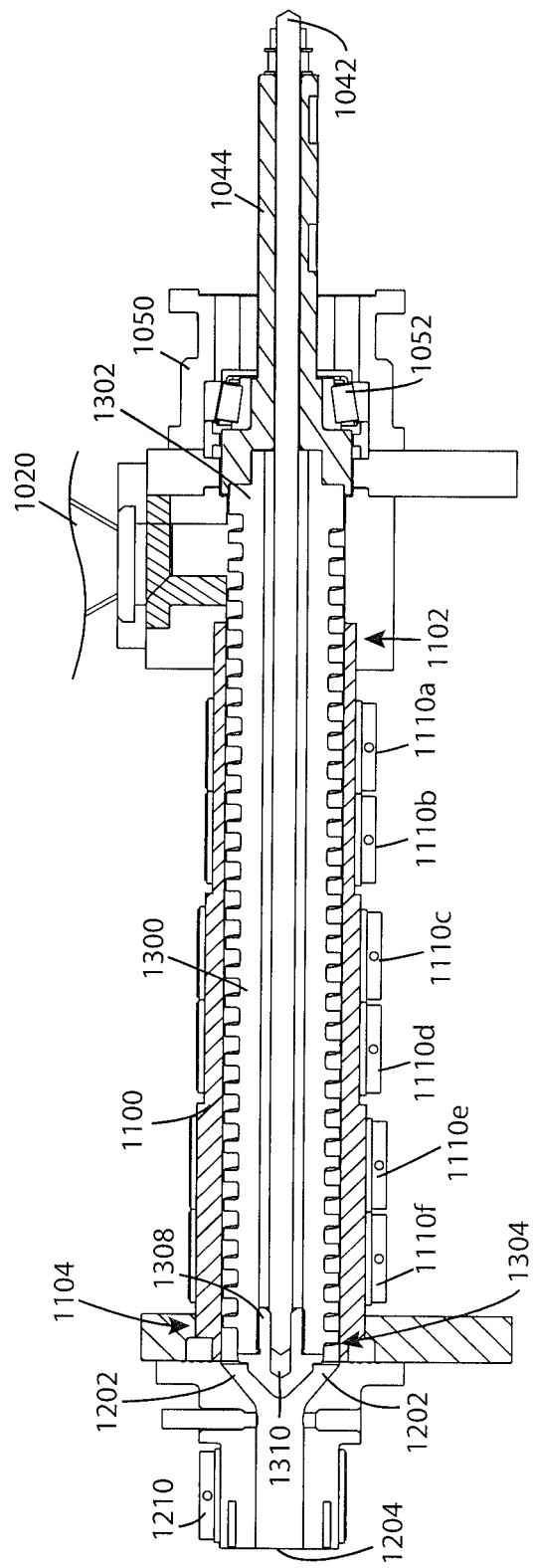
FIG. 7 is a cross-section view of an extruder barrel in accordance with another embodiment, with the wall thickness increasing step-wise from the inlet end to the outlet end of the barrel.

Alternatively, as shown in FIG. 7, extrusion barrel 1100 may have a substantially constant inner diameter, and a wall thickness that increases step-wise from the input end 1102 to the output end 1104.

Figure 9:
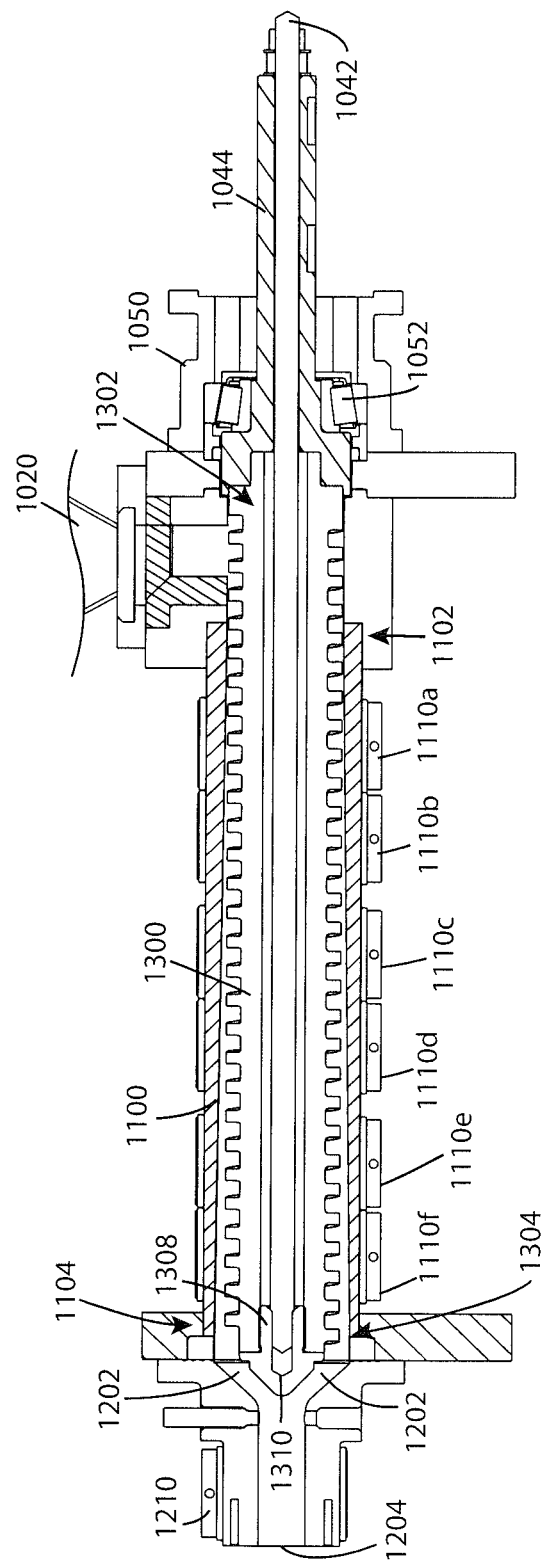
FIG. 9 is a cross-section view of an extruder barrel in accordance with another embodiment, with the wall thickness increasing from the inlet end to the outlet end of the barrel, and with the inner walls of the barrel diverging from the inlet end to the outlet end of the barrel.
Figure 10:
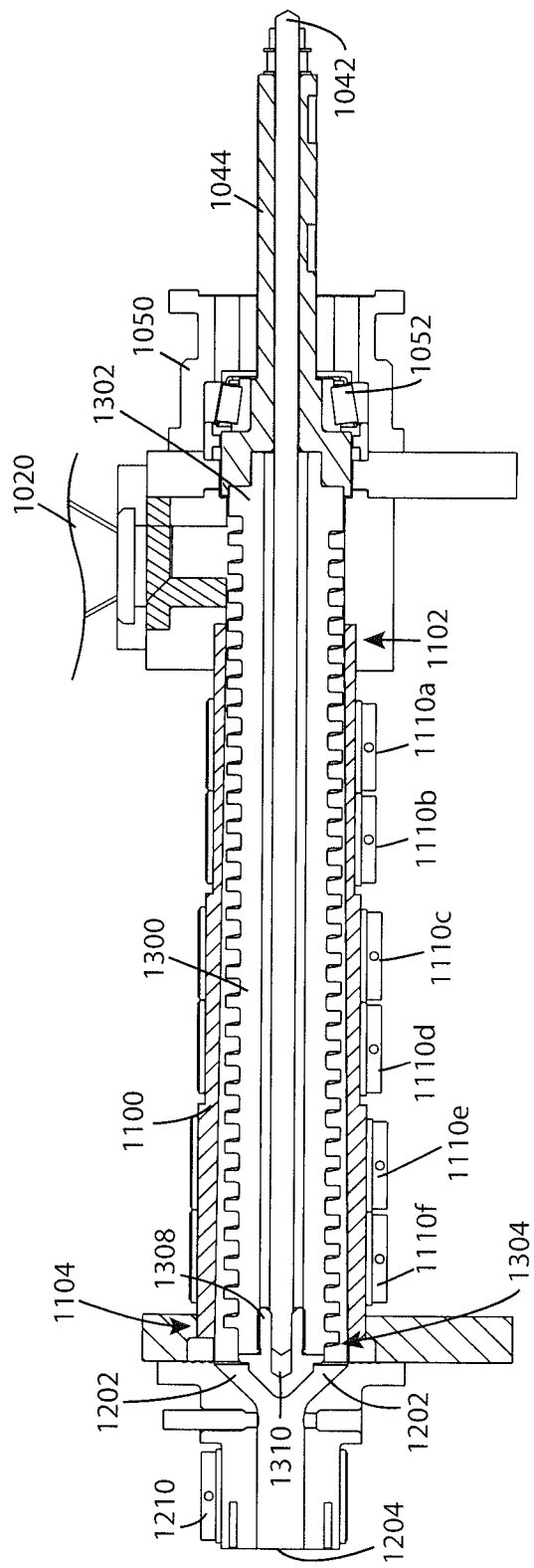
FIG. 10 is a cross-section view of an extruder barrel in accordance with another embodiment, with the wall thickness increasing step-wise from the inlet end to the outlet end of the barrel, and with the inner walls of the barrel diverging from the inlet end to the outlet end of the barrel.

In the embodiments illustrated in FIGS. 4 to 8, the extrusion barrel 1100 has a substantially constant inner diameter. In one or more alternative embodiments, the inner diameter of the extrusion barrel 1100 may increase along its length. In other words, the radial distance between the axial centerline of the barrel 1100 and the inner surface 1106 of the barrel may increase from the input end 1102 to the output end 1104. It will be appreciated that any such barrel may use one or more reinforcing members as disclosed here. FIG. 9 illustrates an extrusion barrel 1100 having an increasing inner diameter and a uniformly increasing wall thickness, and FIG. 10 illustrates an extrusion barrel 1100 having an increasing inner diameter and step-wise increases in wall thickness. While not shown, it will be appreciated that an extrusion barrel 1100 may alternatively have an increasing inner diameter and a constant wall thickness.

Extrusion Screw

Figure 11:
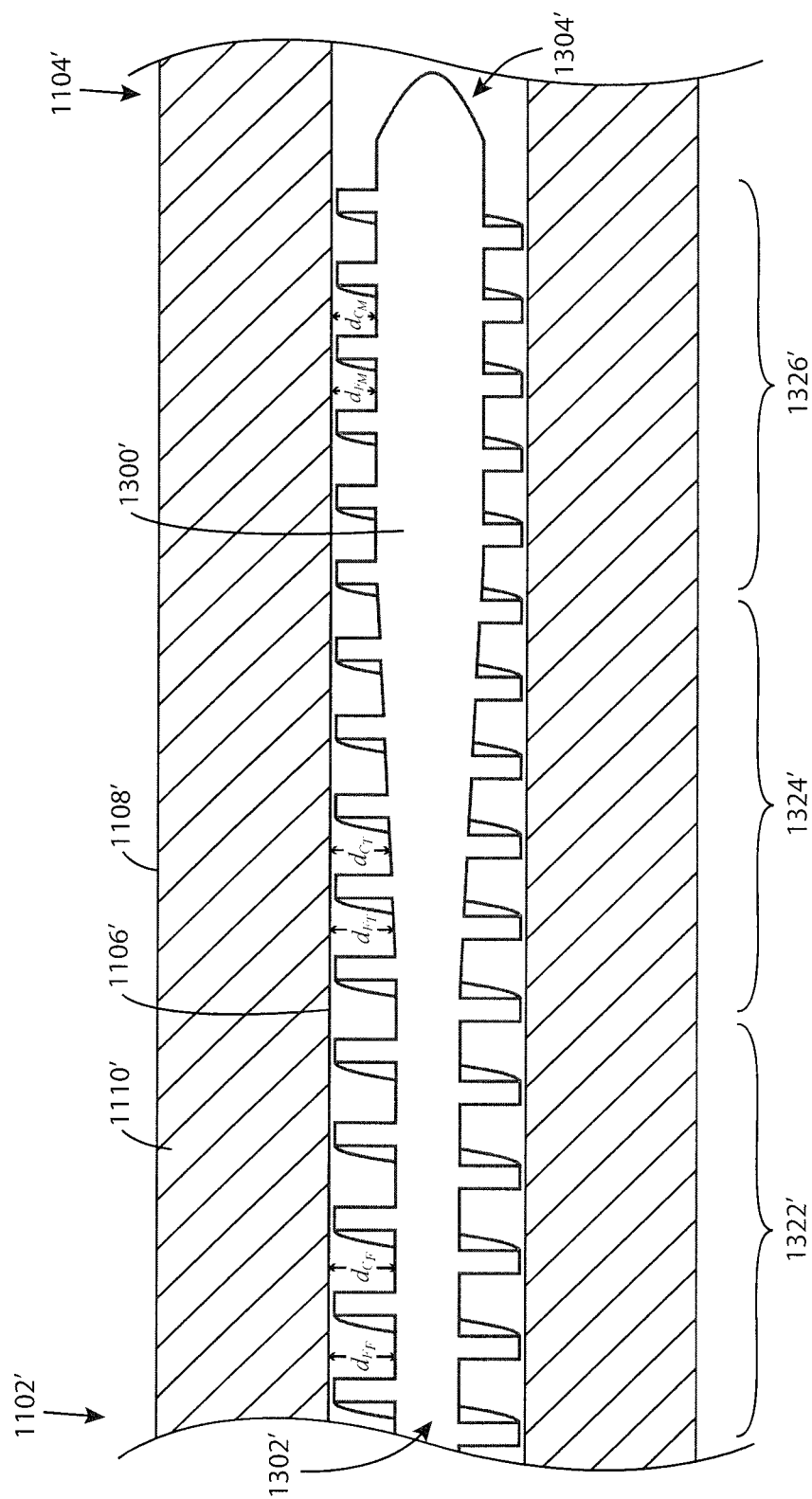
FIG. 11 is a cross-section view of a prior art injection barrel and screw.

FIG. 11 illustrates an extrusion screw and barrel that may be representative of those used in typical extrusion or injection molding machines. Notably, the injection screw 1300' has a variable profile along its length, which may be characterized generally as a feed section 1322', a transition or mixing section 1324', and a metering section 1326'. As shown, the flight depth $d_{F_F}$ in the feed section 1322' (flight depth being defined as the radial distance between the outer diameter of the screw flight 1308 and the outer diameter of the screw shaft 1306) is substantially constant. However, the flight depth $d_{F_T}$ in the transition or mixing section 1324' decreases along the length of this section. The flight depth $d_{F_M}$ in the metering section 1326' is substantially constant, but is less than the flight depth $d_{F_F}$ in the feed section.

Such a screw 1300', when used with an extrusion barrel 1100' having a constant inner diameter, results in the channel depth $d_{C_F}$ in the feed section 1322' (channel depth being defined as the radial distance between the inner surface of the barrel and the outer diameter of the screw shaft) being substantially constant, the channel depth $d_{C_T}$ in the transition or mixing section 1324' decreasing along the length of this section, and the channel depth $d_{C_M}$ in the metering section 1326' is substantially constant, but is less than the channel depth $d_{F_F}$ in the feed section. Such an arrangement effectively reduces the annular volume between the screw and the inner surface of the barrel along the length of the barrel between the input end 1102' and the output end 1104'. This reduction in volume increases the compression of the material being extruded as it is conveyed along the barrel. In other words, the screw 1300' shown in FIG. 110 has a volumetric compression ratio (defined as the channel depth in the metering section divided by a channel depth in the feed or transition section of the extruder) of less than one. As discussed previously, such an arrangement may increase the amount of heat imparted to the conveyed plastic material by shear heating.

Also of note, the wall of the barrel 1100' is relatively thick. This is typically a result of the relatively high pressure required to effectively melt the material being conveyed by shear heating, which in turn requires a barrel having a sufficient strength and/or pressure rating to withstand the expected operating pressures. As noted above, all else being equal a thicker barrel wall reduces the heat transfer rate through the barrel wall, which reduces the ability and/or efficiency of supplying heat to the conveyed material via one or more barrel heaters.

Figure 12:
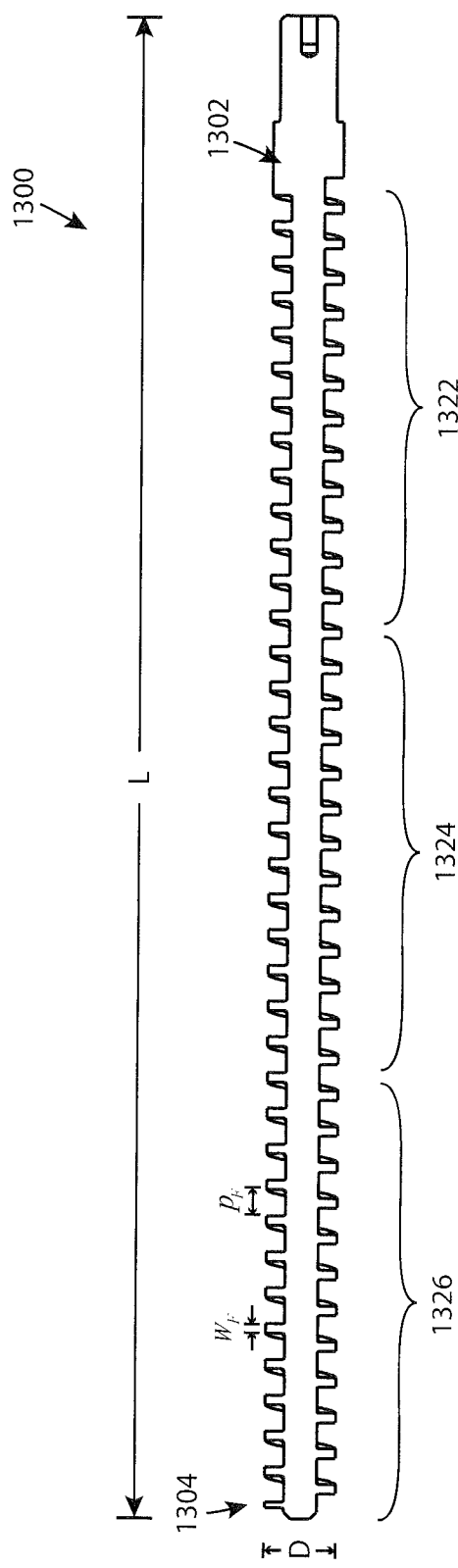
FIG. 12 is a cross-section view of an extrusion screw in accordance with one embodiment.

FIG. 12 illustrates a preferred extrusion screw 1300 according to this disclosure that may be used with an extruder 1000 in accordance with at least one embodiment disclosed herein. Screw 1300 has a diameter D measured from the outer radial extents of the flight. In contrast to extrusion screws that may be representative of those used in typical extrusion or injection molding machines (e.g. as shown in FIG. 11), the extrusion screw in FIG. 12 has as constant or generally constant profile along its effective length, which may be characterized generally as a feed section 1322, a transition or mixing section 1324, and a metering section 1326. As shown, the flight depths $d_{F_F}$, $d_{F_T}$, and $d_{F_M}$ in the feed section 1322, transition or mixing section 1324, and metering section 1326, respectively, may be equal or substantially equal.

Such a screw 1300, when used with an extrusion barrel 1100 having a constant inner diameter, results in a constant channel depth $d_C$ along the entire effective length of the screw. Such an arrangement provides an effectively constant annular volume between the screw and the inner surface of the barrel along the length of the barrel. Accordingly, the screw shown in FIG. 12 may be characterized as having a volumetric compression ratio of one. Also, if the screw shown in FIG. 12 were used with an extrusion barrel 1100 having an increasing inner diameter, the channel depth $d_C$ would be increasing along the length of the barrel, resulting in a volumetric compression ratio of greater than one.

Other aspects of extrusion screw 1300 are the flight pitch $p_F$, being the axial distance along the screw between crest of one thread and the next, and the flight length $L_F$ (which may alternatively be referred to as the screw lead), being the axial distance along the screw covered by one complete rotation (i.e. 360°) of the screw. (It will be appreciated that for a single-start screw, the flight length and flight pitch are the same.) The screw 1300 illustrated in FIG. 12 has a substantially constant flight pitch $p_F$ along its length.

Another aspect of extrusion screw 1300 is the flight width $W_F$ (which may alternatively be referred to as the land length), being the axial thickness of a screw thread. The screw 1300 illustrated in FIG. 12 has a substantially constant flight width $W_F$ along its length.

Suitable dimensions for screw 1300 are provided below in Table 1:

TABLE 1

| Screw diameter | Flight pitch $p_F$ | Flight width $W_F$ | Flight depth $d_F$ |
|---|---|---|---|
| 1" | 0.25" to 0.5" | 0.125" to 0.250" | 0.2" to 0.5" |
| 2" | 0.25" to 0.5" | 0.125" to 0.375" | 0.2" to 0.5" |
| 6" | 0.25" to 0.5" | 0.125" to 0.500" | 0.2" to 0.5" |

Preferably, the flight pitch $p_F$ and the flight width $W_F$ are substantially constant for screw 1300. However, the flight depth $d_F$ may be increased along the length of the screw 1300 from the input end 1302 to the output end 1304, which may assist in providing a volumetric compression ratio of less than or equal to one.

Another aspect of extrusion screw 1300 is the ratio of its length to its outer diameter, which may be referred to as its L/D ratio. Screw 1300 preferably has an L/D ration of 24:1. That is, a screw 1300 with a 1" diameter is preferably 24" long, and a screw 1300 with a 2" diameter is preferably 48" long. L/D may range from about 10:1 to about 30:1.

Extrusion Barrel and Extrusion Screw

For an extrusion screw and barrel used in typical extrusion or injection molding machines, the radial gap between the outer screw flight diameter and the inner surface of the barrel is relatively small, for example, between about 0.001" and 0.002". This relatively stringent tolerance may be required to maintain an increased compression of the material being extruded (e.g. to facilitate shear heating), and/or to prevent mixing at the barrel wall, which may be considered undesirable.

In contrast, in extruder 1000, the radial gap between the outer diameter of screw 1300 and the inner surface 1106 of extrusion barrel 1100 is preferably between 0.001" to 0.08", more preferably from between 0.005" and 0.060", still more preferably from between 0.005" and 0.040", and most preferably from between 0.020" and 0.040". These reduced tolerances may result in decreased manufacturing, assembly, operating, and/or repair costs for extruder 1000.

Figure 13:
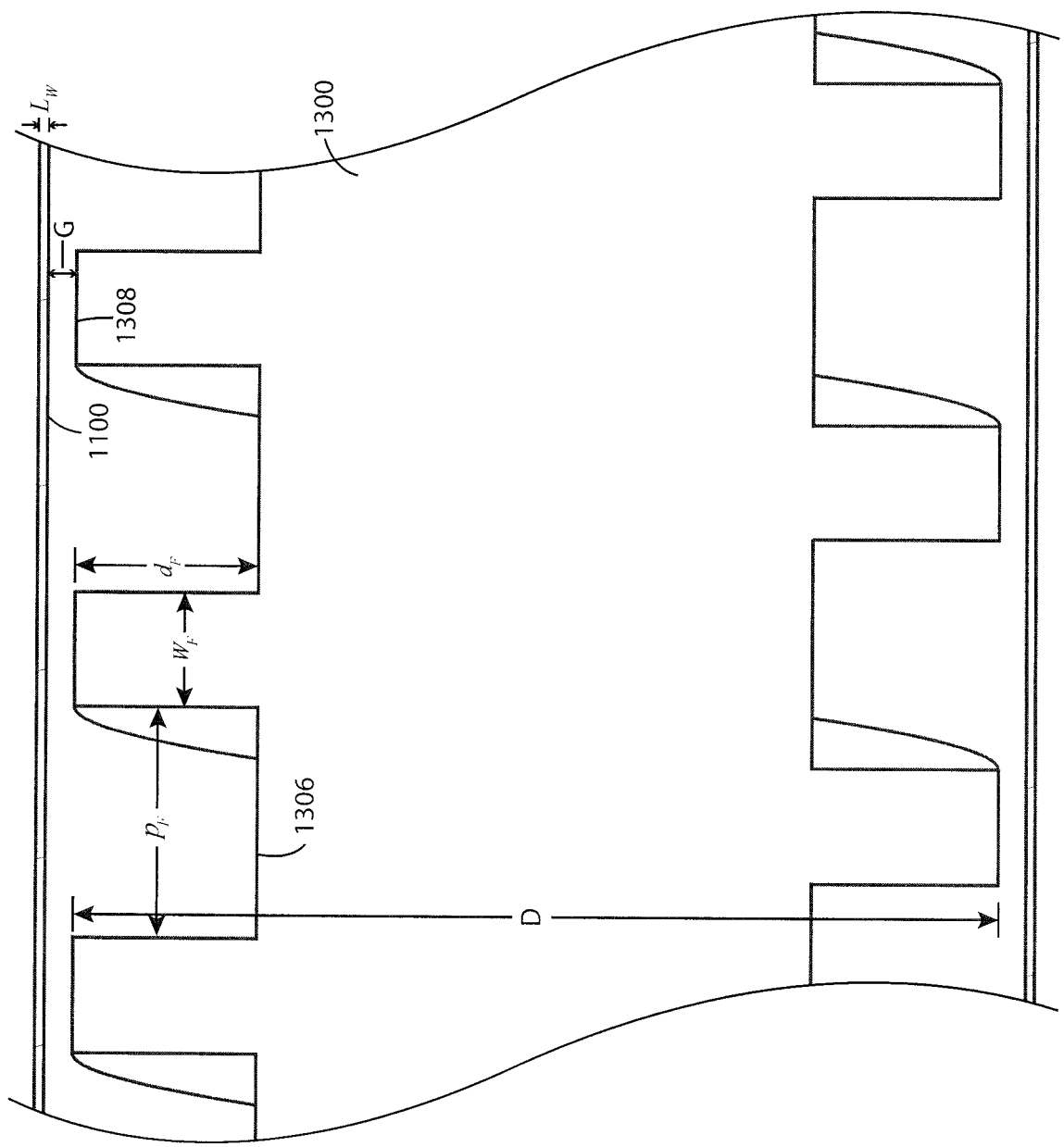
FIG. 13 is a cross-section view, to scale, of an extrusion screw in a thin-walled extrusion barrel in accordance with one embodiment.

Examples of various extrusion screw and barrel designs are illustrated in FIGS. 13 to 19. FIG. 13 is a cross-section view, to scale, of an extrusion screw 1300 in a thin-walled extrusion barrel 1100 having a uniform thickness and parallel inner walls, where: the screw diameter is 1"; the flight pitch $p_F$ is 0.25"; the flight width $W_F$ is 0.125"; the flight depth $d_F$ is 0.200" (constant); the barrel wall to screw gap G is 0.030"; and the barrel wall thickness $L_W$ is 0.010".

Figure 14:
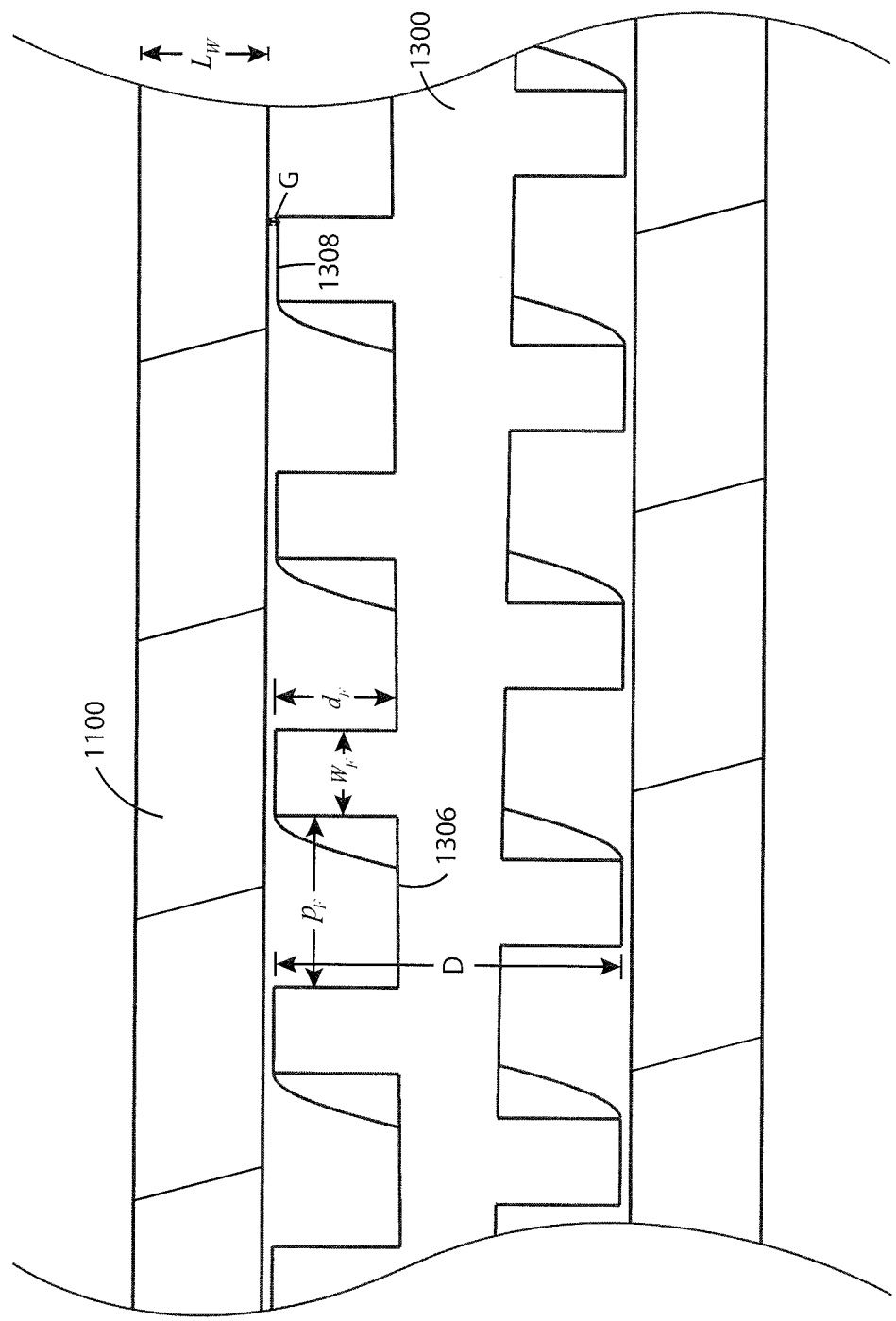
FIG. 14 is a cross-section view, to scale, of an extrusion screw in a thin-walled extruder barrel in accordance with another embodiment.

FIG. 14 is a cross-section view, to scale, of an extrusion screw 1300 in a thin-walled extrusion barrel 1100 having a uniform thickness and parallel inner walls, where: the screw diameter is 1"; the flight pitch $p_F$ is 0.5"; the flight width $W_F$ is 0.25"; the flight depth $d_F$ is 0.500" (increasing towards outlet end 1302); the barrel wall to screw gap G is 0.030"; and the barrel wall thickness $L_W$ is 0.375".

Figure 15:
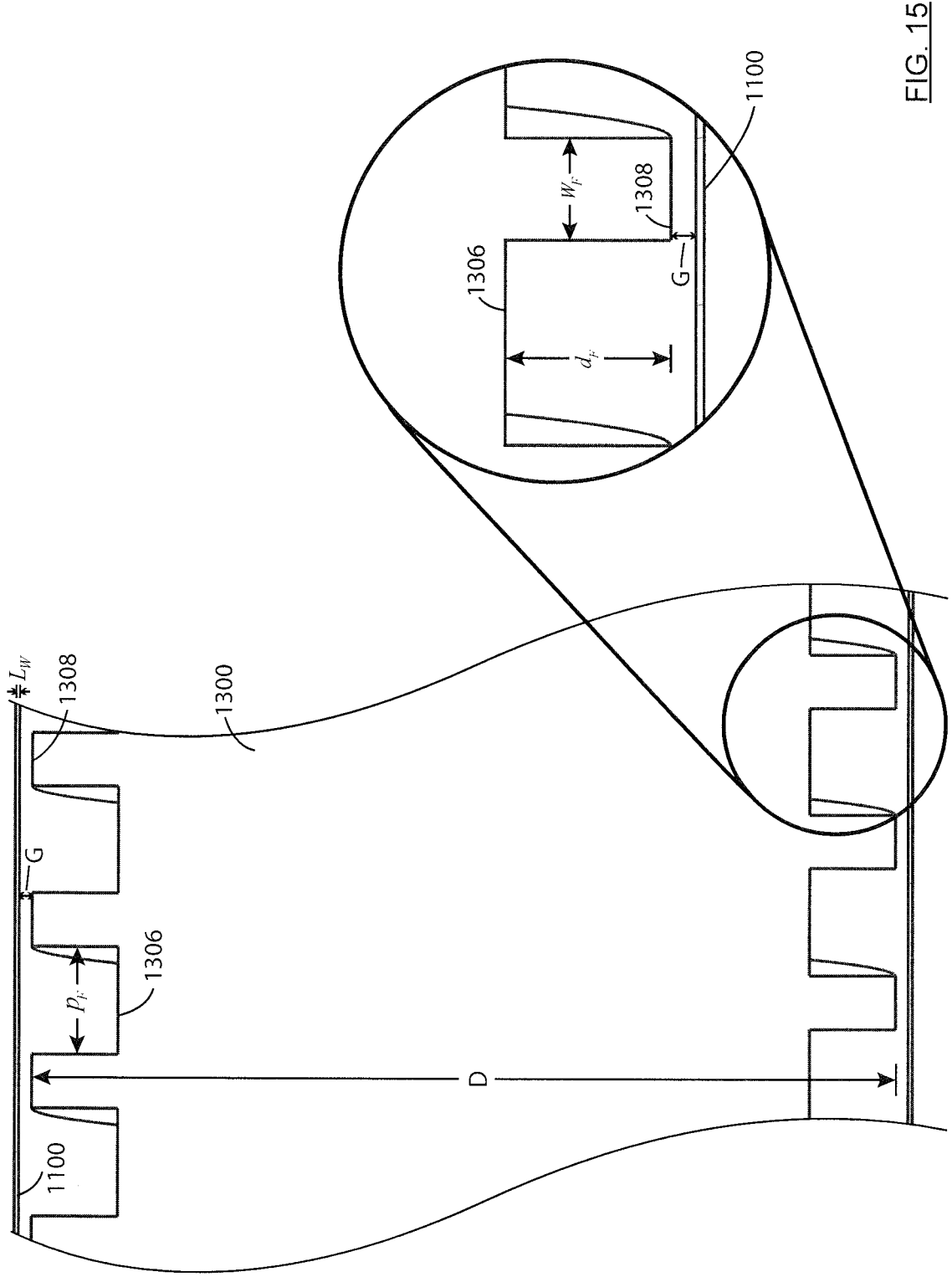
FIG. 15 is a cross-section view, to scale, of an extrusion screw in a thin-walled extruder barrel in accordance with another embodiment.

FIG. 15 is a cross-section view, to scale, of an extrusion screw 1300 in a thin-walled extrusion barrel 1100 having a uniform thickness and parallel inner walls, where: the screw diameter is 2"; the flight pitch $p_F$ is 0.25"; the flight width $W_F$ is 0.125"; the flight depth $d_F$ is 0.200" (constant); the barrel wall to screw gap G is 0.030"; and the barrel wall thickness $L_W$ is 0.010".

Figure 16:
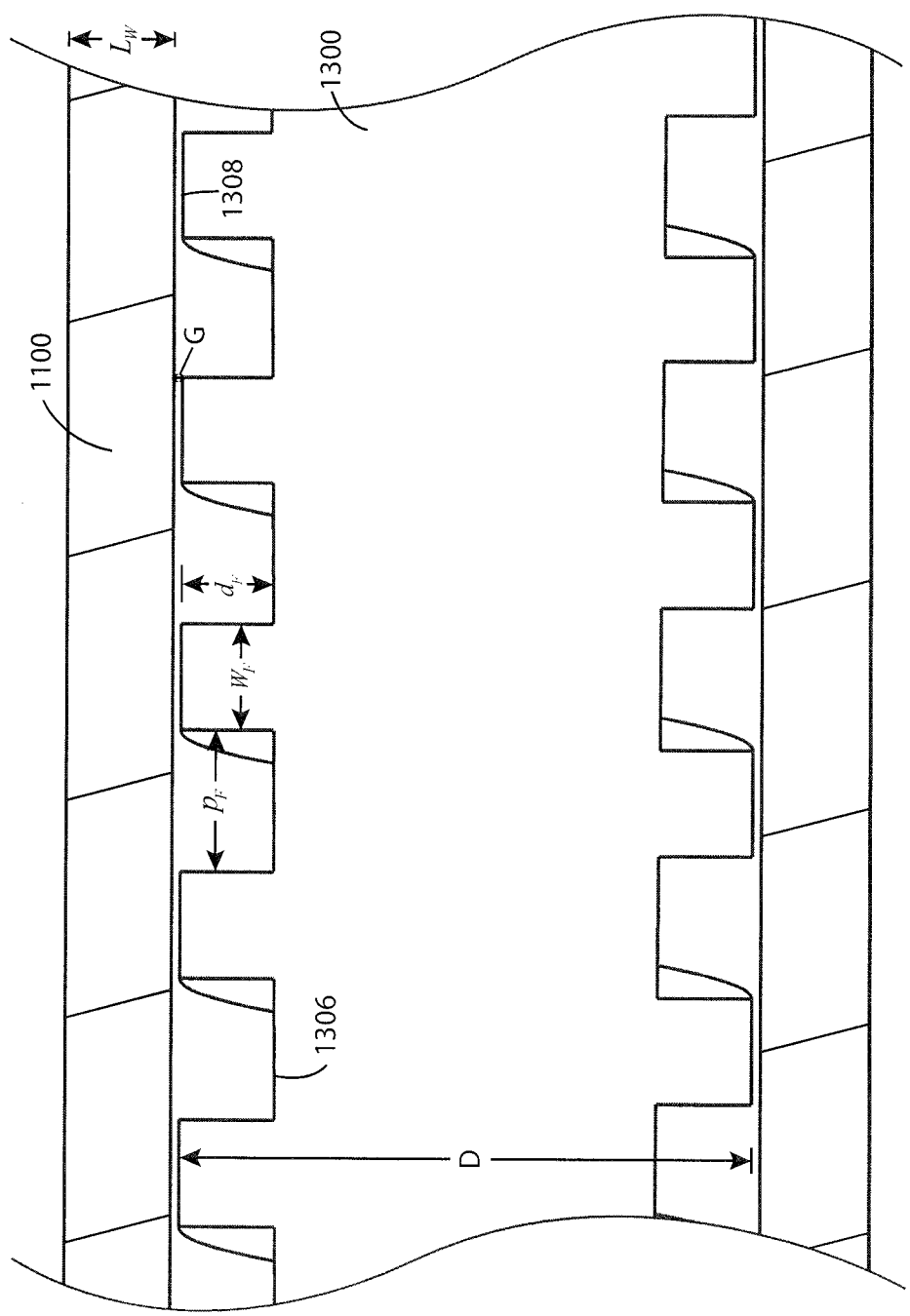
FIG. 16 is a cross-section view, to scale, of an extrusion screw in a thin-walled extruder barrel in accordance with another embodiment.

FIG. 16 is a cross-section view, to scale, of an extrusion screw 1300 in a thin-walled extrusion barrel 1100 having a uniform thickness and parallel inner walls, where: the screw diameter is 2"; the flight pitch $p_F$ is 0.5"; the flight width $W_F$ is 0.375"; the flight depth $d_F$ is 0.500" (increasing towards outlet end 1302); the barrel wall to screw gap G is 0.030"; and the barrel wall thickness $L_W$ is 0.375".

Figure 17:
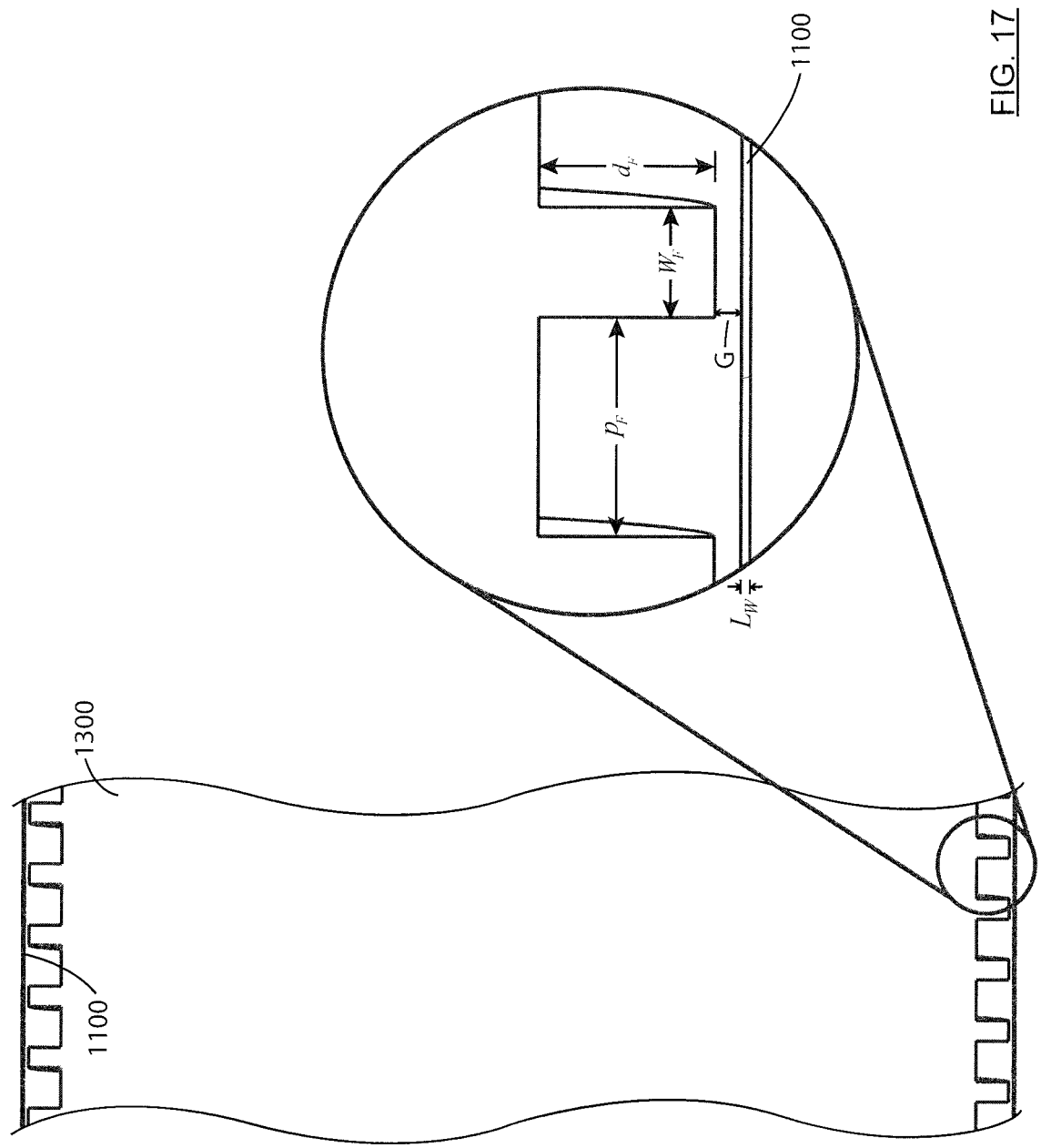
FIG. 17 is a cross-section view, to scale, of an extrusion screw in a thin-walled extruder barrel in accordance with another embodiment.

FIG. 17 is a cross-section view, to scale, of an extrusion screw 1300 in a thin-walled extrusion barrel 1100 having a uniform thickness and parallel inner walls, where: the screw diameter is 6"; the flight pitch $p_F$ is 0.25"; the flight width $W_F$ is 0.125"; the flight depth $d_F$ is 0.200" (constant); the barrel wall to screw gap G is 0.030"; and the barrel wall thickness $L_W$ is 0.010".

Figure 18:
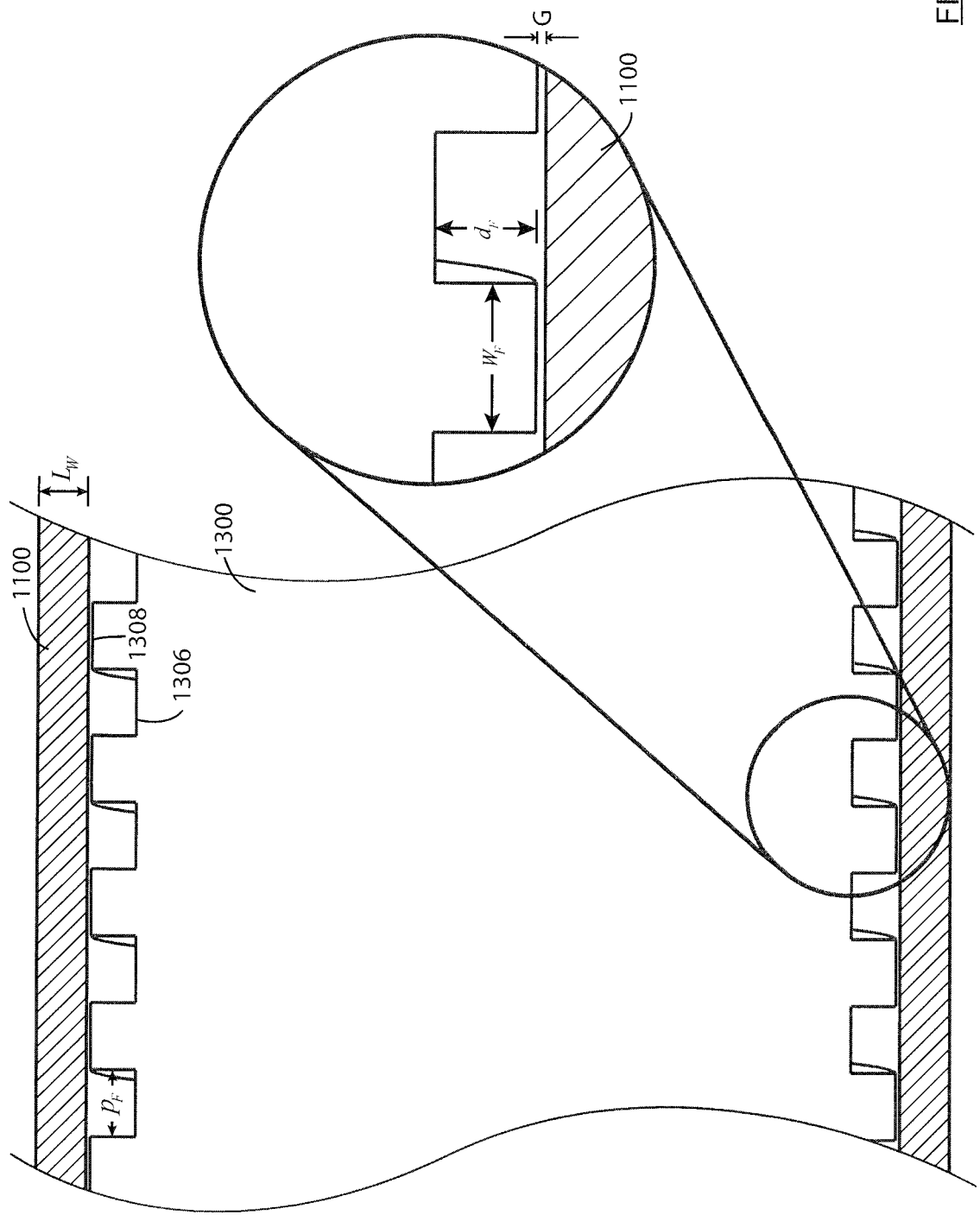
FIG. 18 is a cross-section view, to scale, of an extrusion screw in a thin-walled extruder barrel in accordance with another embodiment.

FIG. 18 is a cross-section view, to scale, of an extrusion screw 1300 in a thin-walled extrusion barrel 1100 having a uniform thickness and parallel inner walls, where: the screw diameter is 6"; the flight pitch $p_F$ is 0.5"; the flight width $W_F$ is 0.5"; the flight depth $d_F$ is 0.500" (increasing towards outlet end 1302); the barrel wall to screw gap G is 0.030"; and the barrel wall thickness $L_W$ is 0.375".

Figure 19:
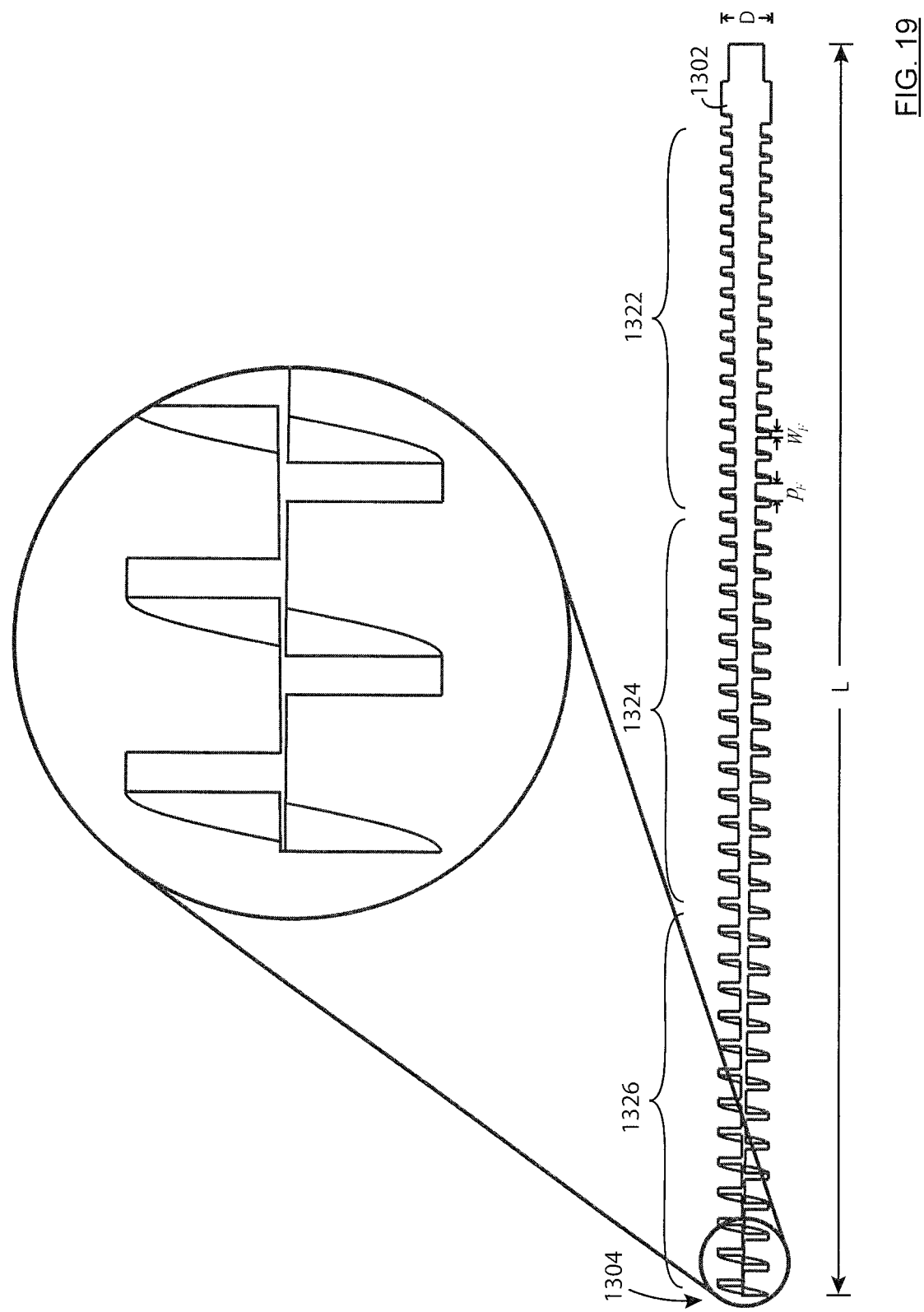
FIG. 19 is a cross-section view, to scale, of an extrusion screw in accordance with another embodiment.

FIG. 19 is a cross-section view, to scale, of an extrusion screw 1300, where: the screw diameter is 1"; the screw length is 24"; the flight pitch $p_F$ is 0.25" at the input end 1302, increasing to 0.5" at the output end 1304; the flight width $W_F$ is 0.125"; the flight depth $d_F$ is 0.200" (increasing towards outlet end 1302).

Melting Plastic in Extruder

As discussed previously, in typical extrusion or injection molding machines, the heat provided to raise the temperature of the conveyed plastic material as it passes through the extrusion or injection barrel is provided primarily by mechanical shear heating. Further, the barrel wall thickness required to contain the operating pressures required for significant shear heating may reduce the maximum heat transfer rate through the barrel wall, reducing the amount of energy that can be conveyed to the plastic material via barrel heaters. For example, in some prior art machines, approximately 90% of the total energy supplied to operate the machine may be supplied to the drive motor, with the remaining 10% being supplied to one or more barrel heaters.

In contrast, during the operation of extruder 1000, a majority, and preferably a substantial majority, of the heat provided to raise the temperature of the conveyed plastic material as it passes through the extrusion barrel is provided by non-mechanical heat sources.

For example, extruder 1000 preferably includes an extrusion barrel 1100 having relatively high heat transfer rate through the barrel wall, which increases the amount of heat barrel heaters 1110 can provide to the plastic material in a given amount of time. This may allow barrel heaters 1110 to provide at least 60%, 65%, 70%, 75%, 80%, 85%, 90%, or at least 95% of the total amount of heat provided to the conveyed material during its time in the extrusion barrel 1100, with the remaining heat being provided as a result of mechanical shear heating.

Alternatively, or additionally, extruder 1000 includes an extrusion screw 1300 configured to provide a volumetric compression ratio of greater than one. This may reduce the pressure of the plastic material within the extrusion barrel, which may result in less heat being provided as a result of mechanical shear heating, as compared with an extruder operating at a higher extrusion barrel pressure.

Alternatively, or additionally, in extruder 1000, the radial gap between the outer diameter of screw 1300 and the inner surface 1106 of extrusion barrel 1100 may be relatively high (e.g. from between 0.020" and 0.040"). Such a radial barrel gap may increase the ability of the plastic material to mix at or near the barrel wall, and/or may contribute to a reduction in the pressure of the plastic material within the extrusion barrel (e.g. by allowing more material to 'spill over' and flow between adjacent flight threads). Accordingly, such barrel gap may result in less heat being provided as a result of mechanical shear heating, as compared with an extruder having a smaller radial barrel gap.

Extruder Operating Pressure

In typical extrusion or injection molding machines, in which the conveyed plastic material is heated primarily by mechanical shear heating, the operating pressure within the extrusion/injection barrel is typically quite high. In contrast, during the operation of extruder 1000, the conveyed plastic material is heated primarily by the barrel heating elements (i.e. by non-mechanical heat sources). This may allow extruder 1000 to be operated with a much lower operating pressure within the extrusion barrel.

For example, as discussed herein extrusion screw 1300 and/or extrusion barrel 1100 may be configured to provide a volumetric compression ratio of greater than one as the material is conveyed through the extrusion barrel (i.e. the annular volume between the screw and the inner surface of the barrel per unit length of the barrel may increase along the length of the barrel). In contrast to typical machines, which are configured to compress (and thereby increase the pressure of) the conveyed material as it approaches the exit of the barrel, extruder 1000 may be configured to decompress (and thereby decrease the pressure of) the conveyed material as it approaches the exit of the barrel.

An extruder 1000 with a relatively low barrel operating pressure may have one or more advantages. For example, as discussed above, to increase the rate of heat transfer through the extrusion barrel wall, extrusion barrel 1100 preferably has a relatively thin wall thickness. Operating with a lower barrel operating pressure may allow for a thinner barrel wall to be used, as the required strength of the barrel is lower.

In some examples, extruder 1000 may be configured to operate with a barrel operating pressure of less than 1,000 pounds per square inch (psi), less than 750 psi, 500 psi, 400, 300 or 200 psi and above 20, 40, 50, 75, 100 or 150 psi, such as between 10 and 400 psi, or between 40 and 200 psi.

Experimental Results

Example material throughput results for an extruder according to the disclosure set out herein are shown in Table 2. The tests were conducted using a 20 melt HDPE polymer from Premier Plastics Resins of Lake Orion Mich., a 19.3:1 L/D screw with a 0.325" flight pitch, a 0.250" land (i.e. flight width), a 0.250" flight depth, and a 0.9325 inch diameter D made of 7075 T6 aluminum, a 304 stainless steel schedule 80 pipe as the extrusion barrel, a 10:1 mechanical reduction gearbox and a 3 phase 230 VAC 1 horsepower inverted duty induction screw drive motor controlled with a GS2 1P0 inverter drive from Automation direct.

Table 2 shows the flowrates obtained and the associated screw RPM, with the barrel heaters configured to provide the indicated extruder barrel temperature zones, listed from the feed section to the output or metering section of the extruder barrel. The barrel temperature zones are listed from the inlet hopper to the outlet end of the nozzle, with four temperature zones along the barrel length and one zone on the output nozzle.

TABLE 2

| Test No. | Barrel temperature zones (° C.) | Screw drive (RPM) | Average flowrate (pounds of extruded plastic per hour) |
|---|---|---|---|
| 1 | 235/250/250/250/250 | 85 | 6.0 |
| 2 | 235/250/250/250/250 | 150 | 13.2 |
| 3 | 235/250/250/250/250 | 85 | 7.4 |
| 4 | 235/250/250/250/250 | 150 | 16.5 |
| 5 | 235/275/275/275/275 | 170 | 17.6 |
| 6 | 235/275/275/275/275 | 175 | 21.35 |
| 7 | 235/275/275/275/275 | 175 | 17.95 |
| 8 | 235/275/275/275/275 | 175 | 22.1 |
| 9 | 235/275/275/275/275 | 175 | 20.4 |
| 10 | 235/275/275/275/275 | 175 | 22.8 |
| 11 | 235/275/275/275/275 | 175 | 19.5 |
| 12 | 235/275/275/275/275 | 175 | 18.43 |
| 13 | 235/275/275/275/275 | 175 | 22.82 |
| 14 | 235/275/275/275/275 | 175 | 22.31 |
| 15 | 250/285/285/285/285 | 175 | 22.55 |
| 16 | 250/285/285/285/300 | 175 | 19.75 |

Notes:
For tests 3 and 4, springs that control the down pressure of the feed plate at the inlet to the screw were "backed off" or loosened as compared to tests 1 and 2;
For tests 6 to 14, the barrel zone temperatures were adjusted while holding screw RPM constant;
Tests 7 and 11 were conducted using a spring-loaded aluminum insert Extruder Control Based of Screw RPM v Temperature In accordance with another aspect of this disclosure, which may be used with one or more of the aspects of an extruder and/or mold disclosed herein, the operating speed of extruder screw 1300 may be adjusted based on a temperature of the flowable material flowing through and/or being output by the extruder. This aspect may be used by itself or with any one or more other aspects of extruder 1000 disclosed herein.

In accordance with this aspect, the temperature of the material is increased prior to increasing the speed of rotation of the screw. For example, prior to increasing the screw RPM, the barrel zone temperature(s) are increased. Accordingly, more power may be provided to some or all of the barrel heaters for a period of time prior to increasing the RPM of the screw. The time delay may be selected, based on inter alia the thermal conductivity of the barrel and the desired increase in screw speed. The time delay may be from 3 to 60 seconds, 10 to 50 seconds, 15 to 45 seconds, or 20 to 40 seconds.

Increasing the temperature of the material prior to increasing the screw RPM may assist in maintaining a relatively low barrel operating pressure, as increasing the temperature of the material may lower its viscosity prior to subjecting the material to increased mechanical force from the increased screw RPM. Maintaining a relatively low barrel operating pressure may reduce the stress imposed on the material during extrusion, and/or allow the use of a more thermally conductive barrel such as copper or aluminum.

Conversely, the screw RPM may be decreased and the barrel zone temperature(s) may then be decreased. Accordingly, less power may be provided to some or all of the barrel heaters for a period of time prior to decreasing the RPM of the screw. The time delay may be selected, based inter alia on the thermal conductivity of the barrel and the desired decrease in screw speed. The time delay may be from 3 to 60 seconds, 10 to 50 seconds, 15 to 45 seconds, or 20 to 40 seconds.

Figure 27:
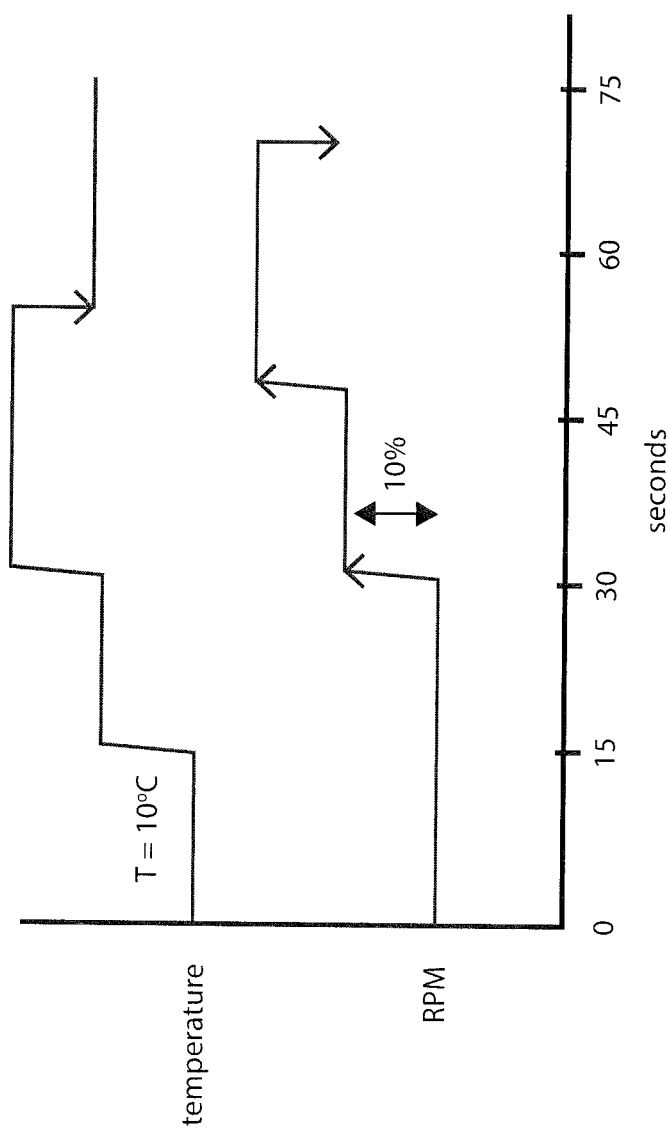
FIG. 27 is a schematic example plot of both temperature and screw speed versus time.

Decreasing the temperature of the material prior to decreasing the screw RPM may prevent the material from unwanted thermal degradation, as decreasing the screw RPM may increase the time it takes for the material to travel through the barrel (i.e. material residence time). If the screw RPM is decreased prior to decreasing the barrel temperature, the material may be exposed to a barrel temperature that is too high for the expected increased residence time based on the lower screw RPM and may result in burning or degradation of the material. As exemplified in FIG. 27, in response to a desire to increase (or decrease) the screw RPM by 10%, the barrel temperature is increased/decreased by 10° C., about 15 seconds before the screw RPM is changed.

Molding Using Extruder and Pressurization Member

In accordance with another aspect of this disclosure, which may be used with one or more of the aspects of an extruder and/or mold disclosed herein, extruder 1000 may be used to fill a mold in a molding process.

In accordance with this aspect, the plastic material output from extruder 1000, which is in a flowable or melted state, is directed into the mold at a relatively low pressure, and once the mold is full (or mostly full), a pressurization member is used to increase the pressure of the material in the mold, and/or fill the remainder of the mold with plastic material.

As discussed above, the flowable plastic material may exit the extruder 1000 at a relatively low pressure (e.g. below 1,000 psi, or below 500 psi, or between about 10 and about 200 psi) as compared to typical extrusion/injection machines. Where the output pressure of the extruder 1000 is not sufficient to properly fill a mold (e.g. a mold having a complex interior cavity), instead of increasing the operating pressure of extruder 1000 (which, as discussed previously, may negatively impact the overall efficiency of the extruder), a pressurization member other than extruder 1000 may be used to apply pressure to the material within the mold cavity to ensure proper filling of the mold. Such an arrangement allows for large and/or complex mold cavities (or at least a majority of such cavities) to be filled using the relatively low-pressure output from extruder 1000.

Figure 28A:
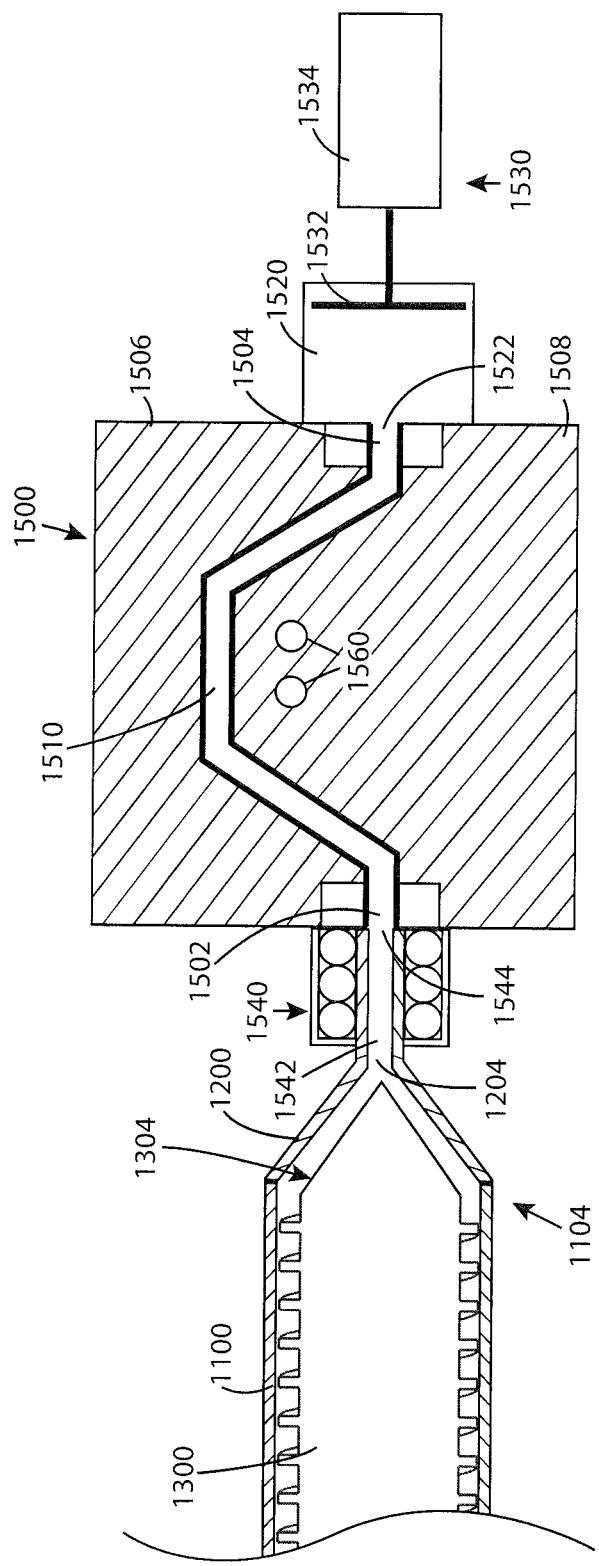

An example embodiment of this aspect will be discussed with reference to FIGS. 28A-D. As illustrated in FIG. 28A, nozzle 1200 of extruder 1000 is in fluid communication with a cavity 1510 defined by a mold 1500. More specifically, the output end 1204 of nozzle 1200 is fluidically coupled to an inlet 1542 of an isolation member 1540 (the purpose of which will be discussed further below), and an outlet 1544 of isolation member 1540 is coupled to a mold inlet port 1502. Mold inlet port 1502 provides fluid communication to mold cavity 1510, which in the illustrated example is defined by opposing mold halves 1506 and 1508.

Mold cavity 1510 is also accessible via a mold pressurization port 1504, which in the illustrated example is in fluid communication with an optional storage or overflow chamber 1520. Accordingly, flowable material exiting nozzle 1200 is able to flow into mold cavity 1510 and also into storage chamber 1520.

A pressurization member 1530 (the purpose of which will be discussed further below), is also operatively connected to mold pressurization port 1504. In the illustrated example, pressurization member 1530 includes a piston 1532 and an actuator 1534. It will be appreciated that any other pressurization member may be used including a source of pressurized fluid, a high pressure extruder and the like.

Figure 28B:
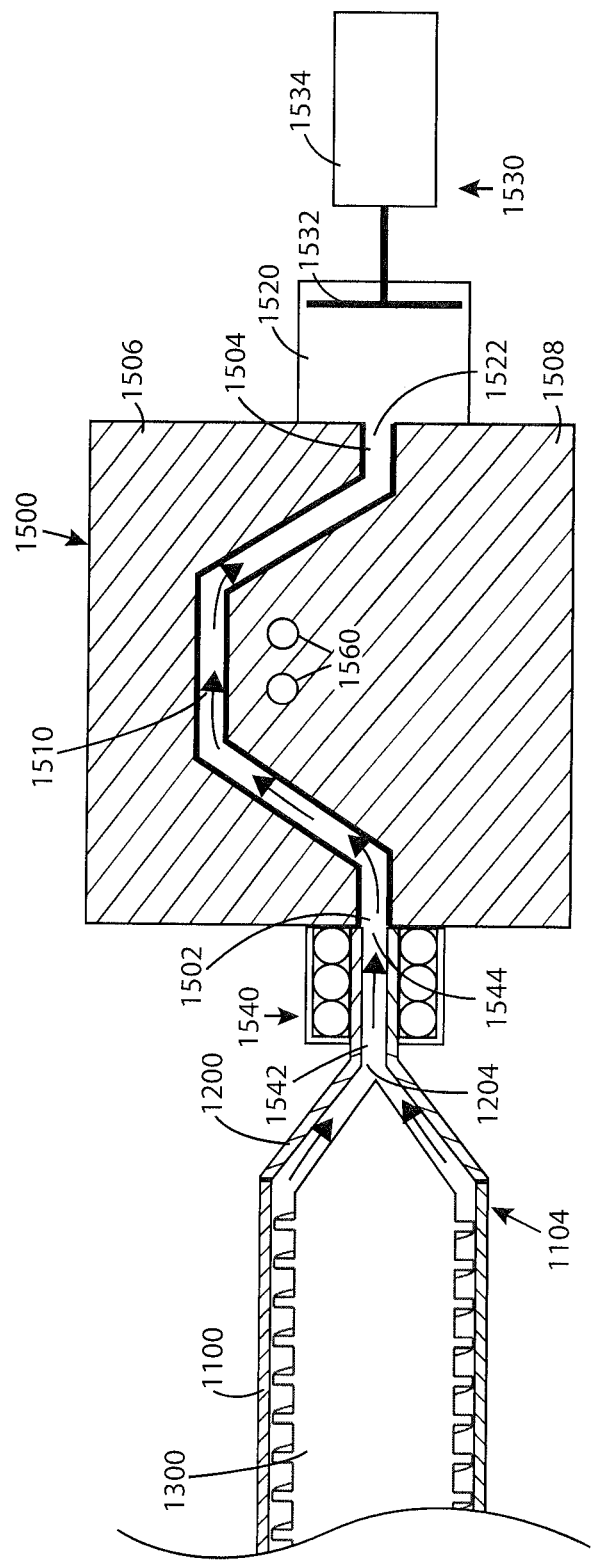

To fill a mold, first, as shown schematically in FIG. 28B, flowable material exits nozzle 1200 and, after passing through isolation member 1540, the flowable material enters mold cavity 1510 via mold inlet port 1502.

As shown in FIG. 28C, as more flowable material enters the mold cavity 1510, at least some flowable material exits mold cavity 1510 via mold pressurization port 1504 and enters storage chamber 1520, which begins to fill with flowable material.

Once mold cavity 1510 and/or storage chamber 1520 are filled (or almost filled) with flowable plastic material, as extruder 1000 continues to output flowable material, the pressure of the flowable material at the mold inlet port 1502 and/or the nozzle output 1204 of extruder 1000 will start to increase (as there is no further volume into which the additional flowable material can flow).

In response to (or prior to) the operating pressure of extruder 1000 increasing due to mold cavity 1510 and storage chamber 1520 being full (or mostly full) of flowable material, isolation member 1540 may be actuated to fluidically isolate the mold cavity 1510 and storage chamber 1520 from extruder nozzle 1200. In the illustrated example, isolation member 1540 includes a valve that can be closed to prevent fluid communication between the inlet 1542 and the outlet 1544 of isolation member 1540. When closed, the valve of isolation member 1540 prevents flowable plastic material from exiting mold cavity 1510, and also prevents further flowable plastic material from nozzle 1200 of extruder 1000 from entering the mold cavity (e.g. by directing the flow of output material into a run-off conduit).

Alternatively, or additionally, isolation member 1540 may include one or more cooling elements that are operable to selectively cool at least a portion of the flowable material between the inlet 1542 and the outlet 1544 until the flowable material solidifies. Once solidified, the plastic material forms a barrier preventing flow between the flowable material on either side of isolation member 1540, effectively fluidically isolating the mold cavity 1510 and storage chamber 1520 from extruder nozzle 1200 (i.e. preventing flowable plastic material from exiting mold cavity 1510, and also preventing further flowable plastic material from extruder 1000 from entering the mold cavity). Any other member or process step that isolates the extruder from the mold cavity (e.g., delinking the mold and the extruder and applying a pressurization member in its place) may be used.

Figure 28D:
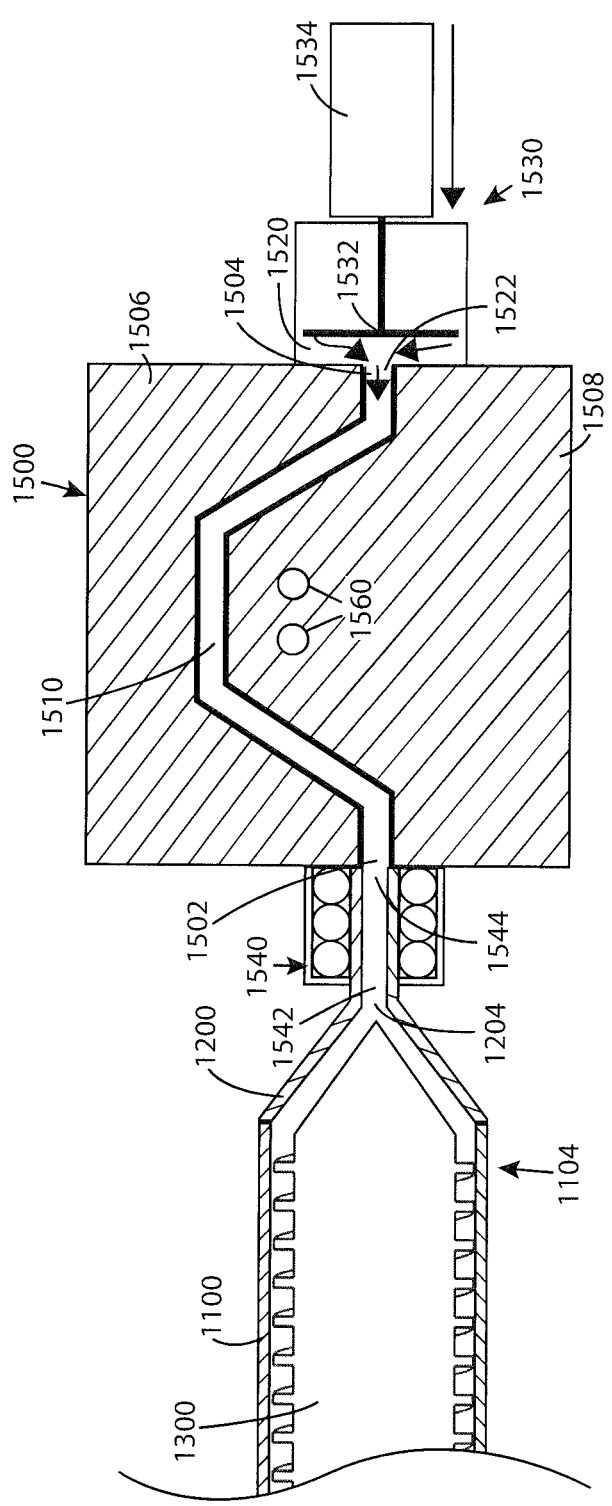

Turning to FIG. 28D, once mold cavity 1510 and storage chamber 1520 are filled (or almost filled) with flowable plastic material, and isolation member 1540 has been actuated to prevent flowable plastic material from exiting mold cavity 1510, pressurization member 1530 is used to selectively increase the pressure of material in cavity 1510. For example, the piston 1532 may be actuated by actuator 1530 to reduce the effective volume of storage chamber 1520. Since the volume of mold cavity 1510 remains constant, reducing the effective volume of storage chamber 1520 reduces the overall volume of the mold cavity and storage chamber. Compressing the flowable plastic material in this manner (i.e. by reducing the volume of the cavity in which it is positioned) will lead to an increase in pressure of the flowable plastic material.

The use of pressurization member 1530 to apply pressure to the material within the mold cavity to ensure proper filling allows mold 1500 to be filled (or substantially filled) with flowable material at a first, relatively low pressure (e.g. less than 500 psi, 400, 300 or 200 psi) from extruder 1000, but also allows the flowable material within the mold cavity 1510 to be subsequently exposed to a second, relatively high pressure (e.g. above 500 psi, 600, 700, 800, 900 or 1000 psi), which may be required to properly fill the mold (e.g. to ensure the flowable material completely fills a mold having a complex interior cavity), or otherwise desirable during the molding operation (e.g. compressing the flowable material within the mold cavity may improve one or more physical properties of the molded component).

Figure 29:
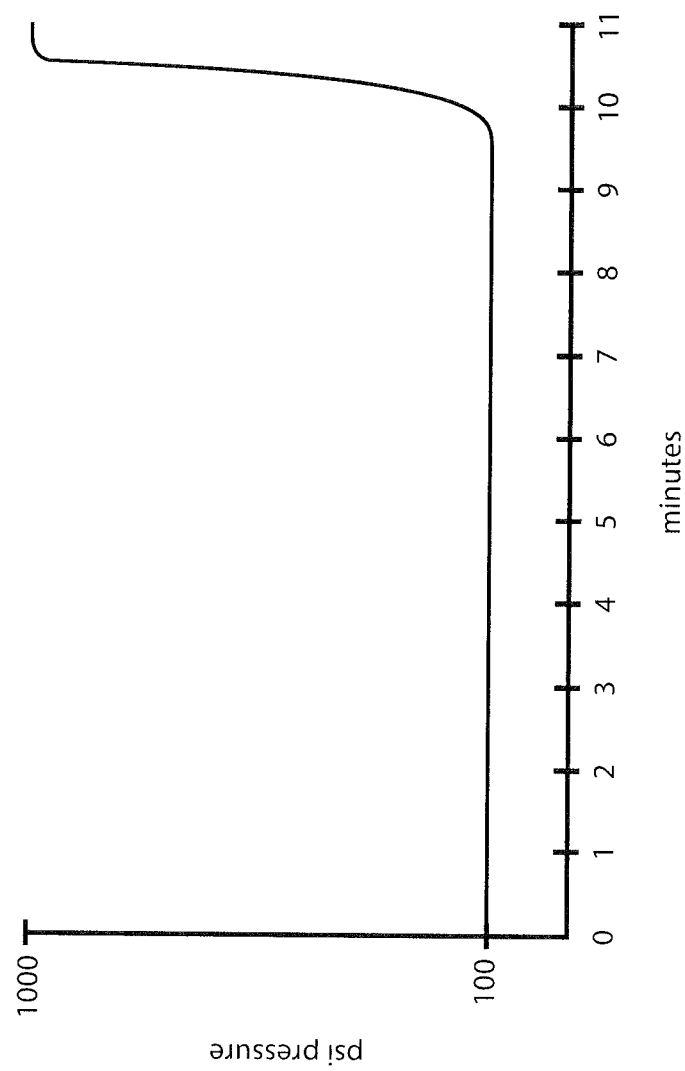
FIG. 29 is a schematic example plot of pressure versus time.

For example, as shown in FIG. 29, flowable material may be initially introduced into a mold cavity at a relatively low pressure, e.g. 100 psi. Depending on the output flow rate of the extruder 1000 and the volume of the mold cavity being filled, this process may take up the majority, or a substantial majority, of the time required for the mold filling operation, e.g. about 10 minutes in the illustrated example. However, once the mold cavity has been filled (or substantially filled) using output from extruder 1000, additional flowable material may be subsequently introduced into the mold cavity at a relatively high pressure, e.g. 1000 psi, using pressurization member 1530.

Figure 28E:
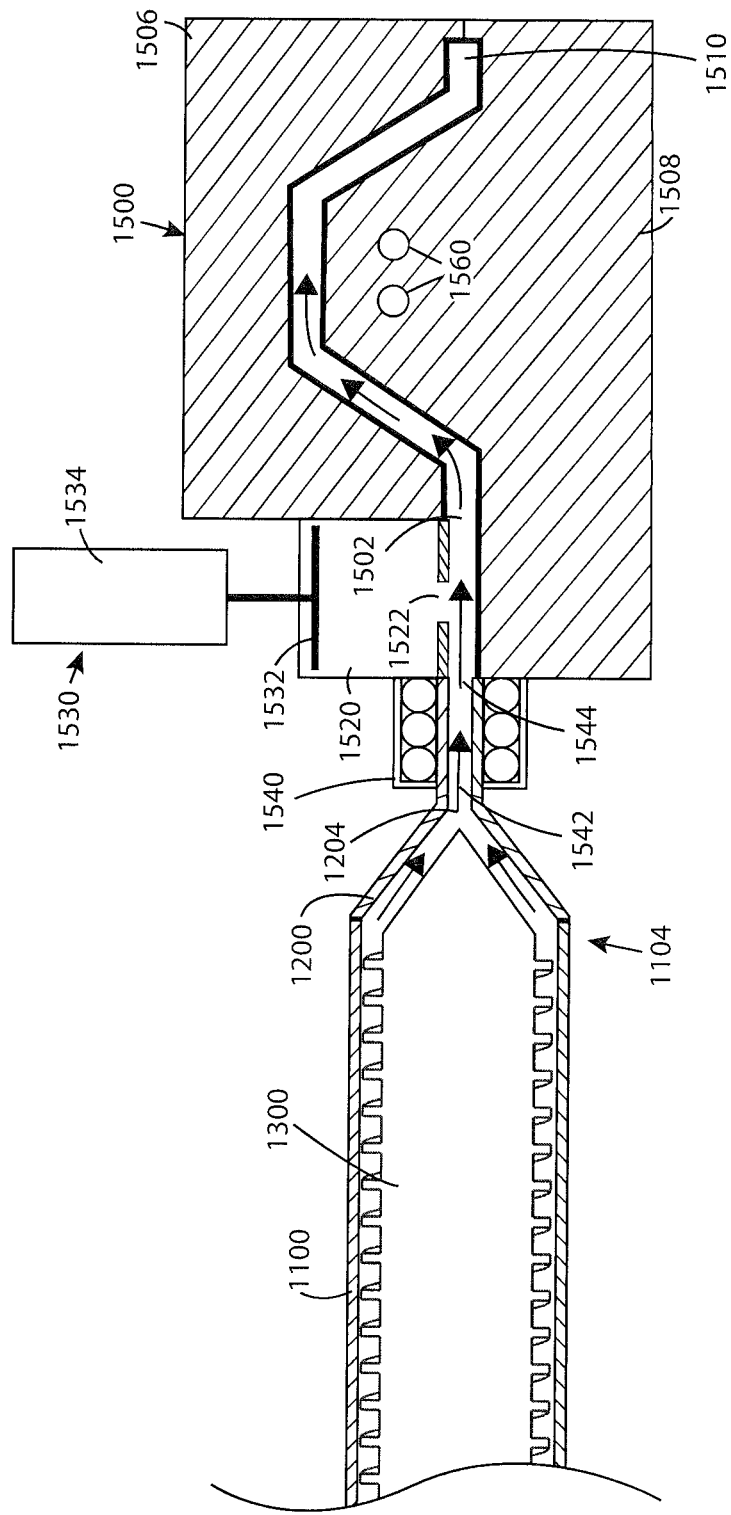
FIGS. 28E-28G are schematic cross-section views of an extruder and a pressurization member coupled to a mold, in accordance with another embodiment.
Figure 28F:
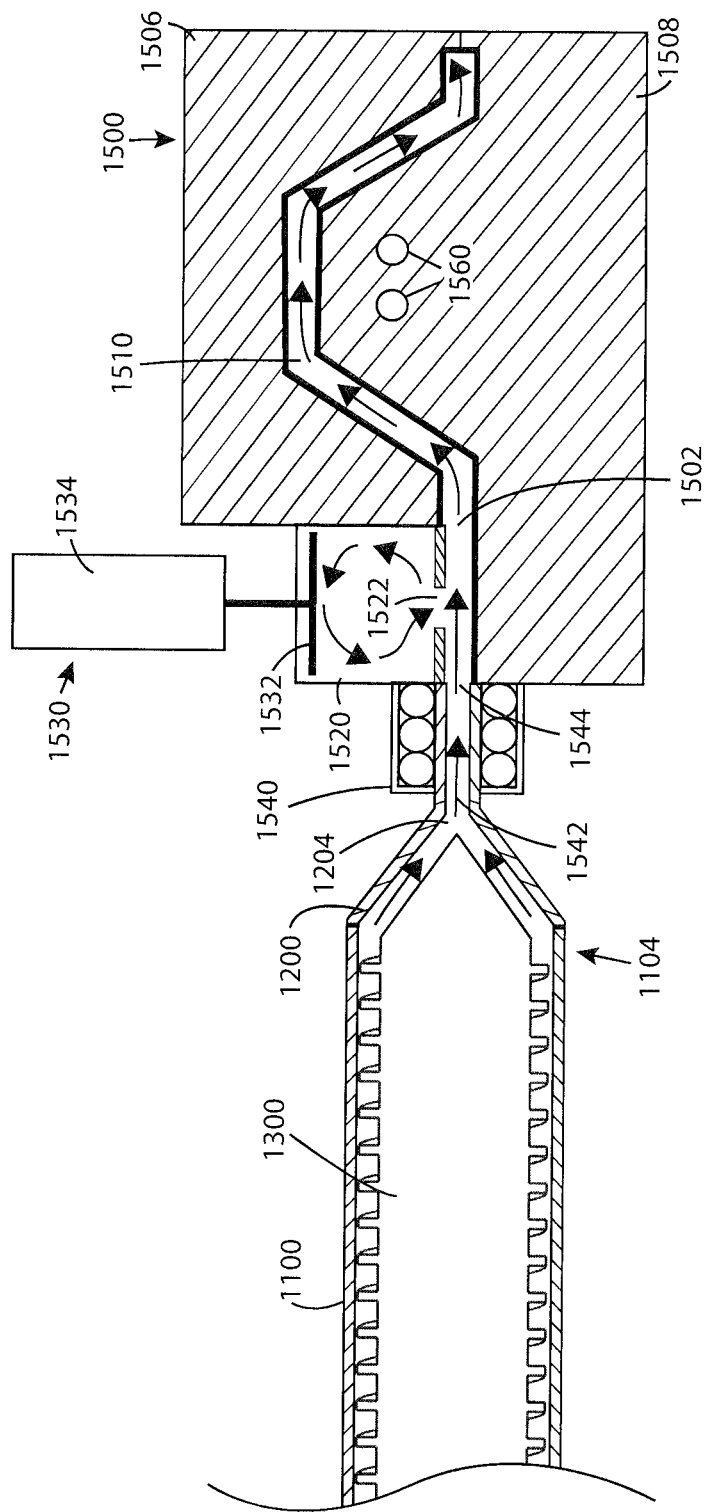
Figure 28G:
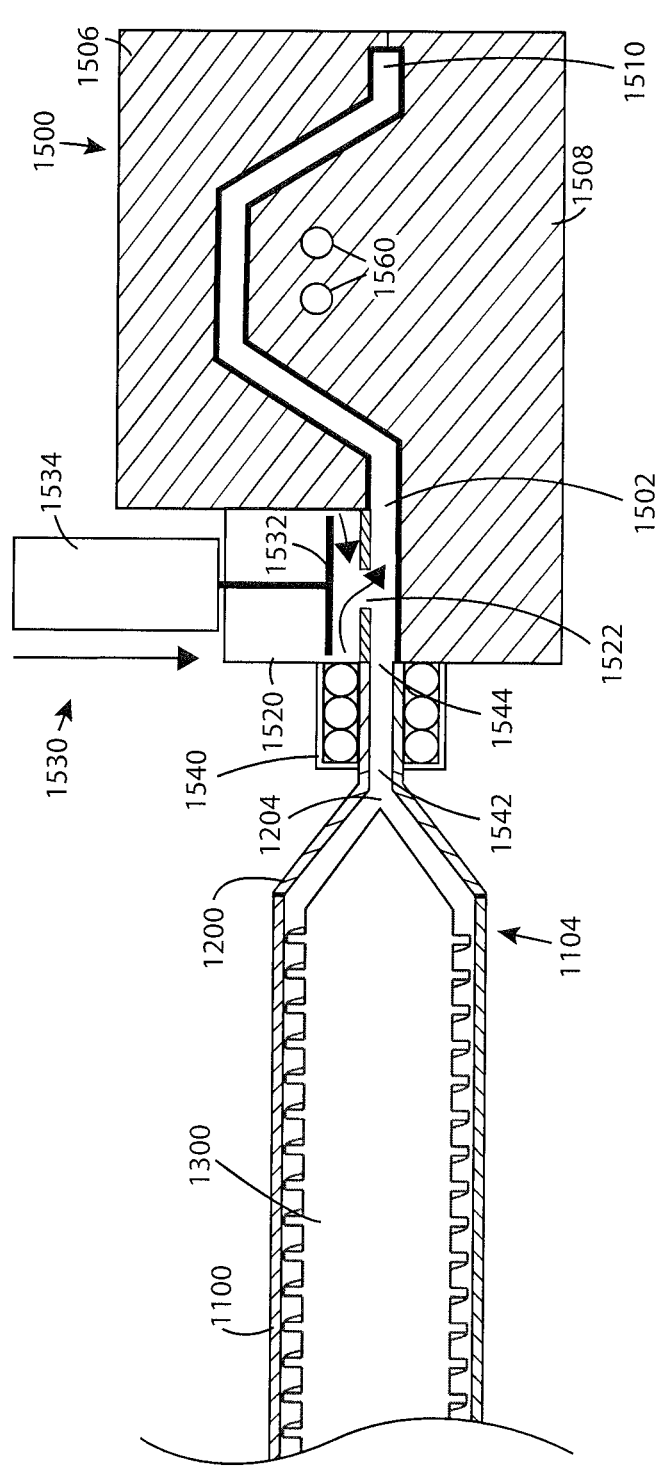

In the example illustrated in FIGS. 28A-D, the pressurization member 1530 and the extruder nozzle 1200 are positioned of opposite sides of mold 1500. Alternatively, pressurization member 1530 may be positioned of the same side of mold 1500 as extruder nozzle 1200. For example, as shown in FIGS. 28E-G, storage or overflow chamber 1520 is positioned downstream of isolation member 1540, but upstream of mold inlet port 1502. Accordingly, after exiting outlet 1544 of isolation member 1540, the flowable material may be flow either into mold cavity 1510 (via mold inlet 1502) or into storage chamber 1520 (via storage chamber inlet 1522).

As shown in FIG. 28F, flowable material enters both the mold cavity 1510 and storage chamber 1520, until each are full (or almost full) of flowable material.

Once mold cavity 1510 and storage chamber 1520 are filled (or almost filled) with flowable plastic material, isolation member 1540 is actuated to fluidically isolate the mold cavity 1510 and storage chamber 1520 from extruder nozzle 1200. Next, pressurization member 1530 is actuated to increase the pressure of material in cavity 1510 (e.g. by advancing piston 1532 to reduce the effective volume of storage chamber 1520).

Positioning the pressurization member 1530 and extruder nozzle 1200 of the same side of mold 1500 may have one or more advantages. For example, only one mold inlet port 1502 is required, as compared with two mold ports 1502, 1504 that would be required if the pressurization member is located downstream of mold 1500. This arrangement may also allow for a more compact design.

In the examples illustrated in FIGS. 28A-G, one extruder 1000 and one pressurization member 1530 were connected to a mold 1500. Alternatively, two or more extruders 1000 may be used with a single mold 1500.

Figure 30A:
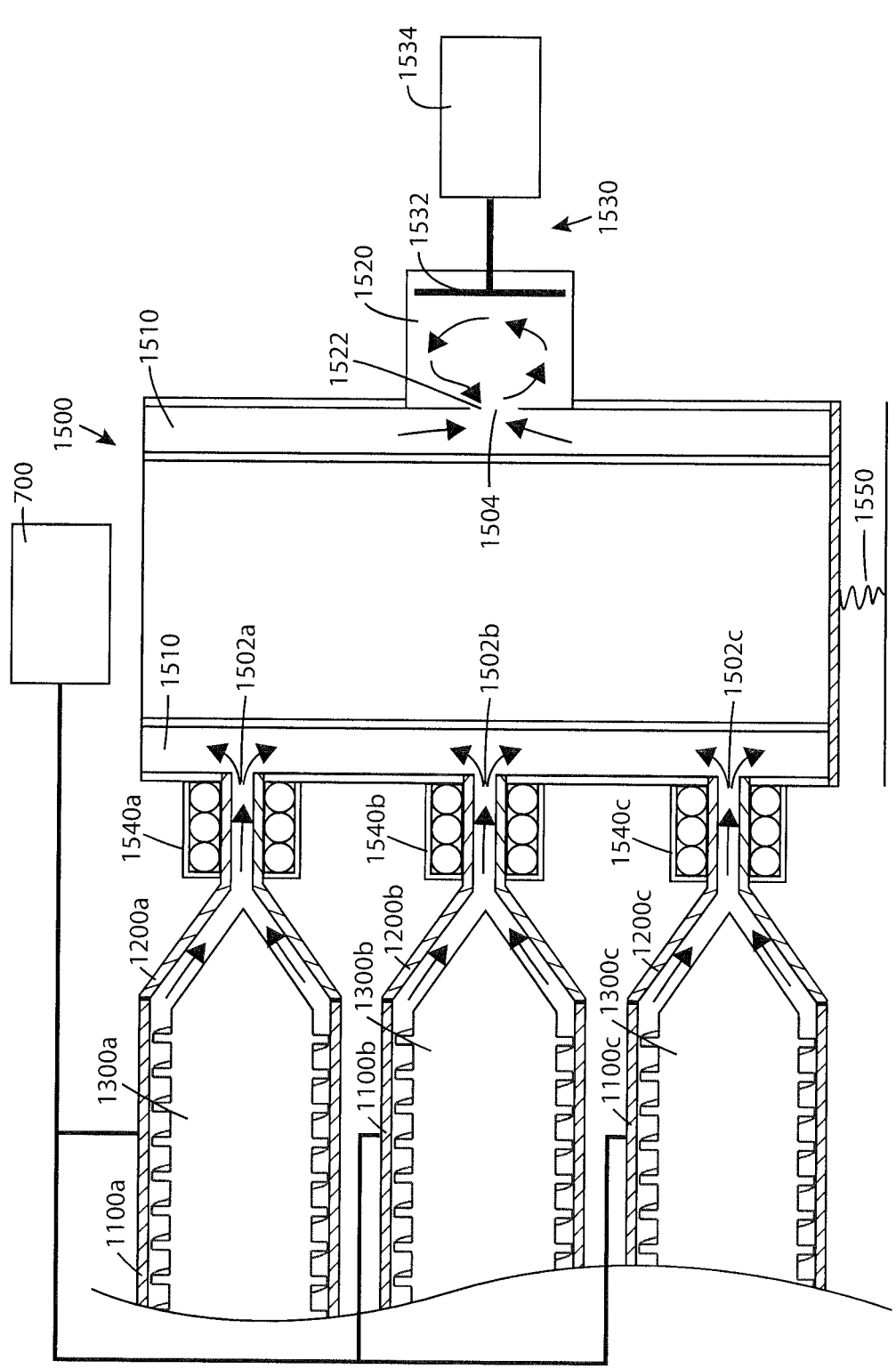
FIGS. 30A-30B are schematic cross-section views of three injection units and a pressurization member coupled to a mold, with a weight sensor positioned below the mold.
Figure 30B:
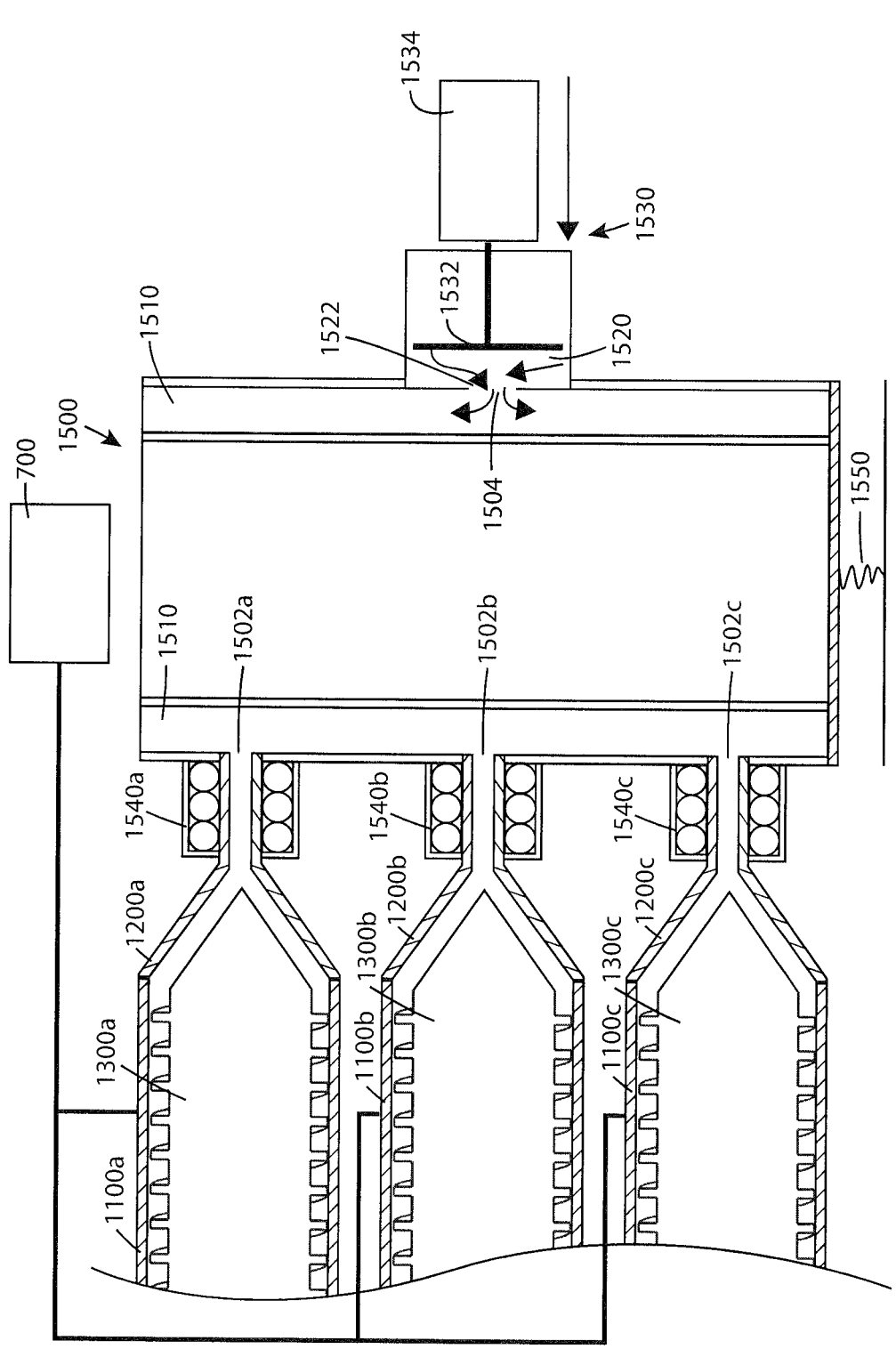

For example, as shown in FIGS. 30A-30B, three extruders 1000 may be provided, with a nozzle 1200*a-c* of each respective extruder 1000*a-c* in fluid communication with a cavity 1510 defined by a mold 1500, which in the illustrated example is an annular mold cavity. More specifically, the output end 1204*a-c* of each nozzle 1200*a-c* is coupled to a respective mold inlet port 1502*a-c* via a respective isolation member 1540*a-c*. Mold inlet ports 1502*a-c* provides fluid communication to a single mold cavity 1510.

In the illustrated example, mold cavity 1510 is also in fluid communication with storage or overflow chamber 1520 and pressurization member 1530. Accordingly, flowable material exiting nozzles 1200*a-c* is able to flow into mold cavity 1510 and also into storage chamber 1520. It will be appreciated that more than one overflow chamber 1520 and/or more than one pressurization member 1530 may be provided in alternative embodiments.

Also shown is optional weight sensor 1550, which may be used to determine the mass of the flowable material within the mold 1500 and/or storage chamber 1520. Accordingly, data from sensor 1550 may be used instead of and/or in addition to, data from one or more pressure sensors, flow meters volume sensors in storage chamber 1520 (not shown) to determine how much flowable material has been introduced into mold cavity 1510, and/or how much additional flowable material is required to fill the mold.

As shown in FIG. 30B, once mold cavity 1510 and storage chamber 1520 are filled (or almost filled) with flowable plastic material, isolation members 1540*a-c* may be actuated to fluidically isolate the mold cavity 1510 and storage chamber 1520 from extruder nozzles 1200*a-c*. Subsequently or concurrently, pressurization member 1530 may be actuated to increase the pressure of material in cavity 1510 (e.g. by advancing piston 1532 to reduce the effective volume of storage chamber 1520). A central control unit 700 may be provided to coordinate the operation of extruders 1000*a-c* and/or pressurization member 1530.

As the plastic material exiting extruder is in a flowable state due to its elevated temperature, if the flowable material is allowed to cool, it will begin to solidify, which may not be desirable until the mold has been completely filled and pressurized by the pressurization member. Accordingly, mold 1500 preferably includes one or more mold heating elements 1560 that are operable to maintain the flowable plastic material within the mold cavity at an elevated temperature (which may be the same or different than the temperature at which the material exits the extruder 1000) during the mold filling process so that the plastic material remains in a flowable state until the mold has been completely filled and pressurized by the pressurization member. Once the mold has been pressurized, mold 1500 is preferably at least partially cooled so that the flowable material solidifies and the molded component can then be removed from the mold.

Molded Plastic Component

The use of extruder 1000 in a molding process may have one or more advantages over typical injection molding machines. For example, as noted above, extruder 1000 is typically more energy efficient than typical molding machines.

Another possible advantage relates to the production of molded components with relatively complicated geometries, and/or the production of relatively large molded components. In this respect, since the molding process outlined above using extruder 1000 does not rely on the output or operating pressure of the extrusion barrel 1100 to provide the maximum pressure on the flowable material within the mold cavity (instead relying on one or more pressurization members to apply a higher pressure than could otherwise be applied by extruder 1000), such a molding process can be 'scaled up' to provide higher molding pressures (e.g. for use with molds with relatively complex internal cavities and/or with molds for relatively large molded components) without having to 'scale up' the operating pressure of extruder 1000.

Another possible advantage relates to the properties of the molded plastic components produced by this process. In typical injection molding operations, the flowable material is injected into the mold cavity at relatively high pressures and flow rates, which leads to the mold cavity being filled in a relatively short period of time. A possible downside of such a process is the potential for the introduction of strain orientation lines within the plastic component.

For example, FIG. 34 is a schematic illustration of a molded plastic part 10 as may be produced using a typical prior art injection molding process, showing strain orientation lines 12 radiating outwardly from the location 14 of the mold port. These strain orientation lines may cause (or by symptomatic of) a molded component to having a lower strength than an otherwise similar component with less (or no) strain orientation. Alternatively, or additionally, strain orientation lines may cause (or by symptomatic of) a molded component to be more prone to deformation during a post-mold cooling process, and/or in response to being subsequently heated. In some applications, it may be considered necessary to subject a molded component to one or more post molding strain relieving operations, to ensure the molded plastic component is not structurally compromised by the strain orientation introduced during the molding process.

Since the molding process outlined above using extruder 1000 fills the mold cavity (or almost all of the mold cavity, e.g., 75%, 80%, 85%, 90% or 95% or more) at a relatively low pressure and material flow rate, the potential for strain orientation lines to be formed within the molded component may be reduced or eliminated. Accordingly, such a process may produce a molded component with fewer (or no) strain orientation lines. For example, FIG. 35 is a schematic illustration of a molded plastic part 10 as may be produced by the extrusion processes described herein, showing strain orientation lines 12 radiating outwardly from the location 14 of one or more mold ports. Such a component may not require any post molding strain relieving operations.

Extruding Pipe

In typical injection molding operations, as illustrated schematically in FIG. 31, the flowable material generally converges as it passes the output end of the extrusion/injection screw 1300', e.g. via a nozzle 1200', and subsequently diverges outwardly towards the outer portion of the mold cavity 1510'. While this divergence-convergence may have one or more advantages in certain applications, it may also have one or more disadvantages. For example, by directing all of the flowable material through the output end 1204' of nozzle 1200', the flowable material flow-rate may be decreased, and/or the pressure required to maintain a desired flowable material flow-rate may be increased. Also, when extruding pipe or other annular forms, a spider is typically provided in the flow path between the extrusion barrel and the mold die, e.g. to maintain the position of an inner die mandrel within the flow path. While such spiders may be configured to provide a minimal impact on the flow of the flowable material (e.g. by minimizing the annular cross-section within the flow path), they nonetheless obstruct the flow (at least partially), the therefore act to decrease the flowable material flow-rate and/or increase the pressure required to maintain a desired flowable material flow-rate.

In accordance with another aspect of this disclosure, extruder 1000 may be used to mold a component without converging the flowable material after it has exited the extrusion barrel 1100, to produce hollow elongate objects. This aspect may be used by itself or with any one or more other aspects of extruder 1000 disclosed herein.

In accordance with this aspect, the plastic material output from extruder 1000, which is in a flowable or melted state, is directed into an annular mold cavity having an outer diameter substantially equal to the inner diameter of the output end 1104 of the extrusion barrel 1100, and an inner diameter substantially equal to the outer diameter of the screw shaft 1306 of screw 1300. Put another way, the annular thickness of the mold cavity is substantially equal to the channel depth $d_C$ at the output end 1104 of the extrusion barrel (e.g., +/−20%, 15%, 10% or 5%).

As discussed above, the flowable plastic material may exit the extruder 1000 at a relatively low pressure (e.g. below 1,000 psi, or below 500 psi, or between about 10 and about 200 psi) as compared to typical extrusion/injection machines. Where the output pressure of the extruder 1000 is not sufficient to provide or maintain a desired flowable material flow-rate through a divergent nozzle, instead of increasing the operating pressure of extruder 1000 (which, as discussed previously, may negatively impact the overall efficiency of the extruder), the flow path of the flowable material may be modified to reduce the pressure required to fill the mold.

Figure 32:
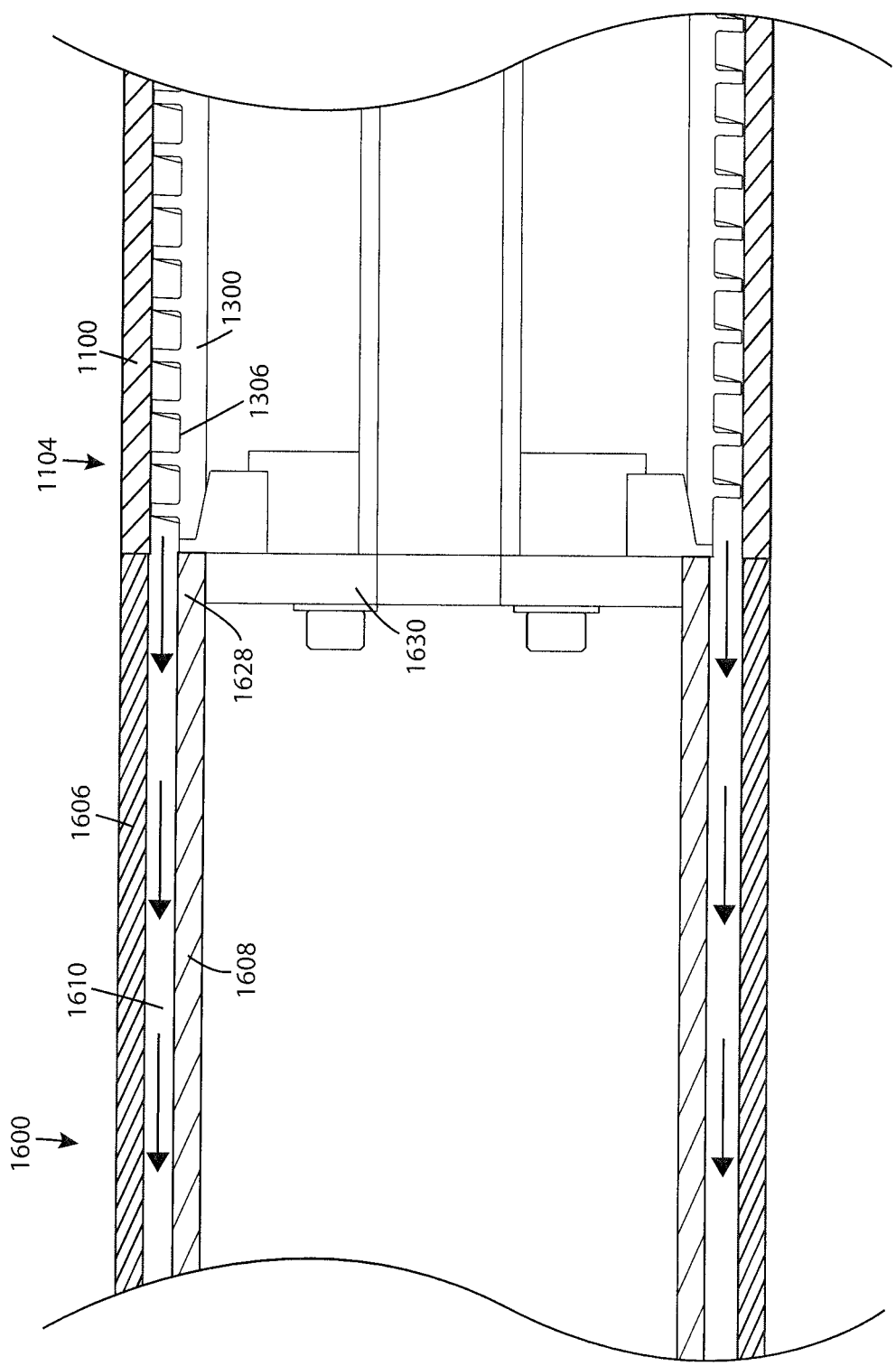
FIG. 32 is a cross-section view of an extruder coupled to a mold having a cylindrical mold cavity in accordance with one embodiment.

An example embodiment of this aspect will be discussed with reference to FIGS. 32-33B. As illustrated in FIG. 32, the output end 1104 of extrusion barrel 1100 is coupled to an inlet 1602 to annular mold cavity 1610, which in the illustrated example is defined by an outer mold wall 1606 and an inner mold wall 1608. The inner diameter of outer mold wall 1606 is substantially equal to the inner diameter of the output end 1104 of the extrusion barrel 1100, and the outer diameter of inner mold wall 1608 is substantially equal to the outer diameter of the screw shaft 1306 of screw 1300. By using a mold cavity 1610 having an annular thickness that is substantially equal to the channel depth $d_C$ at the output end 1104 of the extrusion barrel, and by directing the flowable material from the extrusion barrel 1100 into the mold cavity 1610 in a substantially straight path (i.e. without converging or diverging), the pressure required to maintain a desired flowable material flow-rate into the mold cavity 1610 may be reduced or minimized, allowing the use of an extruder 1000 having a relatively low output pressure. The reduction in backpressure due to directing the flowable material from the extrusion barrel 1100 into the mold cavity 1610 in a substantially straight path may also reduce strain in the molded component.

An axial end 1628 of inner mold wall 1608 may be rotationally coupled to the output end 1304 of extrusion screw 1300 via rotational coupler 1630, so that extrusion screw 1300 may rotate relative to non-rotating inner mold wall 1608.

Figure 33A:
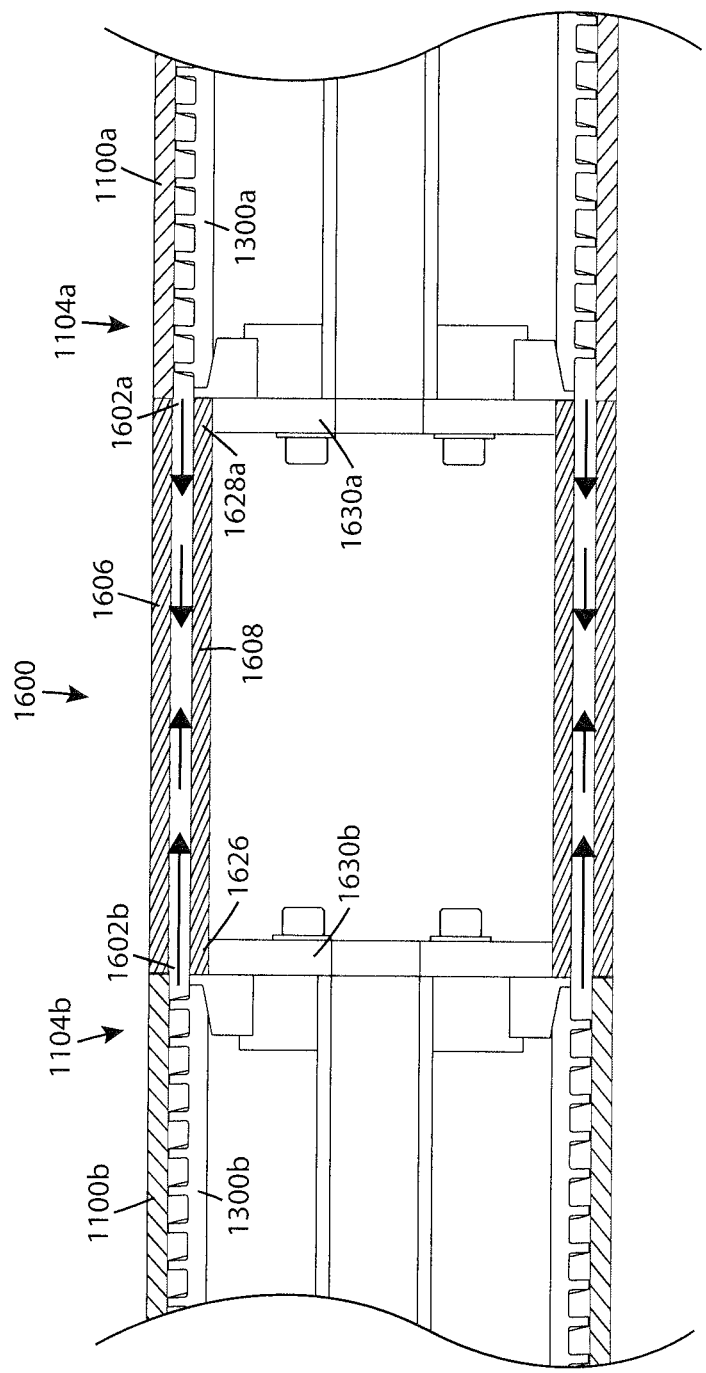
FIG. 33A is a cross-section view of an extruder coupled to each end of a mold having a cylindrical mold cavity in accordance with one embodiment.

Optionally, an extruder 1000 may be provided for each end of an annular mold, allowing the mold to be filled faster than if only one extruder 1000 were used. For example, as illustrated in FIG. 33A, the output end 1104a of extrusion barrel 1100a is coupled to an inlet 1602a to annular mold cavity 1610, and the output end 1104b of extrusion barrel 1100b is coupled to an inlet 1602b to annular mold cavity 1610. Also, the axial end 1628 of inner mold wall 1608 may be rotationally coupled to the output end 1304a of extrusion screw 1300a via rotational coupler 1630a, and the axial end 1626 of inner mold wall 1608 may be rotationally coupled to the output end 1304b of extrusion screw 1300b via rotational coupler 1630b. This arrangement allows extrusion screws 1300a-b to rotate independently of each other, and to rotate relative to non-rotating inner mold wall 1608.

Figure 33B:
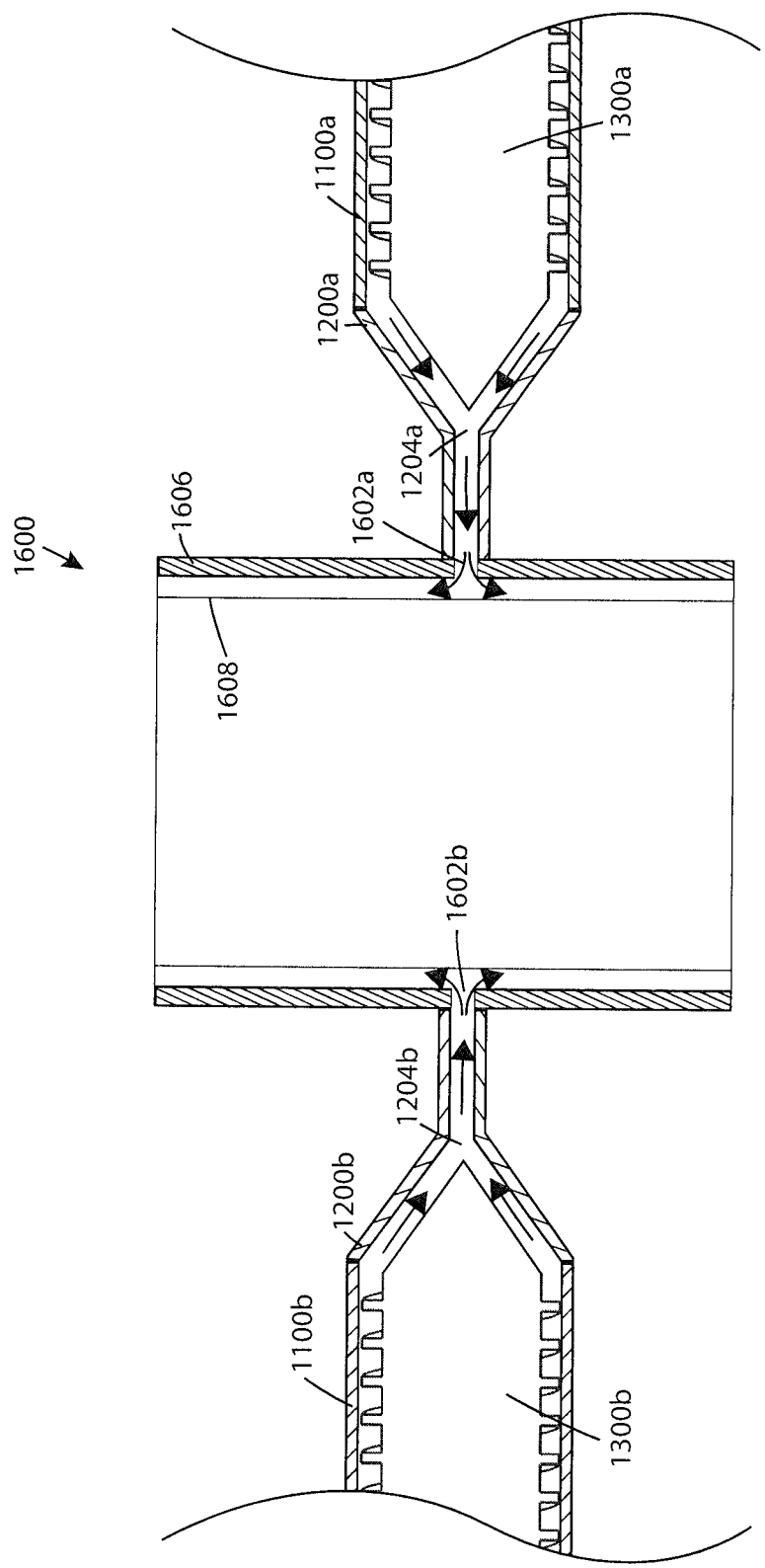
FIG. 33B is a cross-section view of an extruder coupled to each end of a mold having a cylindrical mold cavity in accordance with another embodiment.

Alternatively, as illustrated in FIG. 33B, the nozzle outlet 1204a of extruder 100a may be coupled to an inlet 1602a to annular mold cavity 1610, and the nozzle outlet 1204b of extruder 1000b may be coupled to an inlet 1602b to annular mold cavity 1610. This arrangement allows the use of two or more extruders 1000 to fill a single annular mold 1600, but in contrast to the example illustrated in FIG. 33A, the flowable material is directed from the extrusion barrels 1100a, 1100b into the mold cavity 1610 along converging and diverging paths.

Extruder Control Electronics

Figure 25A:
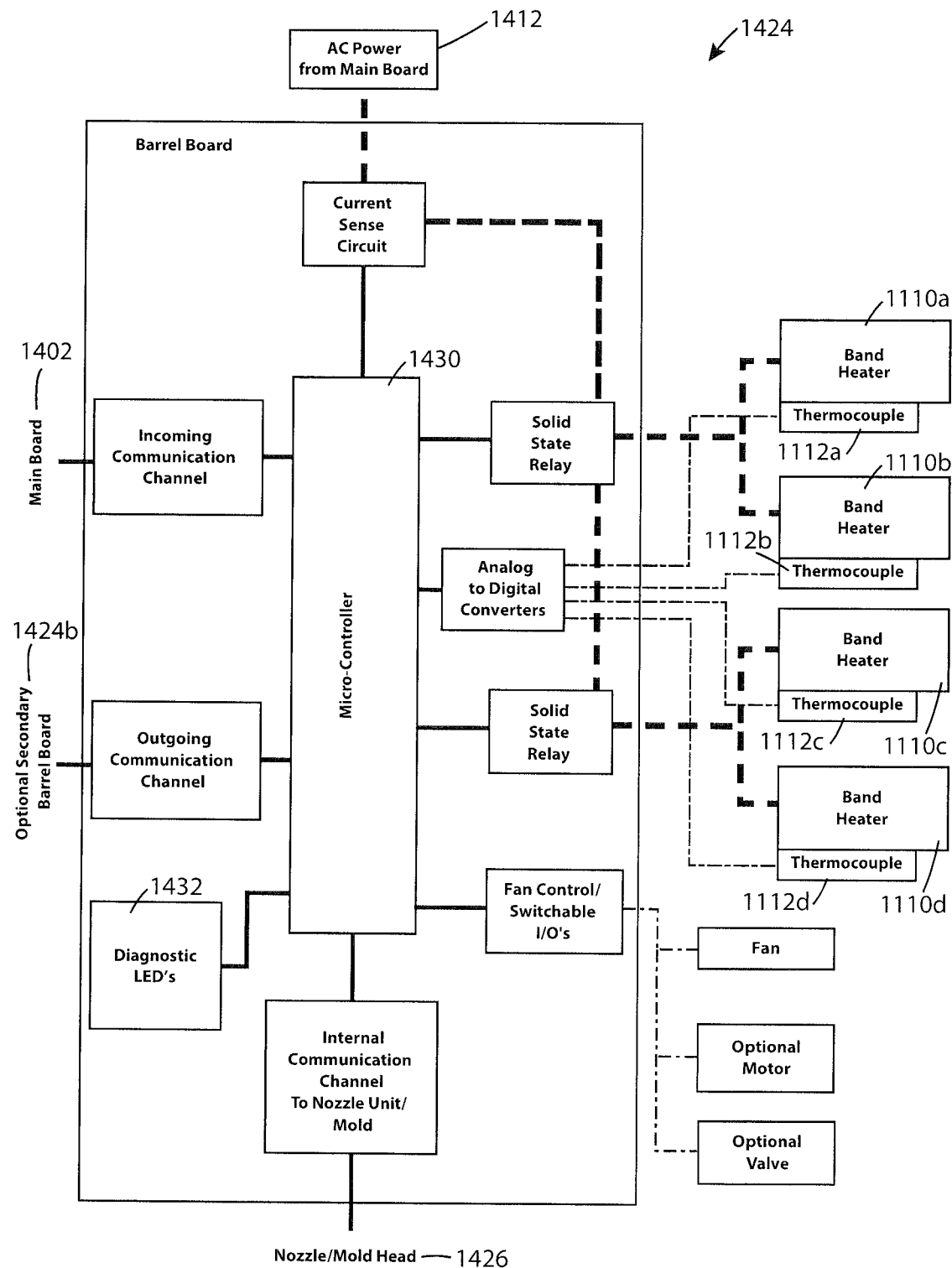
FIGS. 25A-25C are schematic circuit drawings of an electrical control system for the extruder of FIG. 1, in accordance with one embodiment.
Figure 25B:
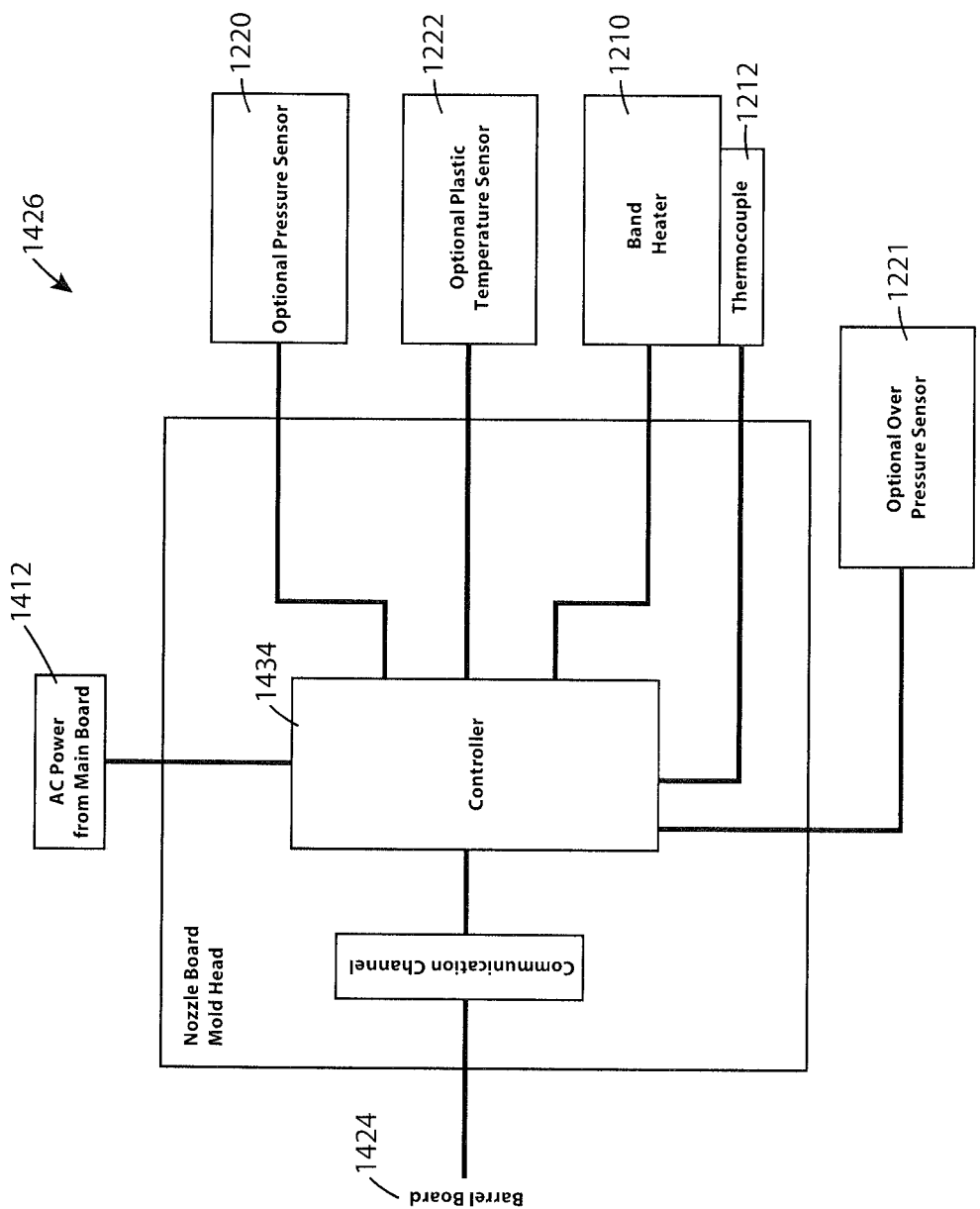
Figure 25C:
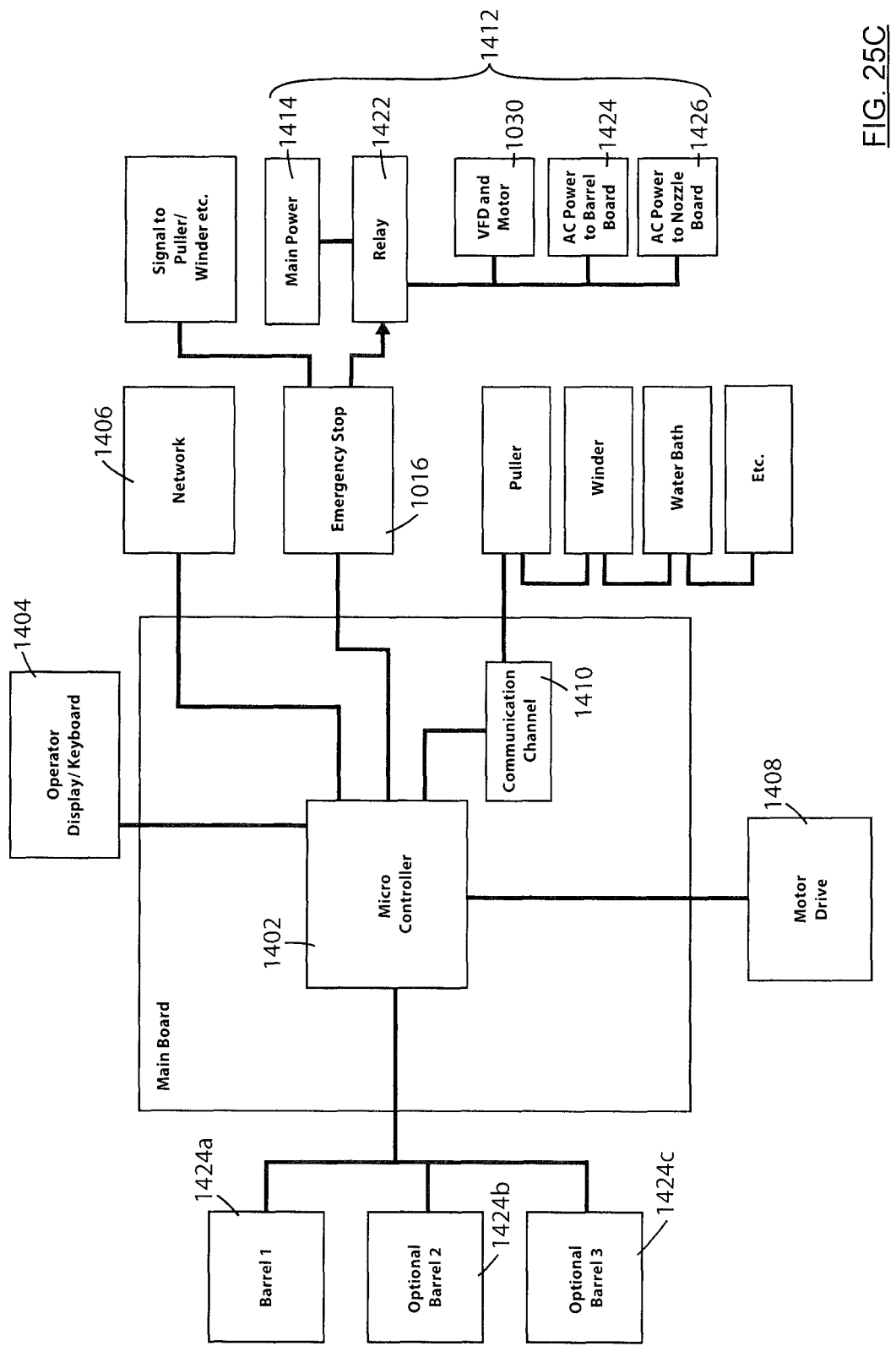

Reference is next made to FIGS. 25A-25C illustrating a block diagram of control electronics 1400 in accordance with an example embodiment. Control electronics 1400 are provided as an example and there can be other embodiments of control electronics 1400 with different components or a different configuration of the components described herein.

Referring first to FIG. 25C, control electronics 1400 comprise processing unit 1402, display and user interface 1404 (e.g. for receiving control instructions for operating extruder 1000 during an extrusion or molding operation, and which may include which may include display 1018), network interface unit 1406, motor drive 1408, peripheral device interface unit 1410, power supply circuitry 1412, and one or more barrel control modules 1424.

Processing unit 1402 controls the operation of extruder 1000. Processing unit 1402 can be any suitable processor, controller or digital signal processor that can provide sufficient processing power processor depending on the configuration, purposes and requirements of extruder 1000 as is known by those skilled in the art. For example, processing unit 1402 may be a high performance general processor. In alternative embodiments, processing unit 1402 can include more than one processor with each processor being configured to perform different dedicated tasks. In alternative embodiments, specialized hardware may be used to provide some of the functionality provided by processing unit 1402.

Display and user interface 1404 can include any suitable display 1018 that provides visual information depending on the configuration of extruder 1000. For instance, display 1018 can be a display suitable for a laptop, tablet, or handheld device such as an LCD-based display and the like.

User interface 1404 can include at least one of a keyboard, a touch screen, a thumbwheel, a track-pad, a track-ball, and the like again depending on the particular implementation of extruder 1000. In some cases, some of these components can be integrated with one another.

Network interface unit 1406 can be any interface that allows the extruder 1000 to communicate with other devices or computers. In some cases, network interface unit 1406 can include at least one of a serial port, a parallel port or a USB port that provides USB connectivity. Network interface unit 1406 may optionally include a wireless interface unit, which can be a radio (e.g. a transceiver or a transmitter) that communicates utilizing CDMA, GSM, GPRS or Bluetooth protocol according to standards such as IEEE 802.11a, 802.11b, 802.11g, or 802.11n. Network interface unit 1406 can be used by extruder 1000 to communicate with other devices or computers using any suitable wired or wireless protocol.

Peripheral device interface unit 1410 can be any interface that allows the extruder 1000 to communicate with other components of an extruding or molding apparatus. For example, peripheral device interface unit 1410 may enable two-way communication with a puller, a winder, a water bath, and the like. The data being shared may include the tension of a puller or winder filament (to control winding speed), the diameter of the filament measured in at least one axis and at least one point, a temperature of the water bath, a water bath level, data indicating that a reel is full, and the like.

Power supply circuitry 1412 may include a power source 1414 (which can be any suitable power source that provides power to extruder 1000, such as a source of AC or DC power). Power source 1414 may provide power to one or more components of extruder 1000, including screw drive motor 1030 (and/or a solid state motor drive for motor 1030, such as a variable-frequency drive (VFD) or the like), one or more barrel control modules 1424, and one or more nozzle control modules 1426. Power source 1414 preferably provides power to these components via one or more power relays 1422.

Turning to FIG. 25A, barrel control module 1424 comprises processing unit 1430, barrel heaters 1110 (which preferably include corresponding and/or integrated thermocouples or other temperature sensors 1112), one or more optional signaling members 1432, and nozzle control module 1426.

Processing unit 1430 controls the operation of barrel control module 1424. Processing unit 1430 can be any suitable processor, controller or digital signal processor that can provide sufficient processing power processor depending on the configuration, purposes and requirements of barrel control module 1424 as is known by those skilled in the art. For example, processing unit 1430 may be a high performance general processor. In alternative embodiments, processing unit 1430 can include more than one processor with each processor being configured to perform different dedicated tasks. In alternative embodiments, specialized hardware may be used to provide some of the functionality provided by processing unit 1430.

Barrel heaters 1110 may be any member that is capable of raising the temperature of extrusion barrel 1100. As exemplified, barrel heaters 1110 comprise a resistive heating element. The resistive heating elements may be heated by power circuitry 1412 or they may be connectable to an external source of current.

Temperature sensors 1112 may be any suitable sensor, such as a thermocouple, a thermistor and the like, that may be located, e.g., on the outer surface 1108 or the inner surface 1106 of extrusion barrel 1100, and configured to measure a temperature of the barrel. At steady state conditions, a signal representing the temperature of the barrel in one location may be indicative of an adjacent location. For example, the temperature of the outer surface 1108 of barrel 1100 may be indicative of the temperature of a flowable material being conveyed past the inner surface 1106 of the barrel 1100.

Signaling members 1432 may be provided as an alternative to, or in addition to, display screen 1080. For example, an audio signaling member such as an electroacoustic transducer (or speaker) may be configured to provide an audible tone in response to a sensor detecting that a predetermined temperature and/or pressure has been reached, and/or when otherwise directed by control electronics 1400. As another example, one or more indicator lights (such as LEDs) may be provided on extruder 1000 and configured to emit a signal (e.g. illuminate, strobe, and/or change colour) in response to detecting that a predetermined temperature and/or pressure has been reached, and/or when otherwise directed by control electronics 1400.

Turning to FIG. 25B, nozzle control module 1426 comprises processing unit 1434, nozzle heater 1210 (which preferably includes one or more corresponding and/or integrated thermocouples or other temperature sensors 1212), one or more optional plastic temperature sensors 1222, and one or more pressure sensors 1220 and/or overpressure sensors 1221.

Processing unit 1434 controls the operation of nozzle control module 1426. Processing unit 1434 can be any suitable processor, controller or digital signal processor that can provide sufficient processing power processor depending on the configuration, purposes and requirements of nozzle control module 1426 as is known by those skilled in the art. For example, processing unit 1434 may be a high performance general processor. In alternative embodiments, processing unit 1434 can include more than one processor with each processor being configured to perform different dedicated tasks. In alternative embodiments, specialized hardware may be used to provide some of the functionality provided by processing unit 1434.

Nozzle heater 1210 may be any member that is capable of raising the temperature of extrusion nozzle 1200. As exemplified, nozzle heater 1210 comprises a resistive heating element. The resistive heating element may be heated by power circuitry 1412 or may be connectable to an external source of current.

Temperature sensors 1212 and 1222 may be any suitable sensor, such as a thermocouple, a thermistor and the like. Sensor 1212 may be located, e.g., on the outer surface of nozzle 1200, and configured to measure a temperature of the nozzle. Temperature sensor 1222 may be located, e.g., in or adjacent the flow conduit between nozzle inlet 1202 and nozzle outlet 1204, and configured to measure a temperature of a flowable material being conveyed through and/or output from the nozzle 1200.

Pressure sensors 1220 and 1221 are operable to measure the pressure of the flowable material being conveyed through the nozzle 1200. Pressure sensors may be any suitable sensor, such as pressure transducers, piezoelectric transducers and the like. For example, a pressure sensor may be located in fluid communication with a flowable material being conveyed through the nozzle 1200. Other suitable pressure sensors may be used, such as or one or more strain gauges located on e.g. the outer surface of nozzle 1200.

Extruder Control Method

Figure 26:
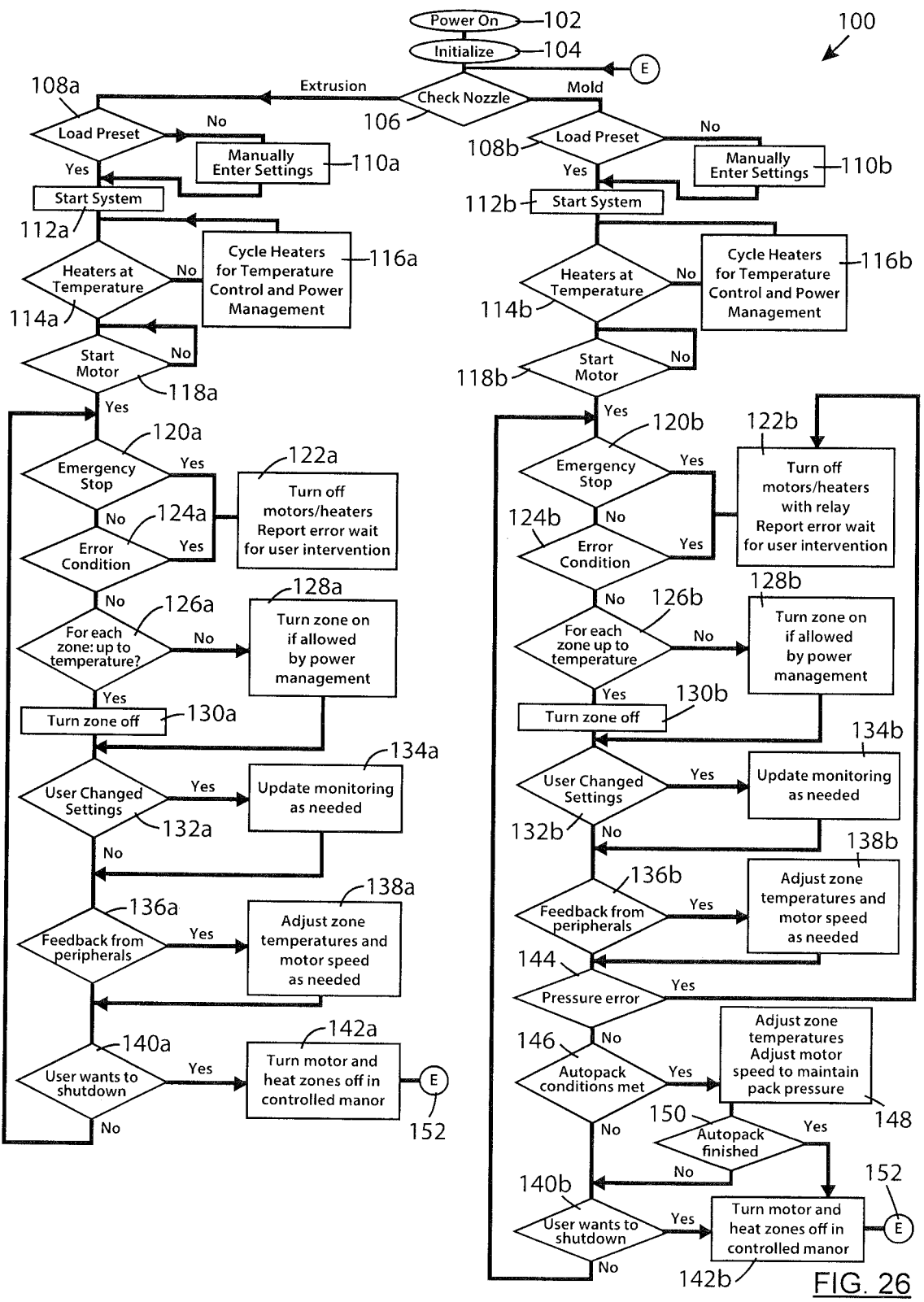
FIG. 26 is a logic flow diagram for the control of the extruder of FIG. 1, in accordance with one embodiment.

An example embodiment for a method for operating extruder 1000 will now be described with reference to FIG. 26 and is shown generally as 100.

The method starts at 102, where the main power to extruder is turned on. At 104 the control electronics 1400 perform an initialization routine. At 106, the nozzle 1200 is checked to determine how many nozzle boards are connected, how many heating zones are present, the names of the heating zones, and what type of head unit is present and the associated heating zones, heating zone names, and pressure sensors present. If extruder 1000 is being operated in an extrusion mode of operation, the method proceeds to 108*a*, and if extruder 1000 is being operated in a mold mode of operation, the method proceeds to 108*b*. Steps similar to both modes of operation have been similarly numbered.

At 108, a user may be prompted to load previously used settings for the extrusion/molding operation. If the previously used settings are selected, the method proceeds to 112. Otherwise, the method proceeds to 110, where a user inputs and/or selects the settings to be used.

At 112, the extrusion system is initialized, and at 114 the control electronics may monitor one or more temperature sensors to determine if the barrel heaters have reached a desired temperature (e.g., the temperature input at 108 or 110). If the barrel heaters have not reached the desired temperature, at 116 the heaters may be cycled until the desired temperature is reached. Cycling the heaters may involve turning the heaters on and off to maintain a preset temperature window. The number of heaters on at a given time may also be also controlled so as to never exceed the total electric current (power) available to the heaters.

Once the desired barrel heater temperature is determined to have been reached at 114, control electronics proceeds to actuate the screw drive motor 1030, resulting in rotation of the extrusion screw 1300 within barrel 1100.

At 120, the control electronics verify that any emergency stop switches have not been actuated. If an actuation of an emergency stop switch is detected, at 122 the screw drive motor 1300 and the barrel heaters 1110 may be turned off, and an error may be displayed (e.g. via display 1018).

If actuation of an emergency stop switch is not detected, at 124 the control electronics may determine if one or more other predetermined error conditions have been detected, in which case the method proceeds to 122 where the heaters and motor may be turned off and an error displayed.

At 126 the control electronics may monitor one or more temperature sensors to determine if each of the zones in barrel 1100 have reached their desired temperature (e.g., the temperature input at 108 or 110). If a barrel zone has not reached its desired temperature, at 128 the barrel heaters 1110 for that zone are turned on and the method proceeds to 132. Also at 128, a power management module may prevent a barrel heater from turning on to prevent the total power draw from the active or "on" barrel heaters exceeding the maximum current available. In such a case, the power management module may prioritize which barrel hearers are to be turned (and/or remain) on, e.g. by allowing the zone(s) that have the greatest difference between an actual and a target temperature to stay on longer than zone(s) that have a temperature closer to their target temperatures, thereby reducing the maximum temperature difference from the preset temperatures. Otherwise (i.e. if each barrel zone has reached its desired temperature), at 130 the barrel heaters 1110 are turned off and the method proceeds to 132.

At 132, the control electronics determine if any settings have been changed by a user. If one or more settings are determined to have been changed, at 134 the control electronics may update the target values for one or more monitored parameters. Otherwise, the method proceeds to 136.

At 136, the control electronics determine if any feedback has been received from one or more peripheral devices. If feedback has been received, at 138 the control electronics may adjust the temperature in one or more barrel zones (e.g. via activation (or deactivation) of barrel heaters 1110), and/or adjust the speed of the screw drive motor 1030. For example, if a measured diameter of a filament of extruded material is detected as being smaller than a target diameter, the speed of a puller may be reduced and/or the melt temperature in one or more barrel zones may be increased and/or the screw speed may be increased. Likewise, if a measured diameter of a filament of extruded material is detected as being larger than a target diameter, the speed of a puller may be increased and/or the melt temperature in one or more barrel zones may be decreased and/or the screw speed may be decreased. Otherwise, the method proceeds to 140*a* (if extruder 1000 is being operated in an extrusion mode of operation) or 144 (if extruder 1000 is being operated in a mold mode of operation).

If extruder 1000 is being operated in a mold mode of operation, at 144 the control electronics may determine, e.g. using one or more pressure sensors, if a pressure error has been detected. If so, the method proceeds to 122*b* where the screw drive motor 1300 and the barrel heaters 1110 may be turned off, and an error may be displayed (e.g. via display 1018). If a pressure error is not detected, the method proceeds to 146.

At 146, the control electronics determine if the target conditions specified for an "Autopack" routine have been reached. For example, when a mold is filled, a pressure sensor (e.g. in the output nozzle 1200) will see a rapid increase in pressure, as the output is effectively blocked by the filled mold. When this occurs, an "Autopack" routine may be initiated, in which the screw speed is adjusted to maintain a preset output or "pack" pressure while the mold is cooled, so that additional plastic is available to counteract possible shrinkage that may occur during cooling. If the "Autopack" conditions have been met, the method proceeds to 148, where the control electronics adjust the temperature in one or more barrel zones and/or adjust the speed of the screw drive motor to maintain a target value for the packing pressure.

At 148, the control electronics determine the Autopack routine is finished. For example, the Autopack routine may automatically terminate after maintaining the user preset "pack" pressure for a user preset time period. Alternatively, or additionally, the Autopack routine may automatically terminate when a user preset temperature (e.g. a mold temperature) is reached. If so, the method proceeds to 142*b*. Otherwise, the method proceeds to 140*b*.

If, at 146, the control electronics determine that the target conditions specified for an Autopack routine have not been reached, the method proceeds to 140*b*.

At 140, the control electronics determine if a user has requested that the extruder 1000 shut down. If a shutdown request has been received, at 142 the screw drive motor 1300 and the barrel heaters 1110 are turned off, and the method ends at 152. Otherwise, the method returns to 120.

Optional Multi-Start Extrusion Screw

In accordance with another aspect of this disclosure, extrusion screw 1300 may be a multi-start screw. This aspect may be used by itself or with any one or more other aspects of extruder 1000 disclosed herein.

Figure 21:
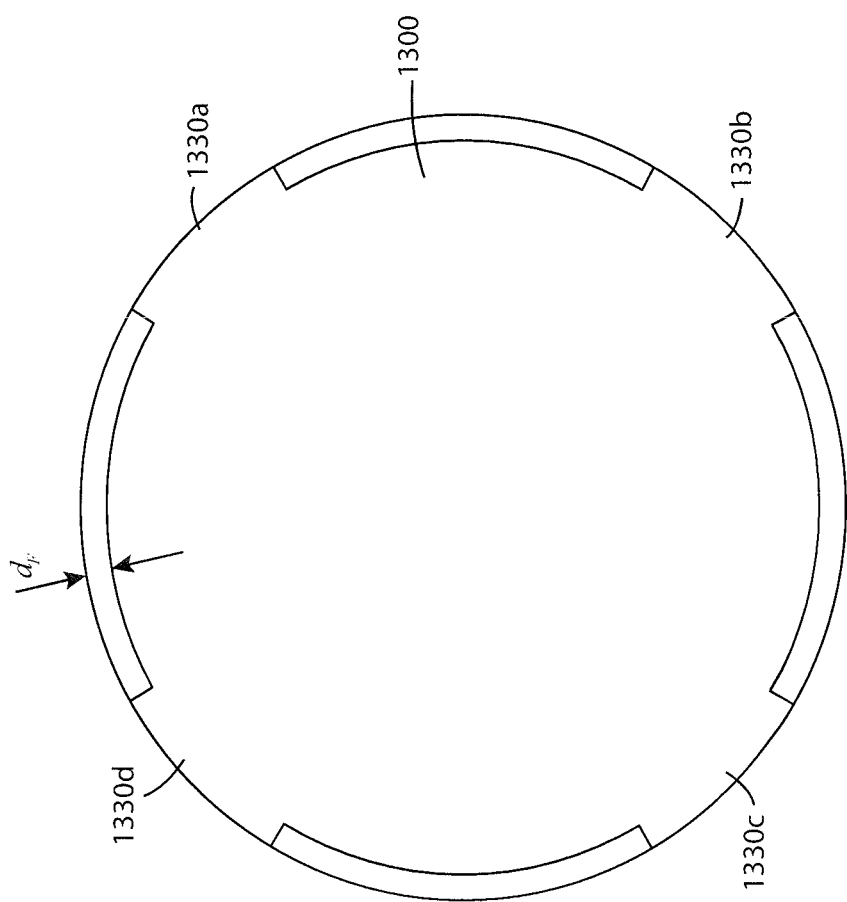
FIG. 21 is an end section view of a multi-start extrusion screw.
Figure 22:
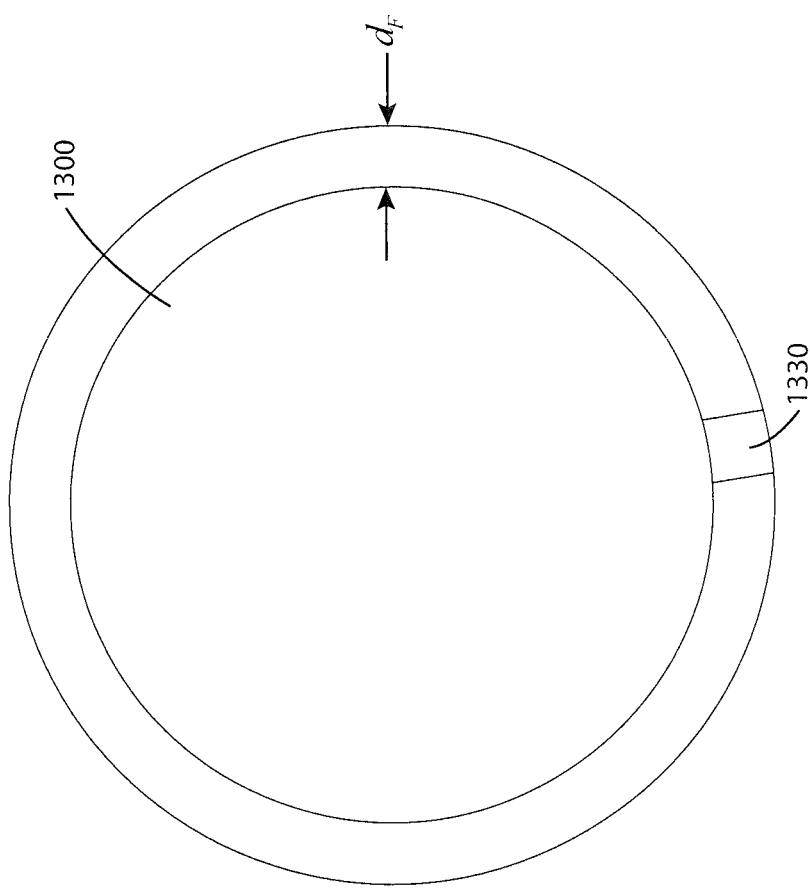
FIG. 22 is an end section view of a standard extrusion screw.

In accordance with this aspect, an extrusion screw 1300 has two or more screw flights wrapped around the screw, as is known in the art. For example, FIG. 21 is an end section view of a four-start screw 1300, with flights 1330a-d spaced about the central screw body. In contrast, FIG. 22 is an end section view of a single start screw 1300, with flight 1330 wrapped about the central screw body.

Optional Multi-Component Extrusion Screw

In accordance with another aspect of this disclosure, extrusion screw 1300 may be constructed from more than one part. This aspect may be used by itself or with any one or more other aspects of extruder 1000 disclosed herein.

Figure 23A:
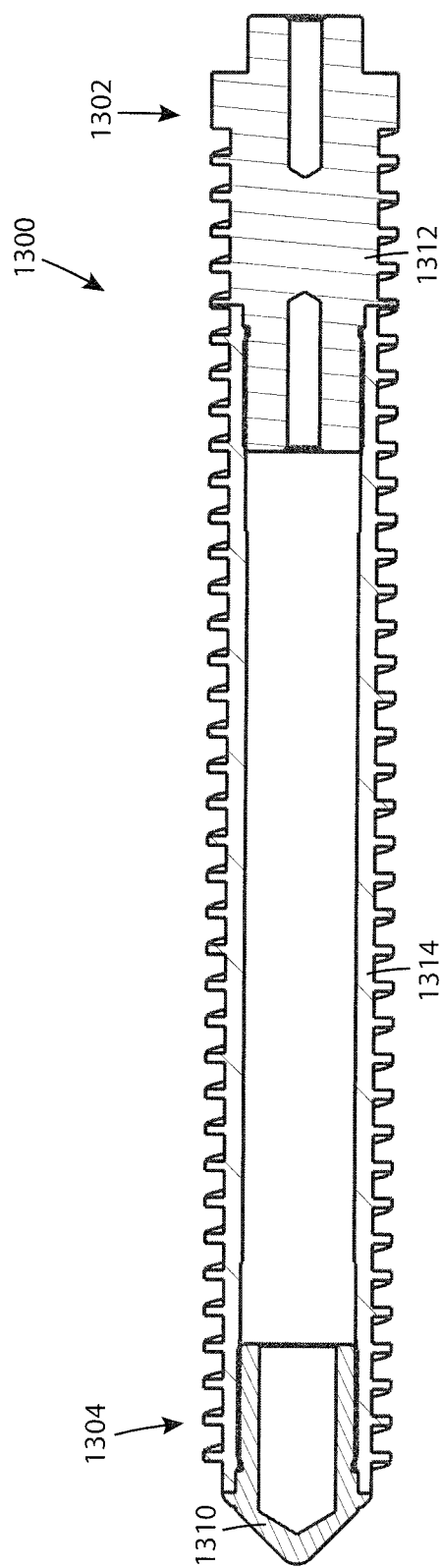
FIG. 23A is a cross-section view of a three-piece extrusion screw in accordance with one embodiment.

In accordance with this aspect, an extrusion screw 1300 may be made from two or more parts. For example, as shown in FIG. 23A, an extrusion screw 1300 includes a first screw body section 1312, a second screw body section 1314, and a nose cone 1310. First and second screw body sections may be joined using any suitable method, such as a threaded coupling, a keyed joint, welding and the like.

Figure 23B:
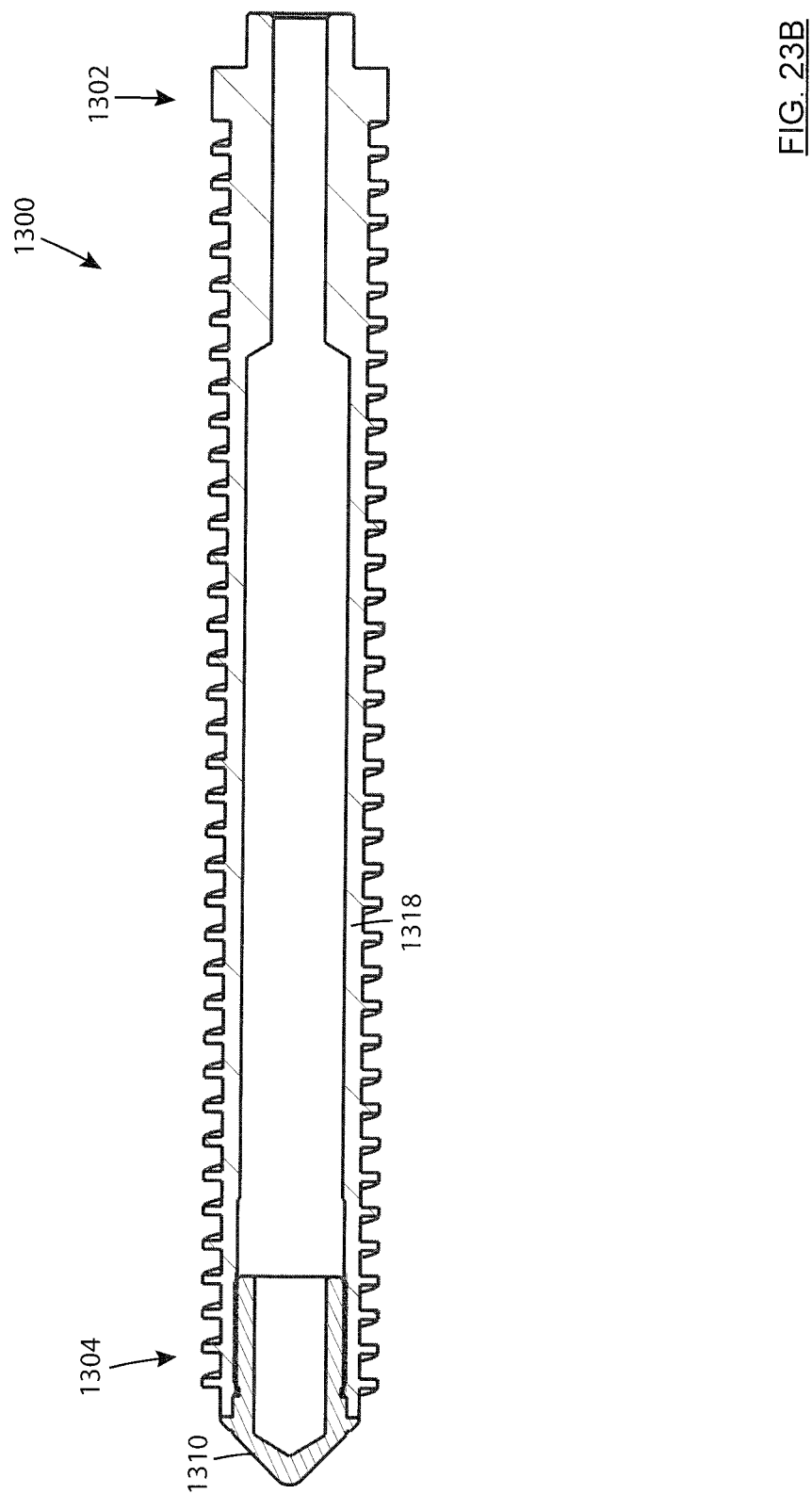
FIG. 23B is a cross-section view of a two-piece extrusion screw in accordance with one embodiment.

Alternatively, as shown in FIG. 23B, an extrusion screw 1300 may have a one-piece screw body section 1318.

One possible advantage of using a two-part screw body is that thermal conduction across the joint between the two screw sections may be less than if the screw body were integrally formed out of a single material. This relatively lower thermal conduction may reduce or minimize thermal conduction between the screw body sections.

Reduced thermal conduction along the screw 1300 may have one or more advantages. For example, in the illustrated embodiments the first screw body section 1312 and second screw body section 1314 are dimensioned such that, when screw 1300 is positioned in extrusion barrel 1100, first screw body section 1312 is positioned in the feed zone of the extruder, and second screw body section 1314 is positioned downstream of the feed zone (e.g. in the heating zone) of the extruder. Thus, use of such a two-component screw body may reduce or minimize thermal transfer from the heating zone to the feed zone via the screw 1300.

In some embodiments, first and second screw body sections may be made from different materials, which may further minimize any thermal conduction from the heating zone to the feed zone via the screw 1300. For example, first screw body section 1312 may be made from a material that has a relatively low thermal conductivity as compared with the material from which the second screw body section 1314 is made. In some embodiments, first screw body section 1312 may be made of steel or stainless steel, and second screw body section 1314 may also be made of steel or stainless steel, or may be made of aluminum or copper.

Figure 24:
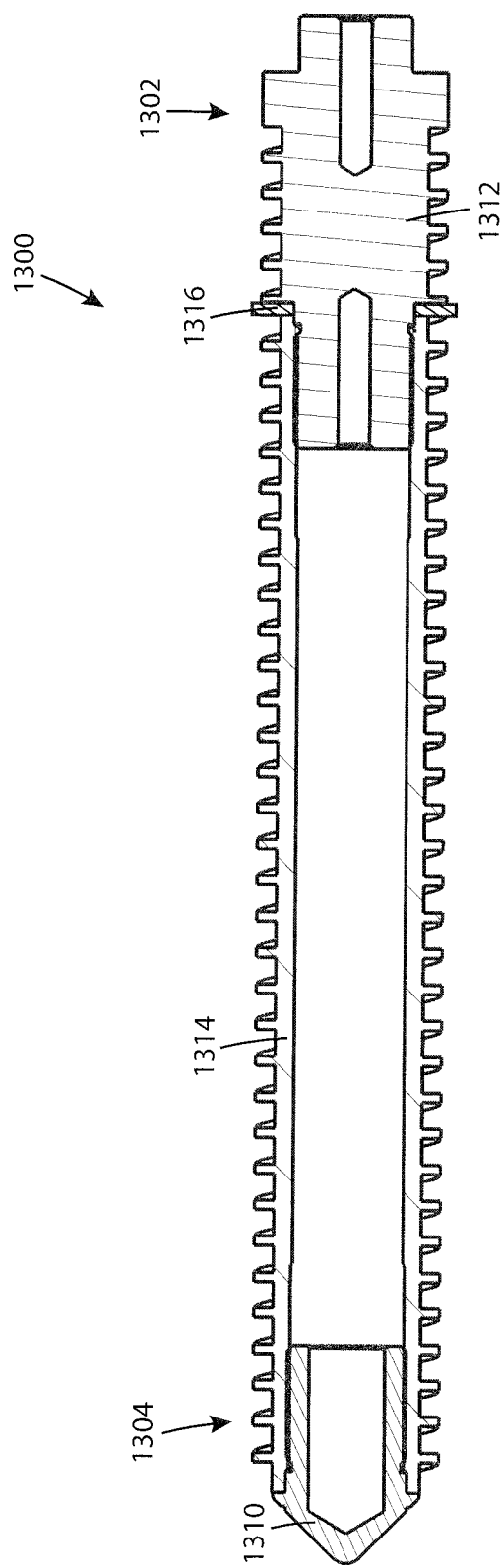
FIG. 24 is a cross-section view of a three-piece extrusion screw in accordance with another embodiment.

Optionally, extrusion screw 1300 may also have an additional component for reducing the thermal connection along the screw 1300. For example, as shown in FIG. 24, an extrusion screw 1300 includes an insulating spacer 1316 positioned between the first screw body section 1312 and the second screw body section 1314. The use of an insulating spacer may further inhibit thermal conduction between the first and second screw body section, which may further may reduce or minimize thermal conduction from the heating zone to the feed zone via the screw 1300.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An extruder comprising:
   a) a barrel extending from a feed inlet end to an extruder outlet end, the barrel having an inner surface, an outer surface and a wall thickness between the inner and outer surfaces;
   b) at least one barrel heater positioned exterior to the barrel;
   c) a screw drive motor drivingly connected to a rotatably mounted screw positioned within the barrel, the screw having a length from the feed inlet end of the barrel to the extruder outlet end of the barrel and the length has a single flight having a plurality of threads, whereby the screw is rotatable at various revolutions per minute (RPM), the screw is a flow inducing member that delivers plastic to a mold; and
   d) a controller operably connected to the screw drive motor to adjust the RPM of the screw based upon a temperature of material passing through and/or being extruded from the barrel
   wherein the barrel has a section that has a diameter of up to 2.405 inches in which solid feed material is liquefied that is operated at a pressure of 10-200 psi,
   wherein a flight clearance between the inner surface of the barrel and an outer extent of the flight is from 0.005 to 0.04 inches, and
   wherein the single flight has a flight depth from an outer lateral extent of the flight to an inner lateral extent that is generally constant and a flight width that is generally.

2. The extruder of claim 1 wherein the controller is operably connected to the screw drive motor to increase the RPM of the screw subsequent to the temperature of the material passing through and/or being extruded from the barrel increasing above a predetermined value.

3. The extruder of claim 1 wherein the controller is operably connected to the screw drive motor to decrease the RPM of the screw subsequent to the temperature of the material passing through and/or being extruded from the barrel decreasing below a predetermined value.

4. The extruder of claim 1 wherein the barrel has a wall thickness of from 0.01 to 0.375 inches.

5. The extruder of claim 1 wherein the flight clearance remains constant or increases from the feed inlet end to the extruder outlet end.

6. The extruder of claim 5 wherein the volumetric compression ratio, defined as a ratio of a channel depth of a feed section of the extruder to a channel depth in a metering section of the extruder, is ≤1.

7. The extruder of claim 1 wherein the barrel comprises at least one of aluminum, copper, steel, and stainless steel.

8. The extruder of claim 1 wherein a flight depth from an outer lateral extent of the flight to an inner lateral extent of a flight along the length of the screw is from 0.2-0.5 inches.

9. The extruder of claim 1 wherein a land portion of the screw between two adjacent threads of a flight is from 0.125 to 0.5 inches.

10. The extruder of claim 1 wherein a land portion of the outward lateral extent of the flight of the screw between two adjacent threads of a flight is from 0.25 to 0.5 inches.

11. The extruder of claim 1 wherein the section of the barrel in which solid feed material is liquefied is operated at a pressure of 40-200 psi.

12. The extruder of claim 1 wherein at least 60% of energy provided to the extruder is used to produce heat.

13. The extruder of claim 1 wherein the screw and barrel are sized such that at least 70% of heat that is introduced into material in the barrel is supplied by the at least one barrel heater and less than 30% of the heat that is introduced into the material in the barrel is supplied by shearing the material.

14. The extruder of claim 1 wherein the screw and barrel are sized such that at least 80% of heat that is introduced into material in the barrel is supplied by the at least one barrel heater and less than 20% of the heat that is introduced into the material in the barrel is supplied by shearing the material.

15. The extruder of claim 1 wherein the screw comprises a first screw section and a second screw section and a thermal insulation member is provided between the first and second screw sections.

16. The extruder of claim 15 wherein the first screw section is made of a material having lower thermal conductivity than the second screw section.

17. The extruder of claim 15 wherein the first screw section is provided in a feed section of the extruder and the second screw section is provided downstream of the feed section of the extruder.

18. The extruder of claim 1 wherein the screw comprises a first screw section and a second screw section and the first screw section is made of a material having lower thermal conductivity than the second screw section.

19. The extruder of claim 1, wherein the extruder produces a flow of 11 lbs per hour per inch$^2$ to 43 lbs per hour per inch$^2$.

20. The extruder of claim 4, wherein the screw is the sole flow inducing member.

21. The extruder of claim 1, wherein the screw is a single channel screw.

22. An extruder comprising:
a) a barrel extending from a feed inlet end to an extruder outlet end, the barrel having an inner surface, an outer surface and a wall thickness between the inner and outer surfaces;
b) at least one barrel heater positioned exterior to the barrel;
c) a screw drive motor drivingly connected to a rotatably mounted screw positioned within the barrel, the screw having a length and a flight having a plurality of threads thereon, whereby the screw is rotatable at various revolutions per minute (RPM) and is a sole flow inducing member that delivers plastic to a mold; and
d) a controller operably connected to the screw drive motor to adjust the RPM of the screw based upon a temperature of material passing through and/or being extruded from the barrel
wherein the barrel has a section that has a diameter of up to 2.405 inches in which solid feed material is liquefied that is operated at a pressure of 10-200 psi,
wherein a flight clearance between the inner surface of the barrel and an outer extent of the flight is from 0.005 to 0.04 inches, and
wherein a flight depth from an outer lateral extent of the flight to an inner lateral extent of the flight along the length of the screw is generally constant and a flight width is generally constant along the length of the screw.

* * * * *